US012342392B2

(12) United States Patent
Xin et al.

(10) Patent No.: US 12,342,392 B2
(45) Date of Patent: Jun. 24, 2025

(54) SHARING AN EDCA TXOP WITH RTA TRAFFIC

(71) Applicant: SONY GROUP CORPORATION, Tokyo (JP)

(72) Inventors: Liangxiao Xin, San Jose, CA (US); Mohamed Abouelseoud, San Francisco, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 666 days.

(21) Appl. No.: 17/509,017

(22) Filed: Oct. 24, 2021

(65) Prior Publication Data

US 2022/0322460 A1    Oct. 6, 2022

Related U.S. Application Data

(60) Provisional application No. 63/168,434, filed on Mar. 31, 2021.

(51) Int. Cl.
*H04W 74/08* (2024.01)
*H04W 84/12* (2009.01)

(52) U.S. Cl.
CPC ........ *H04W 74/0866* (2013.01); *H04W 84/12* (2013.01)

(58) Field of Classification Search
CPC .................................................. H04W 74/0866

(Continued)

(56) References Cited

U.S. PATENT DOCUMENTS

2003/0081547 A1    5/2003   Ho
2012/0051342 A1    3/2012   Liu
(Continued)

FOREIGN PATENT DOCUMENTS

CN        107771376 A    3/2018
EP          2609696 B1    5/2019
(Continued)

OTHER PUBLICATIONS

Bankov, Dmitry et al., "Enabling real-time applications in Wi-Fi networks". International Journal of Distributed Sensor Networks 2019, vol. 15(5), May 2019, pp. 1-11, DOI: 10.1177/1550147719845312.

(Continued)

*Primary Examiner* — Faisal Choudhury
(74) *Attorney, Agent, or Firm* — O'BANION & RITCHEY LLP; John P. O'Banion

(57) ABSTRACT

A communication circuit and protocol for a wireless local area network (WLAN) using single EDCA and/or Multiple-User (MU) EDCA in which frames for Real Time Applications (RTA) can utilize shared Transmit Opportunities (TXOPs) to reduce transmission latencies. The protocol is configured in a number of ways to ensure communication fairness, such as by ensuring a minimum required channel resource is provided for transmitting frames from the primary AC during the TXOP. AP MLDs and non-AP MLDs are also supported and can exchange information on distinguishing traffic streams from other traffic streams having the same Traffic Identifier (TID), in determining which links to use for transmitting the traffic stream.

15 Claims, 36 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0281980 A1* | 10/2015 | Zhou | H04W 28/0268 370/254 |
| 2016/0262173 A1 | 9/2016 | Josiam | |
| 2016/0345362 A1 | 11/2016 | Lee | |
| 2020/0396768 A1 | 12/2020 | Abouelseoud | |
| 2021/0075675 A1 | 3/2021 | Cavalcanti | |
| 2021/0076420 A1 | 3/2021 | Liangxiao | |
| 2021/0289552 A1* | 9/2021 | Aboul-Magd | H04W 8/04 |

FOREIGN PATENT DOCUMENTS

| | | |
|---|---|---|
| JP | 2013539640 A | 10/2013 |
| JP | 2017517173 A | 6/2017 |
| WO | WO-2021002617 A1 | 1/2021 |
| WO | WO-2021048706 A1 | 3/2021 |

OTHER PUBLICATIONS

Chunyu Hu, et al (Facebook Inc), "Prioritized EDCA Channel Access", IEEE 802.11-20/1045r3, Jul. 2020, pp. 1-43, XP068172273.

Harry Wang, et al (Tencent), "Multilink Traffic Stream (TS) Operation", IEEE 802.11-20/0908r1, Jun. 29, 2020, pp. 1-20, XP068170563.

Liangxiao Xin, et al (Sony), "EDCA queue for RTA", IEEE 802.11-20/1041r4, Oct. 21, 2020, pp. 1-10, XP068173948.

* cited by examiner

FIG. 1 (Prior Art)

| Element ID | Length | TS Info | Nominal MSDU Size | Maximum MSDU Size | Minimum Service Interval | Maximum Service Interval | Inactivity Interval | Suspension Interval |

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |

FIG. 2 (Prior Art)

| Traffic Type | TSID | Direction | Access Policy | Aggregation | APSD | User Priority | TSInfo Ack Policy | Schedule | Reserved |

FIG. 3 (Prior Art)

| Element ID | Length | User Priority | Frame Classifier |

FIG. 4 (Prior Art)

| Element ID | Length | Processing |

FIG. 5
(Prior Art)

HE-MU: L-STF (8μs) | L-LTF (8μs) | L-SIG (4μs) | RL-SIG (4μs) | HE-SIG-A (8μs) | HE-SIG-B (16μs) | HE-STF (4μs) | HE-LTFs | Data | PE

FIG. 6
(Prior Art)

L-STF (8μs) | L-LTF (8μs) | L-SIG (4μs) | RL-SIG (4μs) | HE-SIG-A (8μs) | HE-STF (8μs) | HE-LTFs | Data | PE

FIG. 7
(Prior Art)

Trigger frame: Frame Control | Duration | RA | TA | Common Info | User Info | ... | User Info | FCS Common Info field

| Trigger Type | Length | Cascading Indication | CS Required | BW | GI And LTF Type | MU MIMO LTF Mode | Number of HE-LTF Symbols | STBC |
|---|---|---|---|---|---|---|---|---|

| LDPC Extra Symbol Segment | AP TX Power | Packet Extension | Spatial Reuse | Doppler | GI And LTF Type | HE-SIG-A Reserved | Reserved | Trigger dependent common info |
|---|---|---|---|---|---|---|---|---|

FIG. 8
(Prior Art)

User Info field

| AID12 | RU Allocation | Coding Type | MCS | DCM | SS Allocation | Target RSSI | Reserved | Trigger dependent user info |
|---|---|---|---|---|---|---|---|---|

FIG. 9
(Prior Art)

MU-BAR variant

| BAR control | BAR info |
|---|---|

FIG. 10
(Prior Art)

BA frame

| Frame Control | Duration | RA | TA | BA control | BA info | FCS |
|---|---|---|---|---|---|---|

FIG. 11
(Prior Art)

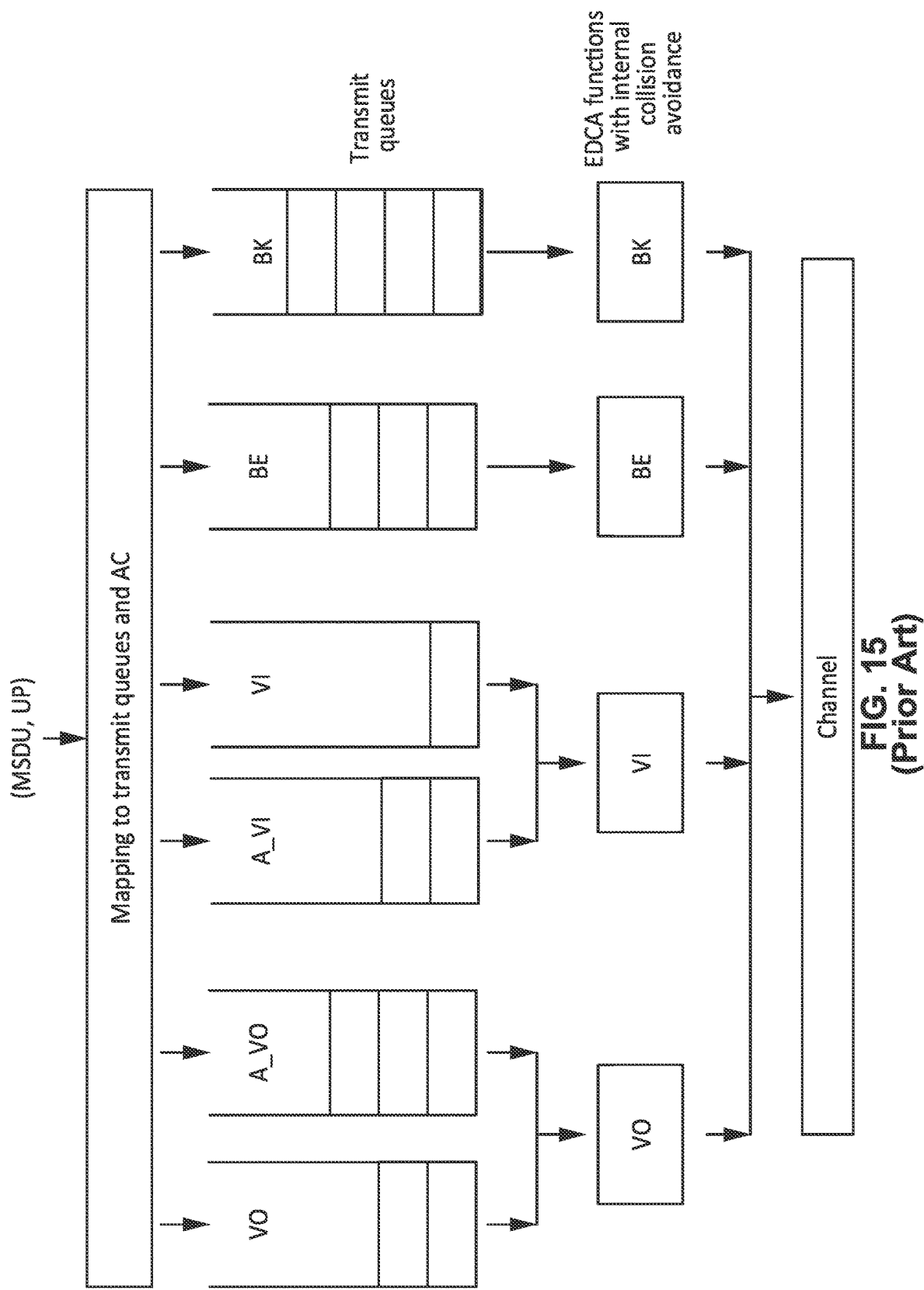

SHARING AN EDCA TXOP WITH RTA TRAFFIC

CROSS-REFERENCE TO RELATED APPLICATIONS

This application claims priority to, and the benefit of, U.S. provisional patent application Ser. No. 63/168,434 filed on Mar. 31, 2021, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

STATEMENT REGARDING FEDERALLY SPONSORED RESEARCH OR DEVELOPMENT

Not Applicable

BACKGROUND

1. Technical Field

The technology of this disclosure pertains generally to wireless network communications using Enhanced Distributed Channel Access (EDCA) which defines multiple Access Categories (ACs), and more particularly to allowing Real-Time Application (RTA) packet transmissions to utilize Transmit Opportunity (TXOP) sharing to reduce latency.

2. Background Discussion

Current wireless 802.11 technologies using CSMA/CA focus on high throughput performance of the network but lack adequate support of low latency traffic, such as required by Real Time Applications (RTA) sending RTA frames. Each RTA frame requires low latency due to its high timeliness requirement as it is only valid if delivered within a certain period of time. In addition for RTA traffic there are issues which arise when using Enhanced Distributed Channel Access (EDCA) in defining multiple Access Categories (ACs) for RTA traffic.

Accordingly, a need exists for enhanced processing of RTA traffic sharing of TXOPs when using EDCA. The present disclosure fulfills that need and provides additional benefits.

BRIEF SUMMARY

Current wireless communication systems using Enhanced Distributed Channel Access (EDCA) do not distinguish RTA packets from non-RTA packets, and thus all packets use the same TXOP sharing rule under EDCA. The present disclosure is configured to increase the flexibility of RTA packet transmission in utilizing EDCA Transmit Opportunity (TXOP) sharing in order to reduce latency. The disclosed protocol provides primary benefits that: (a) STAs are able to share a TXOP of the primary AC to transmit RTA frames when there are frames from the primary AC that have not been transmitted; and (b) considering of fairness (equality, egalitarianism) between transmitting the frames of the primary AC and transmitting the RTA frames from the non-primary ACs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of TSPEC element content defined in IEEE 802.11.

FIG. 2 is a data field diagram of a TS Information element as defined in IEEE 802.11.

FIG. 3 is a data field diagram of a TCLAS element as defined in IEEE 802.11.

FIG. 4 is a data field diagram of a TCLAS Processing element defined in IEEE 802.11.

FIG. 5 is a data field diagram of an HE multi-user (MU) PPDU format used for downlink multi-user transmission as defined in IEEE 802.11.

FIG. 6 is a data field diagram of an HE Trigger-based (TB) PPDU format used for uplink multi-user transmission as defined in IEEE 802.11.

FIG. 7 is a data field diagram of a trigger frame (TF) as defined in IEEE 802.11.

FIG. 8 is a data field diagram of a Common Information field of the TF as defined in IEEE 802.11.

FIG. 9 is a data field diagram of a User information field of the trigger frame (TF) as defined in IEEE 802.11.

FIG. 10 is a data field diagram of a Trigger Dependent User Info field in the trigger frame (TF) for MU-BAR as defined in IEEE 802.11.

FIG. 11 is a data field diagram of a Block ACK (BA) frame as defined in IEEE 802.11.

FIG. 15 is a transmission queue diagram of the reference model for (Enhanced DCF Channel Access) EDCA queues as defined in IEEE 802.11.

DETAILED DESCRIPTION

1. Introduction

Figure 12:
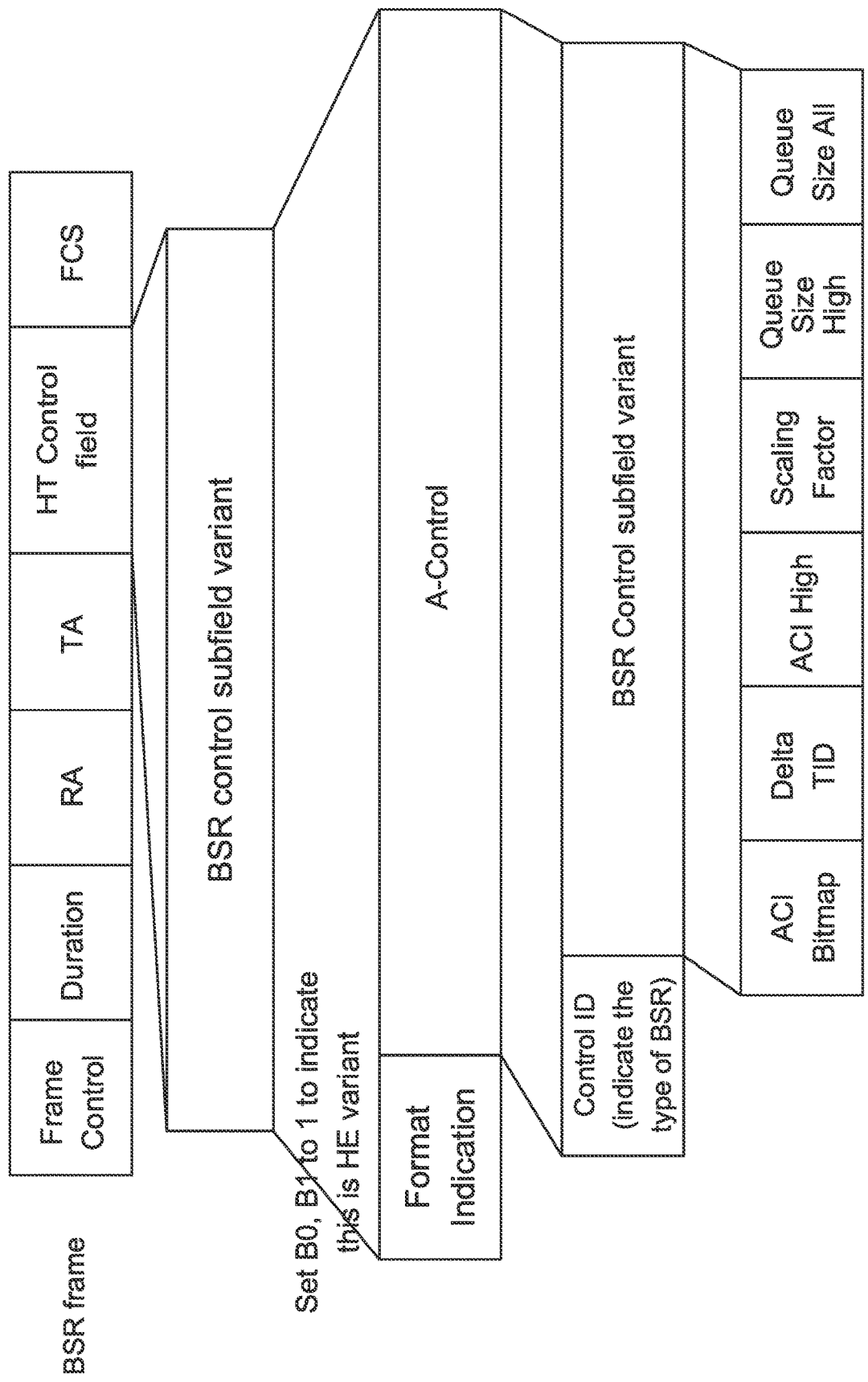
FIG. 12 is a data field diagram of a buffer state request (BSR) frame as defined in IEEE 802.11.

A Real Time Application (RTA) requires low-latency and uses best effort communication. The data generated from a RTA is called RTA traffic and is packetized as a RTA frame at the transmitter station (STA). Also, the data generated from non-time sensitive applications is referred to herein as non-RTA traffic and is packetized as non-RTA frames at the transmitter STA, which transmits packets carrying frames to the receiver STA over the channel (link).

When RTA traffic arrives at an EDCA queue, it will be encapsulated in terms of frames. The frames carrying RTA traffic are denoted by RTA frames and the frames carrying non-RTA traffic are denoted by non-RTA frames. One or more frames can be included in one packet and be transmitted over links or channels. The AC associated with the EDCAF that gains an EDCA TXOP is referred to as the primary AC.

The RTA frame requires low latency due to its high timeliness requirement on delivery, as the RTA frame is only valid if it is delivered within a certain period of time. One solution in the CSMA/CA wireless technology is to let the STA have more opportunities to transmit RTA frames, for example using a high priority AC for transmitting RTA frames.

Due to the random channel access scenario, STAs needs to sense and contend for channel access before transmitting each frame. With EDCA, STAs can use the short channel contention time of a high priority AC to accelerate channel access. However, there is the possibility that the low priority AC accesses the channel earlier than the high priority AC. The delay of transmitting RTA frames from a high priority AC is caused by the TXOP time obtained by low priority AC.

To avoid the delay caused by the TXOP time obtained by a low priority AC, the STA can use the TXOP time obtained by a low priority AC to transmit the RTA frames. The task of sharing the TXOP of the primary AC to transmit frames from the non-primary AC is challenging due to the coexistence of RTA traffic and non-RTA traffic. The challenge in this process can be summarized as: (a) distinguishing between RTA traffic and non-RTA traffic, sharing the TXOP of the primary AC to transmit RTA packets from non-primary ACs when there are packets from the primary AC that have not been transmitted.

2. Current 802.11 Operations

2.1. TSPEC Element

FIG. 1 depicts content in the TSPEC element which is defined in IEEE 802.11, having the following fields. An Element ID indicates the type of element, which in this instance indicates this is a TSPEC element. A Length field indicates the length of the TSPEC element. A TS Info field indicates the traffic stream information, with subfields shown in FIG. 2. A Nominal MSDU Size field indicates the nominal size of MSDUs or A-MSDUs belonging to the TS under this TSPEC. A Maximum MSDU Size field indicates the maximum size of MSDUs or A-MSDUs belonging to the TS under this TSPEC. A Minimum Service Interval field indicates the minimum time between the start times of two successive service periods (SPs). A Maximum Service Interval field indicates the maximum time between the start times of two successive SPs. An Inactivity Interval field indicates an interval of time without arrival or transmission of a MSDU belonging to the TS before that TS is deleted. A Suspension Interval field indicates an interval of time without arrival or transmission of a MSDU belonging to the TS before the generation of successive QoS(+)CF-Poll is stopped for this TS.

A Service Start Time field contains the start time of the first SP. A Minimum Data Rate field indicates the lowest data rate specified by MAC SAP for transmitting MSDUs or A-MSDUs belonging to the TS under this TSPEC. A Mean Data Rate field is the average data rate specified by MAC SAP for transmitting MSDUs or A-MSDUs belonging to the TS under this TSPEC. A Peak Data Rate field is the maximum data rate specified by MAC SAP for transmitting MSDUs or A-MSDUs belonging to the TS under this TSPEC. A Burst Size field indicates the maximum burst of MSDUs or A-MSDUs belonging to the TS under this TSPEC at the peak data rate. A Delay Bound field indicates the maximum time that is allowed for transmitting a MSDU or A-MSDU belonging to the TS under this TSPEC. A Minimum PHY Rate field indicates the lowest PHY rate for transmitting MSDUs or A-MSDUs belonging to the TS under this TSPEC. A Surplus Bandwidth Allowance field indicates the ratio of the bandwidth used for transmitting a MSDU or A-MSDU belonging to the TS under this TSPEC and its retransmissions to the bandwidth used for a transmitting that MSDU or A-MSDU once at the minimum PHY rate. A Medium Time field indicates the time allowed for accessing the medium. A DMG Attributes field is presented when the TSPEC is applied to a directional multi-gigabit (DMG) BSS.

FIG. 2 depicts content in the TS Info field which is defined in IEEE 802.11. A Traffic Type field specifies whether the traffic is periodic or not. A TSID field indicates the ID number to identify the TS. A Direction field specifies the direction of data transmission. An Access Policy field specifies the method to gain channel access. An Aggregation field specifies whether the aggregation schedule is required. An APSD field indicates whether automatic PS delivery is used. A User Priority field indicates user priority of the MSDU or A-MSDU belonging to the TS. A TSInfo Ack Policy field indicates whether the Ack is required and which form of Ack is used. A Schedule field indicates the type of schedule.

2.2. TCLAS Element

FIG. 3 depicts the content in the TCLAS element which is defined in IEEE 802.11. An Element ID field indicates the type of element; which in this example is a TCLAS element. A Length field indicates the length of the TCLAS element. A User Priority field indicates the user priority from the upper layer. A Frame Classifier field indicates the method to classify the frames from the upper layer.

2.3. TCLAS Process Element

FIG. 4 depicts content of the TCLAS Processing element which is defined in IEEE 802.11. An Element ID field indicates the type of the element; which in this case is a TCLAS Processing element. A Length field indicates the length of the TCLAS Processing element. A Processing field indicates the method of classifying the traffic from the upper layer when multiple TCLAS elements exist.

2.4. Multi-User Transmission

Multi-user transmission is available in wireless networks, such as IEEE 802.11. Since IEEE 802.11ax, the network can support multi-user transmissions in both uplink and downlink. Multi-user transmission in IEEE 802.11ax includes MIMO mode and OFDMA mode; which can be utilized separately or together.

IEEE 802.11ax uses the multi-user transmission packet formats, such as shown in FIG. 5 and FIG. 6, to transmit data in multi-user mode. When multiple users transmit or receive a multi-user transmission packet, all the users share the same PLCP header of the multi-user transmission packet. Then, each user transmits or receives the data carried by the multi-user transmission packet using a separate resource block, including RU allocation, MCS and so forth.

IEEE 802.11ax defines multiple PLCP Protocol Data Unit (PPDU) formats to transmit packets in different multi-user transmissions, which are described below. It will be noted that PLCP is an acronym for PHY Layer Convergence Protocol.

FIG. 5 depicts the HE multi-user (MU) PPDU format used for downlink multi-user transmission in IEEE 802.11ax. The fields are depicted as L-STF, L-LTF, L-SIG, RL-SIG, HE-SIG-A, HE-SIG-B, HE-STF, HE-LTF, Data and PE.

FIG. 6 depicts the HE Trigger-based (TB) PPDU format used for uplink multi-user transmission in IEEE 802.11ax. The fields in the HE TB PPDU format are identical to those in the HE single user PPDU format, except that the HE-STF field is 8 μs. The fields are depicted as L-STF, L-LTF, L-SIG, RL-SIG, HE-SIG-A, HE-STF, HE-LTFs, Data and PE.

FIG. 7 depicts the content of the trigger frame (TF). A Frame Control field indicates the type of frame. A Duration field contains NAV information used for CSMA/CA channel access. An RA field contains an address for the recipient of the frame. A TA field contains the address of the STA that transmitted the frame. A Common Info field includes information for all allocated STAs, which is shown in FIG. 8, below. A User Info field includes information for each STA, which is shown in FIG. 9. The Common Info field and the User Info field provide separate resource block allocation information to each user.

FIG. 8 depicts the Common information field of the trigger frame shown in FIG. 7. The subfield of the common information field are depicted as Trigger Type, Length, Cascading Indication, CS Required, BW, GI and LTF Type, MU MIMO LTF Mode, Number of HE-LTF Symbols, STBC, LDPC Extra Symbol Segment, AP TX Power, Packet Extension, Spatial Reuse, Doppler, GI and LTF Type, HE-SIG-A Reserved, Reserved and Trigger Dependent Common Info.

FIG. 9 depicts the User information field of the trigger frame shown in FIG. 7, having the following subfields. An AID12 subfield, RU Allocation, Coding Type, MCS, DCM, SS Allocation, Target RSSI, Reserved, and Trigger Dependent User Information.

The trigger frame as shown in FIG. 7 can be transmitted as a Multi-User Block Ack Request (MU-BAR) by setting the trigger type in the common info field to "2". When the trigger frame is MU-BAR, the content of the trigger dependent user info field (as shown in FIG. 9) in the trigger frame is shown in FIG. 10.

FIG. 10 depicts a Trigger dependent user info field in trigger frame for MU-BAR, showing subfields BAR Control and BAR Information.

FIG. 11 depicts the content of the Block ACK (BA) frame having the following subfields. A Frame Control field indicates the type of the frame. A Duration field contains NAV information used for CSMA/CA channel access. An RA field contains an address for the recipient of the frame. A TA field contains the address of the STA that transmitted the frame. A BA Control field indicates the policy of the Block ACK. A BA info field contains feedback for the transmission.

FIG. 12 depicts the contents of the Buffer State Request (BSR) frame having the following fields. A Frame Control field indicates the type of frame. A Duration field contains NAV information used for CSMA/CA channel access. A RA field contains an address for the recipient of the frame. A TA field contains the address of the STA that transmitted the frame. An HT Control field indicates the BSR control subfield variant. A Format Indication field is used to indicate the format of HT control field. When the B0 and B1 are set to a first state (e.g., "1"), it indicates the HT control field uses HE format. There is an A-Control field followed by this field. An A-Control field carries the buffer status report. A Control ID field indicates that the BSR is carried in the control information field. A Control Information field carries the BSR control subfield variant. An ACI Bitmap field indicates access categories for which the buffer status is reported. A Delta TID field indicates the number of TIDs for which the buffer status is reported. An ACI High field indicates the access category which is reported in the Queue Size High field. A Scaling Factor field indicates the unit of the Queue Size High and Queue Size All fields. A Queue Size High field indicates the queue size of the AC indicated in ACI High which is in units of Scaling Factor. A Queue Size All field indicates the queue size of the ACs indicated in ACI Bitmap which is also in units of Scaling Factor.

Figure 13:
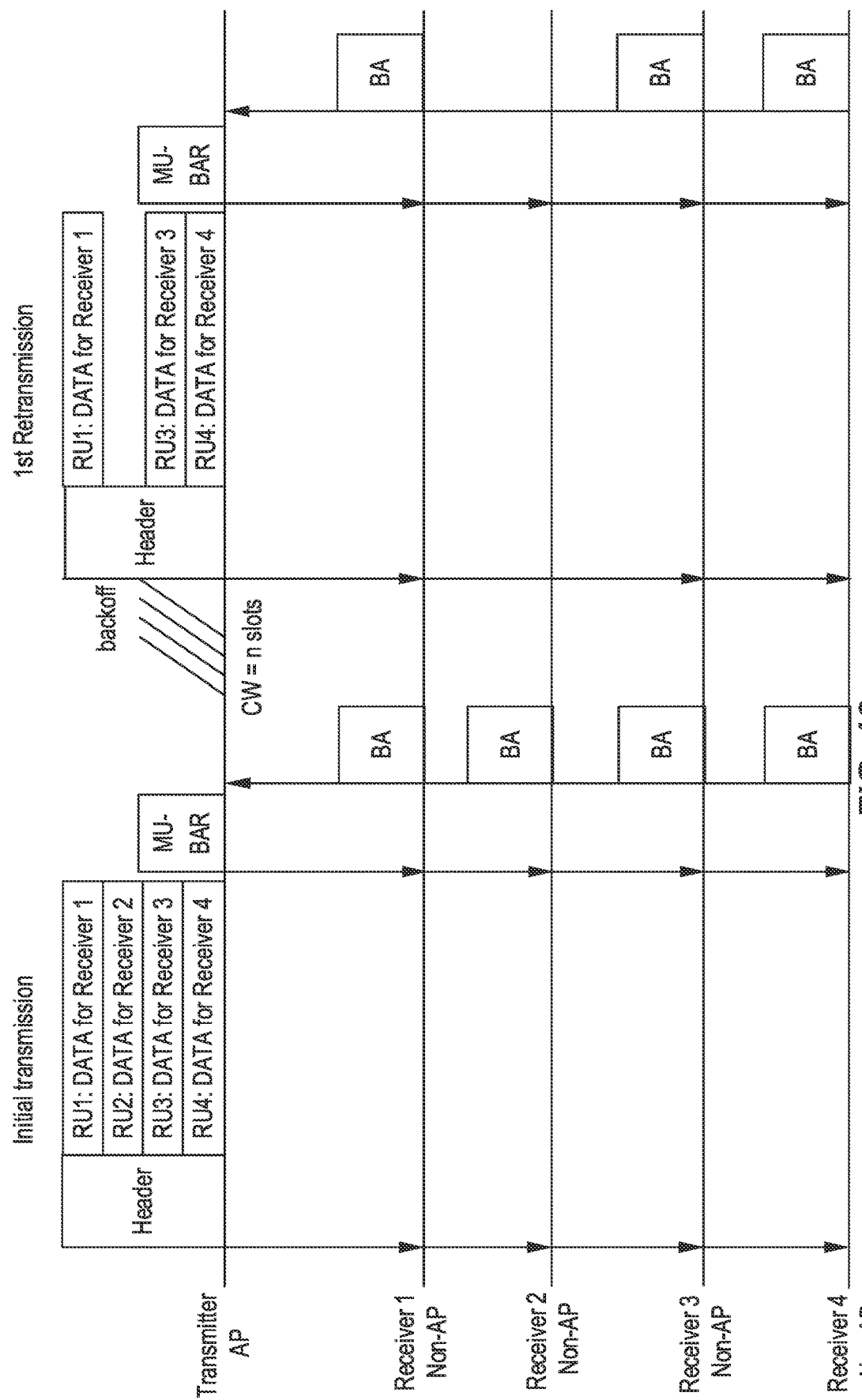
FIG. 13 is a communication diagram of downlink multi-user transmission using OFDMA as utilized in IEEE 802.11.

FIG. 13 depicts an example of downlink multi-user transmission using OFDMA. The transmitter AP transmits data to its receivers 1, 2, 3, and 4 using the HE MU PPDU format. After finishing the initial transmission, the AP sends a multi-user Block ACK request (MU-BAR) to all the receivers. The receivers then each send a block ACK (BA) back to the AP. According to the content in the BAs, the AP decides to retransmit the packets to receivers 1, 3, and 4. It contends for the channel and waits the given backoff time. The first retransmission is shown occurring after the AP gains channel access.

Figure 14A:
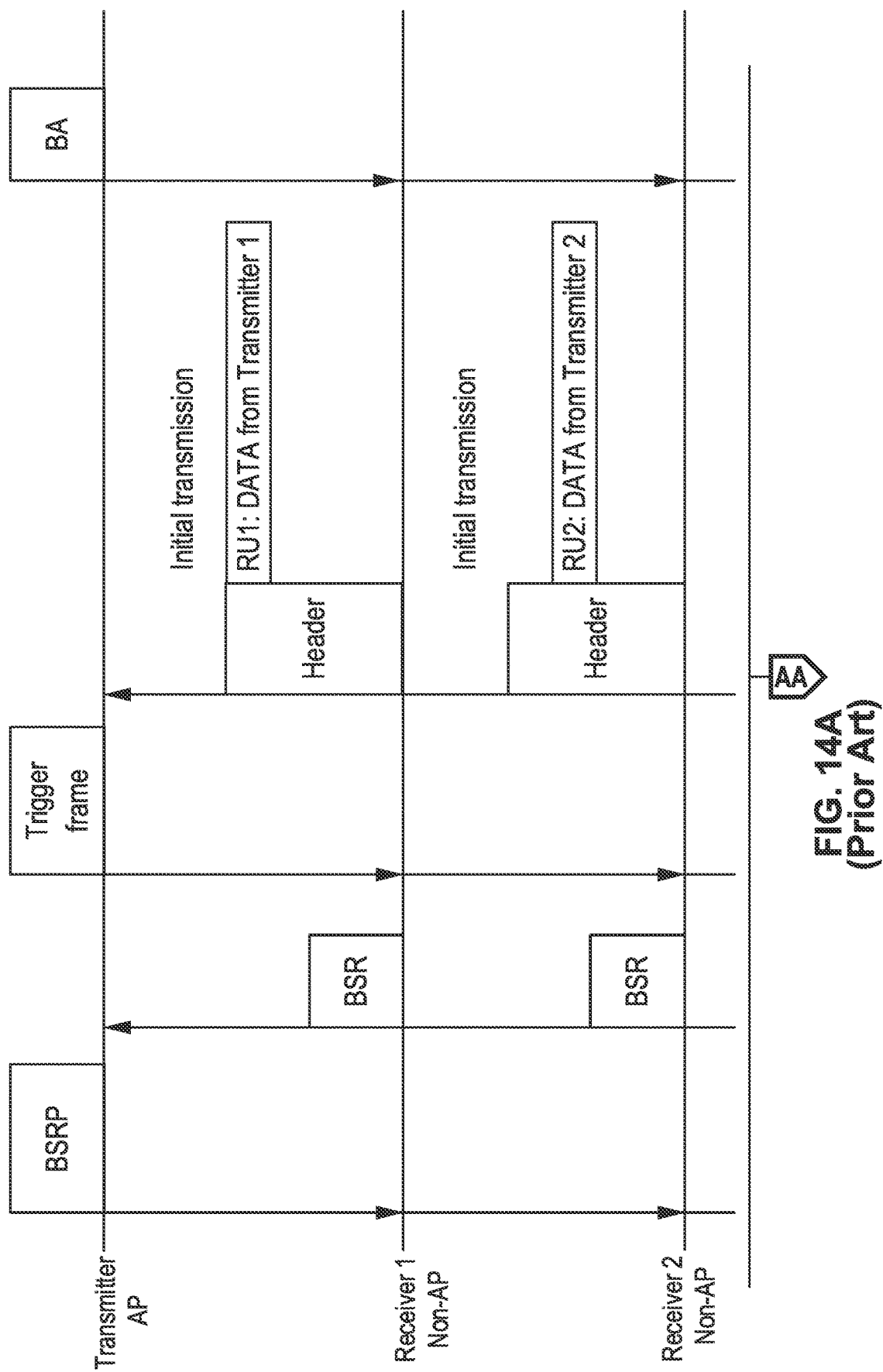
FIG. 14A and FIG. 14B are a communication diagram of uplink multi-user transmission using Orthogonal Frequency Division Multiple Access (OFDMA) as defined in IEEE 802.11.
Figure 14B:
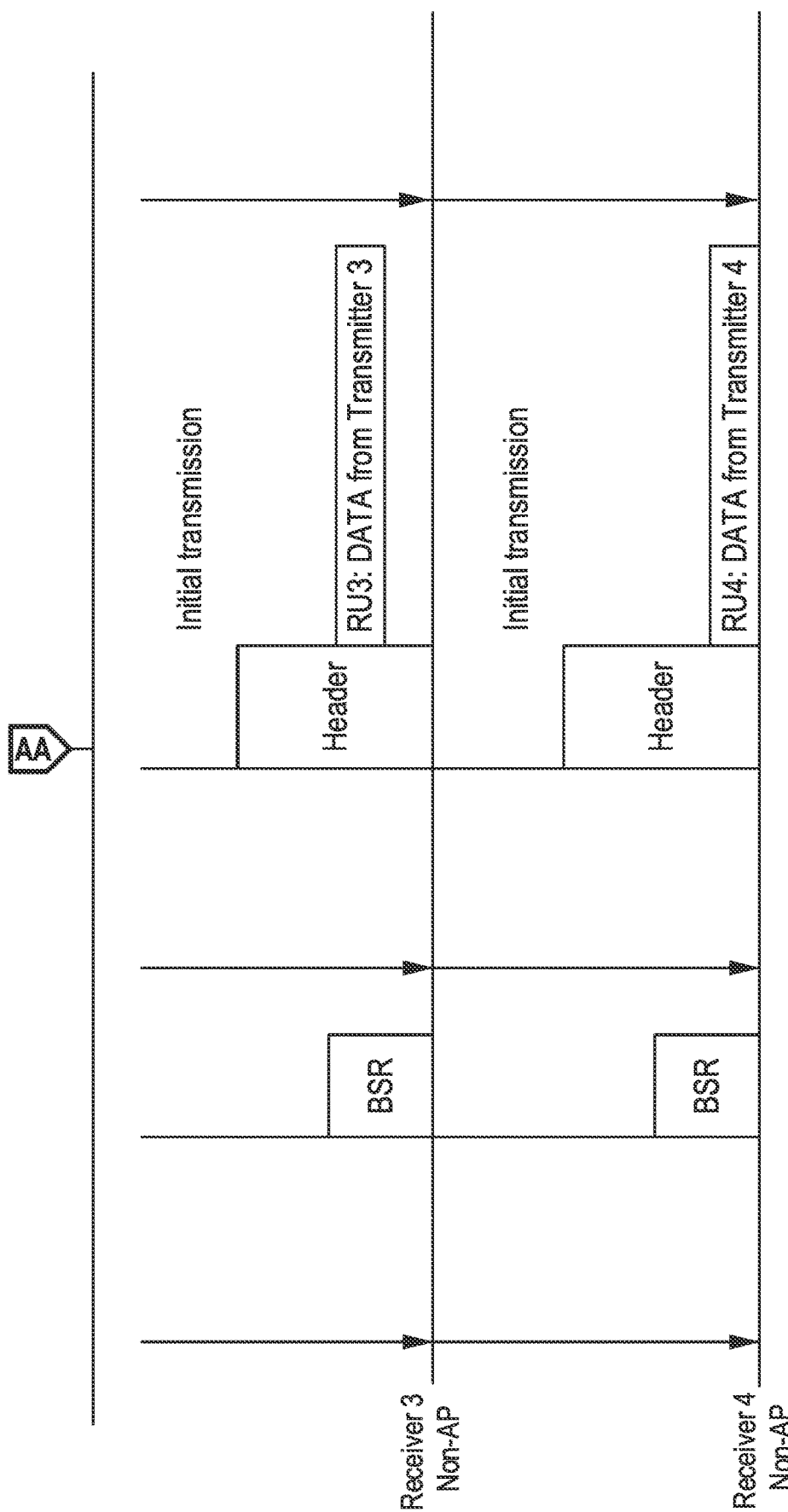

FIG. 14A and FIG. 14B depict an example of uplink multi-user transmission using OFDMA. The AP first sends a buffer status report request (BSRP) trigger frame to all the transmitters 1, 2, 3 and 4. Then the transmitters receive the BSRP trigger frame and send their buffer status reports (BSRs) back to the AP. Then, the AP sends a trigger frame to all the transmitters 1, 2, 3 and 4. The channel resources are allocated in the trigger frame based on the BSRs received from the STAs. The transmitters receive the trigger frame and start the initial transmission using the resource block allocated by the trigger frame. The multi-user transmission packet uses the HE-TB PPDU format. The AP receives the packet from the transmitters and sends a BA frame to report whether the transmission was correctly received.

2.5. EDCA System

FIG. 15 illustrates the reference model of the (Enhanced DCF Channel Access) EDCA queues in IEEE 802.11. The system contains six transmit queues and four access categories (ACs). Each AC uses EDCA functions (EDCAFs) to contend for channel access so that it may transmit packets in its corresponding transmit queues. The six transmit queues are depicted as voice (VO), alternate voice (A_VO), alternate video (A_VI), video (VI), best effort (BE), and background (BK). Each transmit queue decides the transmission order of the packets in the queue.

The four ACs depicted are voice (VO), video (VI), best effort (BE), and background (BK). Each of the ACs has an EDCA function (EDCAF) to provide the function of channel contention. An internal collision avoidance mechanism is used when multiple EDCAFs try to access the channel at the same time. When an internal collision occurs, the EDCAF with higher priority gains channel access.

Table 1 lists the UP-to-AC mapping used in EDCA queue of IEEE 802.11. The second and third columns represent user priorities of the traffic and their corresponding designations in IEEE 802.1D. In each row, according to user priority, the traffic will be enqueued in the corresponding transmit queue and access category. The priority increases from the top row to the bottom row. The traffic with higher priority has higher probability to be transmitted earlier.

Figure 16:
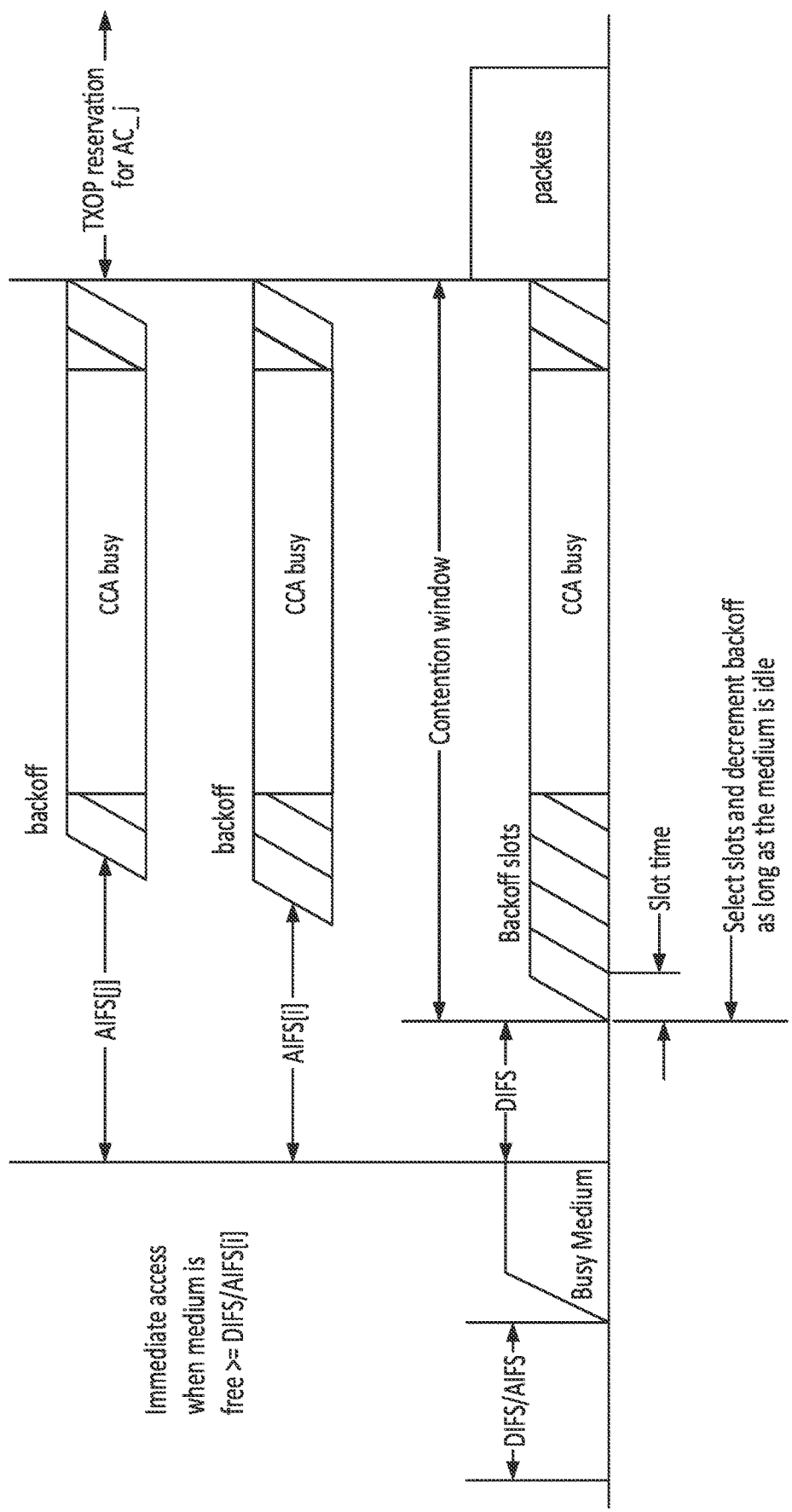
FIG. 16 is a communication diagram of performing a channel access procedure for EDCA as defined in IEEE 802.11.

FIG. 16 illustrates performing a channel access procedure for EDCA. As shown in the figure, it also compares EDCA channel access when only the Distributed Coordination Function (DCF) is used.

When only DCF is used, the STA is able to immediately access the channel and the medium is free for more than the DCF Interframe Space (DIFS) time. Otherwise, the STA uses CSMA/CA to contend for the channel. After sensing that the channel is idle for DIFS time, it starts to count down backoff as long as the medium is idle. The number of backoff slots is randomly chosen between zero and its contention window. The STA pauses to count down the backoff when CCA busy occurs; for instance when the STA senses channel busy. When the backoff counts down to zero, the STA can commence to transmit packets.

In EDCA, each EDCAF as shown in FIG. 15 is able to immediately access the channel when the medium is free for more than the Arbitration inter-frame spacing (AIFS) time of the AC toward gaining channel access. It should be noted that AIFS[i] as shown in the figure represents the AIFS time for AC i, which represents a given AC. Otherwise, each EDCAF uses CSMA/CA to contend for channel access for each AC that is attempting to gain channel access. After sensing that the channel is idle for AIFS time, the STA starts to count down backoff as long as the medium is idle. The number of backoff slots is randomly chosen between zero and its contention window size. The STA pauses to count down the backoff when CCA busy occurs, for instance when the STA senses channel busy. When the backoff counts down to zero, the STA starts to transmit packets for that AC. It should be noted that multiple EDCAFs can contend for the channel in parallel. For example, EDCAFs for AC i and AC j (representing any two ACs) can contend for the channel at the same time as shown in FIG. 16.

When an internal collision occurs, the EDCAF with higher priority gains channel access and the EDCAF with lower priority doubles its contention window. When AC is VO or VI, they are able to reserve a period of contention free time, such as TXOP, for transmitting packets. The maximum duration of TXOP is denoted as a TXOP limit.

Table 2 lists the default parameter setting for EDCA channel access. Each AC has its own minimum contention window and maximum contention window. AIFSN represents the AIFS duration in terms of the Number of backoff slots. The TXOP limit represents the maximum duration of TXOP that each AC can reserve each time.

2.6. TXOP Sharing in IEEE 802.11ax

A STA can share the TXOP to transmit RTA frames from non-primary ACs only when all the frames from the primary AC have been transmitted or when the STA transmits MU PPDU. When frames from a lower priority non-primary AC are included in MU DL MIMO PPDU (or VHT MU PPDU) with the TXVECTOR parameter NUM_USERS greater than one, these frames do not increase the duration of the PPDU beyond that required for the transmissions of the frames of the primary AC and any frames from a high priority AC. When frames from a higher or lower priority non-primary ACs are included in HE MU PPDU by an AP, those frames do not increase the duration of the HE MU PPDU beyond that required for the transmissions of the frames of the primary AC and any frames from a high priority AC. For a given user in the VHT/HE MU PPDU, any frames from the primary AC shall be transmitted first, then any frames from a higher priority AC immediately next.

3. Problem Statement

Current wireless communication systems using EDCA do not identify RTA frames and non-RTA frames, and all packets use the same TXOP sharing rule. Toward reducing latency the present disclosure describes mechanisms which provide STAs the flexibility to use specific TXOP sharing mechanism for RTA packets.

4. Contribution of this Invention

By utilizing the present disclosure STAs are able to share the TXOP of the primary AC to transmit RTA frames when there are frames from the primary AC not being transmitted. In at least one preferred embodiment, the disclosed protocol takes "fairness" (equitable use of the channel) into account between transmitting frames of the primary AC and transmitting the RTA frames from the non-primary ACs.

5. Embodiment

5.1. STA and MLD Hardware Configuration

Figure 17:
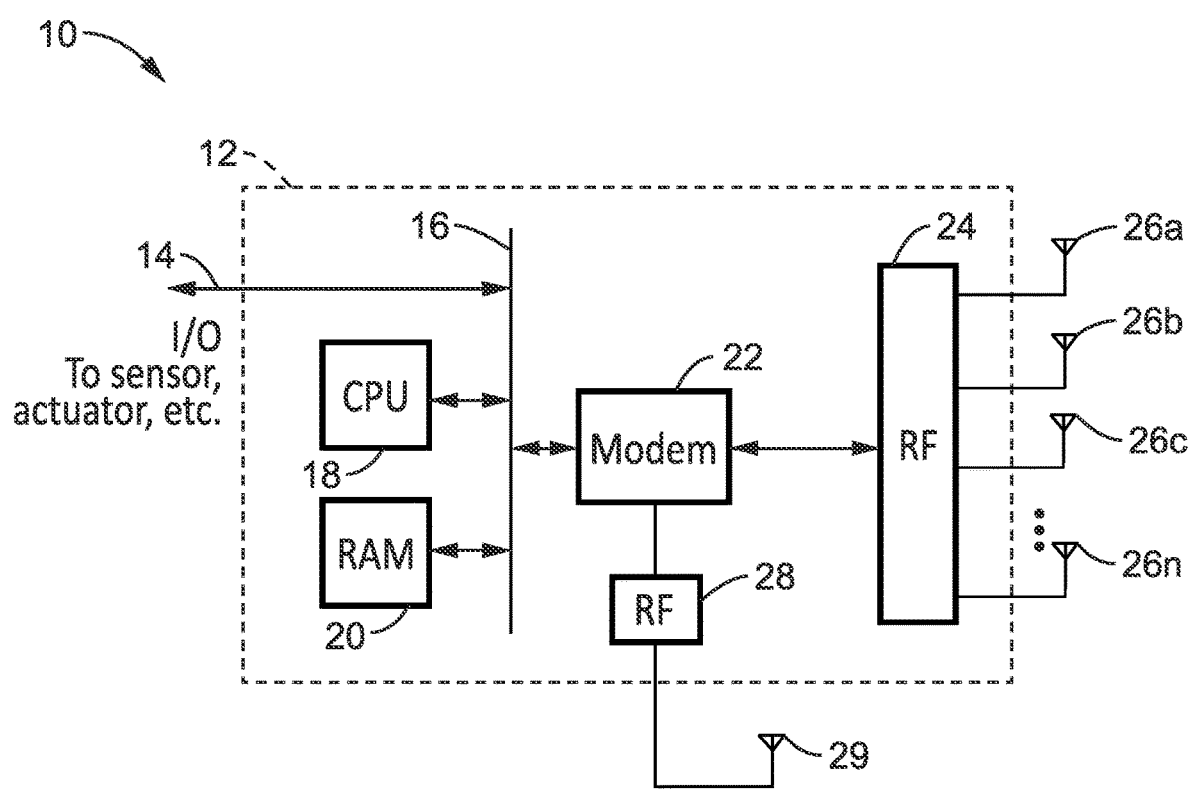
FIG. 17 is a hardware block diagram of wireless station hardware according to at least one embodiment of the present disclosure.

FIG. 17 illustrates an example embodiment 10 of STA hardware configured for executing the protocol of the present disclosure. An external I/O connection 14 preferably couples to an internal bus 16 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee and so forth), depending on what role it is performing in the current communication context. Thus, the STA HW is shown configured with at least one modem, and associated RF circuitry for providing communication on at least one band, such as the sub-6 GHz band, and/or a mmW band.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 18:
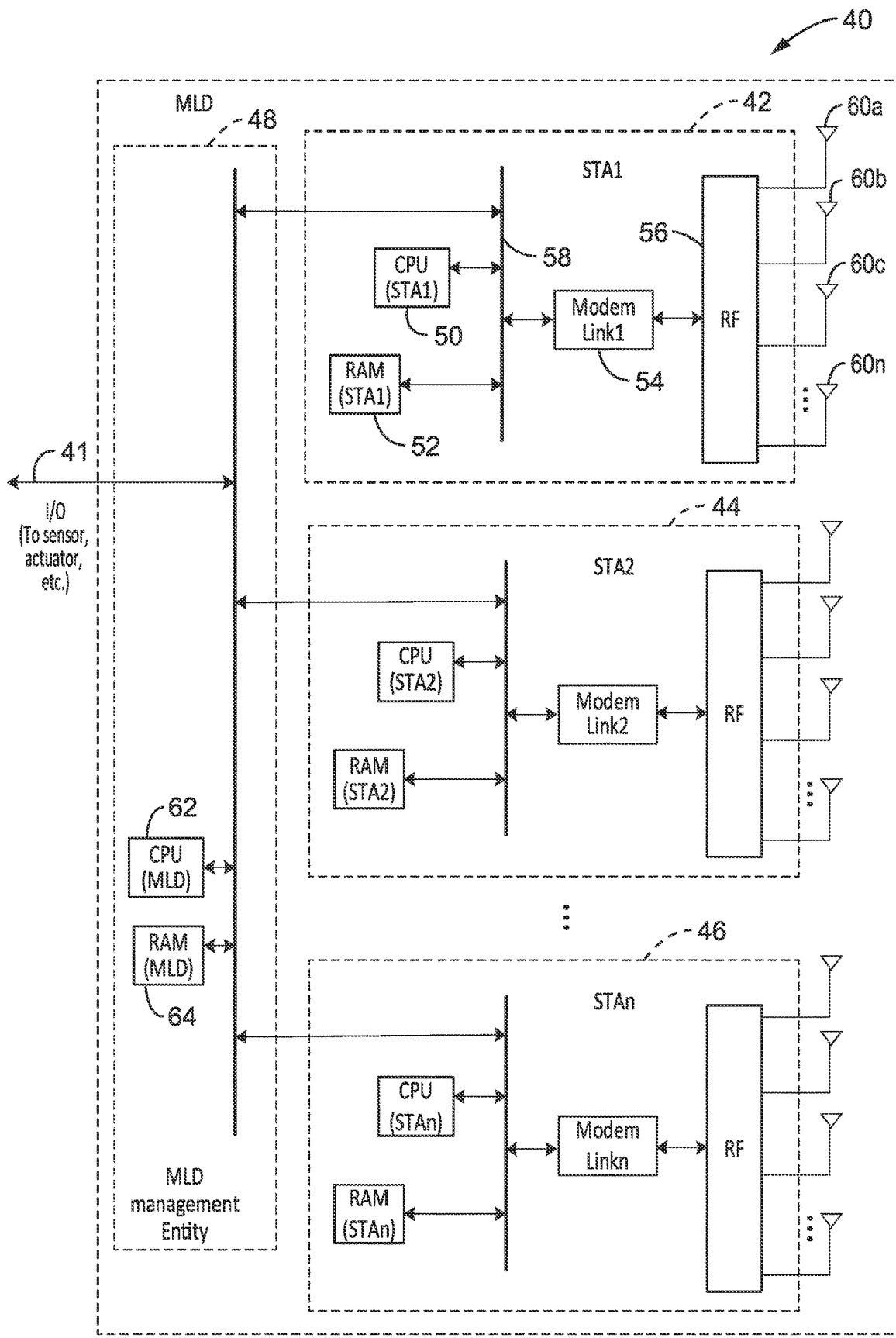
FIG. 18 is a hardware block diagram of a station configuration, such as contained in Multi-Link Device hardware, according to at least one embodiment of the present disclosure.

FIG. 18 illustrates an example embodiment 40 of a Multi-Link Device (MLD) hardware configuration. Multiple STAs are affiliated with an MLD, with each STA operating on a link of a different frequency. The MLD has external I/O 41 access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected STA 1 42, STA 2 44 through to STA N 46 and share information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas 60a, 60b, 60c through 60n. The present disclosure is primarily interested in the sub-6 GHz band with omni-directional antennas. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

5.2. STA Topology for Consideration

To better explain the goals of the disclosed technology, a network scenario is utilized in the examples.

Figure 19:
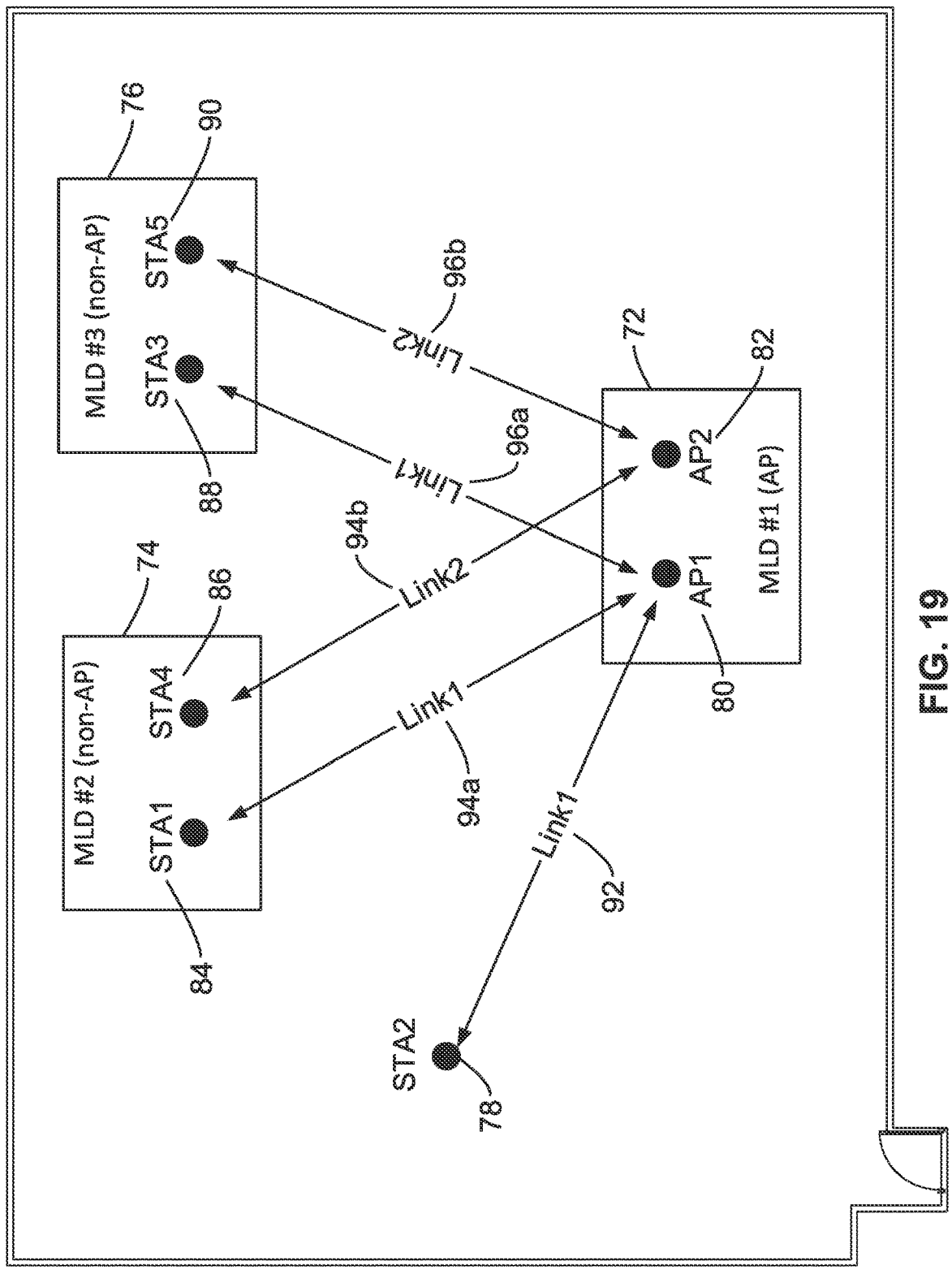
FIG. 19 is a topology of a WLAN having seven STAs, six of which are within three MLDs according to at least one example of the present disclosure.

FIG. 19 illustrates an example embodiment 70 of a topology (network scenario), given by way of example and not limitation. The topology is provided solely to explain the goals of the proposed technology, not to limit it to a specific STA configuration. In this example topology it is assumed that there are 7 stations (STAs) in an area (e.g., exemplified as a meeting room), 6 of them associated with 3 MLDs 72, 74 and 76. AP1 80 and AP2 82 are affiliated with multi-link device (MLD) #1 72, STA1 84 and STA4 86 are affiliated with MLD #2 74, and STA3 88 and STA5 90 are affiliated with MLD #3 76. STA2 78 may for example be a non-AP STA operating on Link1 92 or a single link MLD (i.e., a special MLD which only has one STA and operates on one link). STA1, STA2, and STA3 are associated with AP1 over Link1 94a and 96a; and STA4 and STA5 are associated with AP2 over Link2 94b and 96b.

Each STA and its associated AP can communicate with each other. It should be noted that it is also possible that two BSSs are considered as the same BSS since the two APs of the two BSSs are affiliated with the same MLD. In the example it is considered that all STAs use EDCA for random channel access on all the links.

5.3. Differentiating RTA Traffic from Non-RTA Traffic

5.3.1. Low Latency Traffic Stream (LLTS) Operation

In this section, a mechanism called low latency traffic stream (LLTS) is introduced to differentiate RTA traffic and non-RTA traffic. In general, LLTS can be utilized to differentiate between a traffic stream with special QoS requirement, such as latency, jitter, and/or reliability from other traffic.

Often, a RTA generates traffic periodically as connection-oriented communication between STAs which is referred to herein as an RTA session. It is possible that the STA can have multiple RTA sessions in the network. The STA is able to manage those RTA sessions properly and apply the proper transmission scheme to the RTA packets of an RTA session. By way of example and not limitation, a low latency traffic stream (LLTS) can be utilized for identifying RTA traffic of an RTA session from the upper layer.

Figure 20:
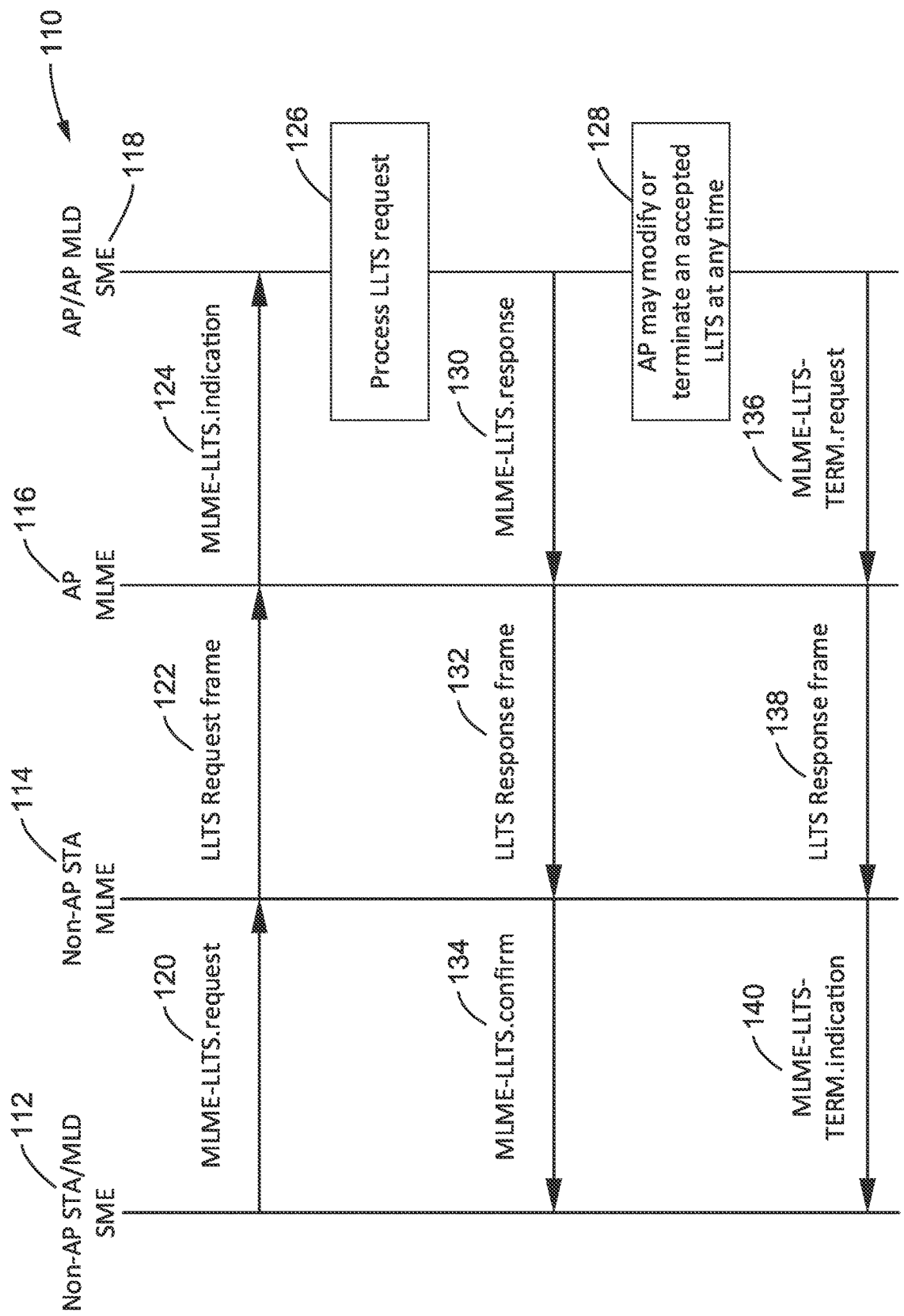
FIG. 20 is a communication diagram of terminating or modifying an LLTS according to at least one example of the present disclosure.

FIG. 20 illustrates an example embodiment 110 of terminating or modifying an LLTS; it will also be appreciated that the process can be utilized for other LLTS operations including changing or removing an LLTS. The interworking model of the STAs can be the same as defined in IEEE 802.11 standard. It is also possible that the originator can be either an AP or non-AP STA, and the recipient can also be either an AP or non-AP STA. To simplify the description, the originator in this example is assumed to be a non-AP STA and the recipient is an AP during the LLTS setup procedure of this section. The figure shows the SME 112 and MLME 114 of the non-AP STA and the MLME 116 and SME 118 of the AP.

The non-AP STA or MLD decides to initiate a LLTS setup procedure with the AP or AP MLD. The Station Management Entity (SME) of the non-AP STA or MLD sends a MLME-LLTS.request message 120 (as shown in Table 3) to its MAC Sublayer Management Entity (MLME). When the MLME of the non-AP STA receives the MLME-LLTS.request message, it collects the information in the MLME-LLTS.request message and sends a LLTS request frame 122 to the AP. The MLME of the AP receives the frame and generates a MLME-LLTS.indication message 124 (as shown in Table 4) to its SME or the SME of its affiliated MLD.

Then, the SME of the AP processes 126 the LLTS request of the AP MLD and sends an MLME-LLTS.response message 130 (as shown in Table 5) containing LLTS setup result to its MLME. Then, the MLME of the AP sends an LLTS response frame 132 to the non-AP STA. The MLME of the non-AP STA receives the frame and sends an MLME-LLTS.confirm message 134 (as shown in Table 6) to its SME or the SME of its affiliated MLD. Then, from the information contained therein, the non-AP can ascertain (recognize or determine) whether the LLTS setup has been successful or not.

The AP or AP MLD can decide to modify or terminate 128 the LLTS with the non-AP STA or MLD. The SME of the AP or the SME of the AP MLD sends a MLME-LLTS-TERM.request message 136 (as shown in Table 7) to the MLME of the AP or the MLME of its affiliated AP. When the MLME of the AP receives the MLME-LLTS-TERM.request message, it collects the information in the MLME-LLTS-TERM.request message and sends a LLTS response frame 138 to the non-AP STA. The MLME of the non-AP STA receives the frame and generates a MLME-LLTS-TERM.indication message 140 (as shown in Table 8) to its SME. Then, the non-AP then recognizes that the LLTS is terminated or modified.

Figure 23:
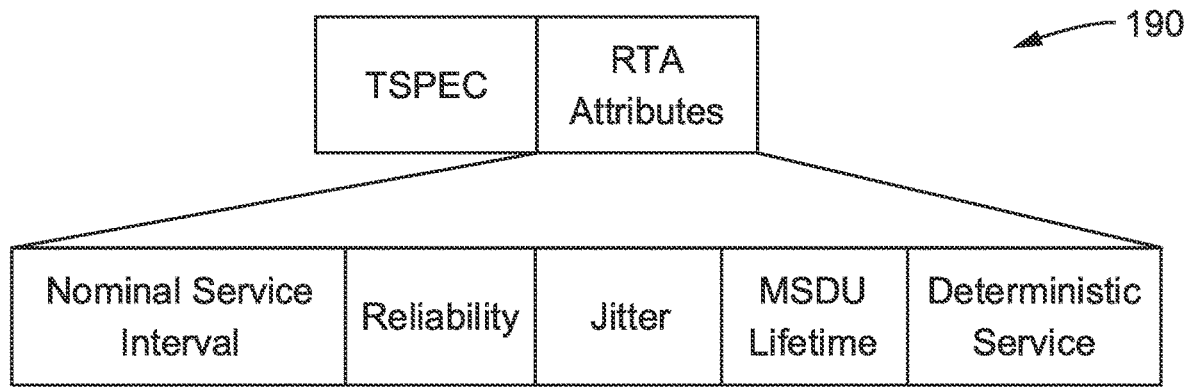
FIG. 23 is a data field diagram of RTA-TSPEC field contents according to at least one example of the present disclosure.

The RTA traffic of an RTA session can be classified by an LLTS setup. During the LLTS setup procedure the TCLAS element and TCLAS Process element are exchanged. The traffic from the upper layer is considered to be RTA traffic of an RTA session if the upper layer information of the traffic matches the information in the RTA-TSPEC element as shown in FIG. 23.

In at least one embodiment the QoS requirements of the traffic for an RTA session are shared between the AP and non-AP STA by exchanging an RTA-TSPEC element during the LLTS setup procedure. The LLTS setup can also be utilized to check whether the AP and non-AP STA have sufficient resources to support RTA traffic transmission.

It should also be noted that the LLTS request frame and the LLTS response frame for the same LLTS setup procedure can be transmitted over different links.

Figure 21:
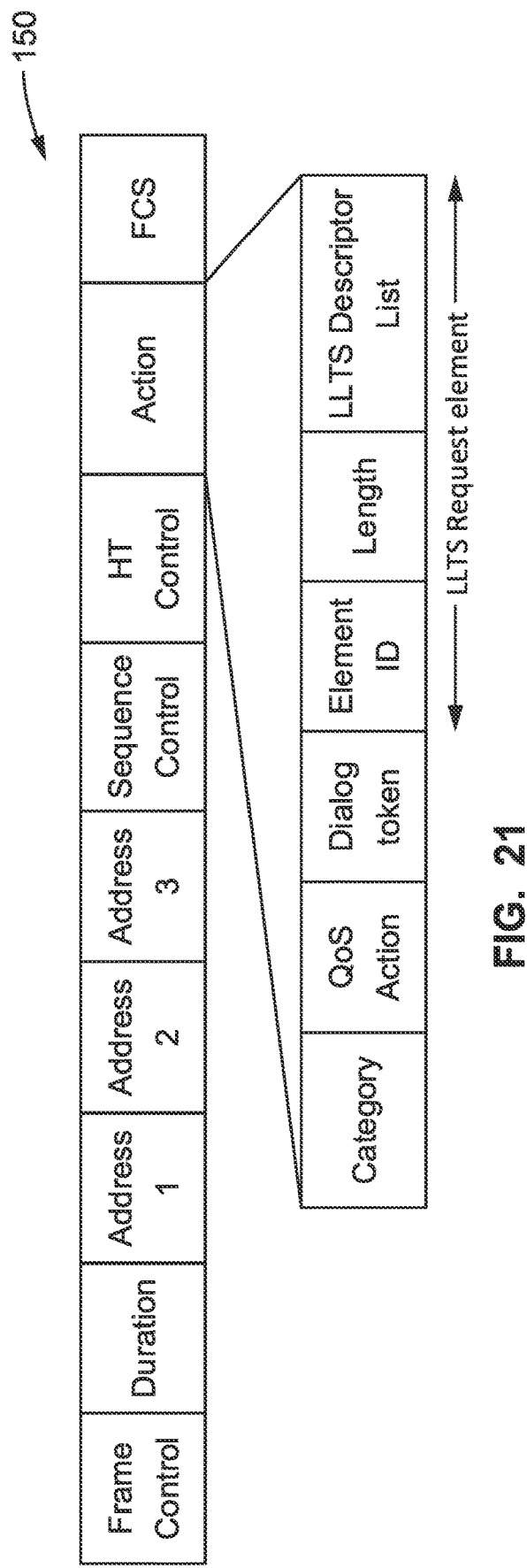
FIG. 21 is a data field diagram of an LLTS Request frame according to at least one example of the present disclosure.

FIG. 21 illustrates an example embodiment 150 of an LLTS Request frame format as utilized herein. A Frame Control field indicates the type of frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence control field indicates the sequence number of the frame. An HT control field contains extra control information for the frames. An Action field indicates the action to perform when it is the LLTS Request frame, and has subfields as outlined below.

A Category field and QoS Action field indicate the type of action field; in this case the action field indicates this is an LLTS request frame. A Dialog token field specifies the LLTS request transaction; and in at least one embodiment can be set to an integer to identify the LLTS request frame. When the receiver receives this token field, it should respond to the LLTS response frame with the same dialog token. The Action field includes an LLTS Request element, having subfields for Element ID indicating the type of element (present example indicates it is an LLTS Request element); a Length subfield indicates the length of the LLTS Request element; and an LLTS Descriptor List provides a sequence of the LLTS Descriptor fields. Each LLTS Descriptor field is set to indicate an LLTS setup request for the traffic under certain specification and classification information. When that information is received, the receiver STA which recognizes the specification and classification information of the traffic can decides to accept or reject the LLTS setup request.

Figure 22:
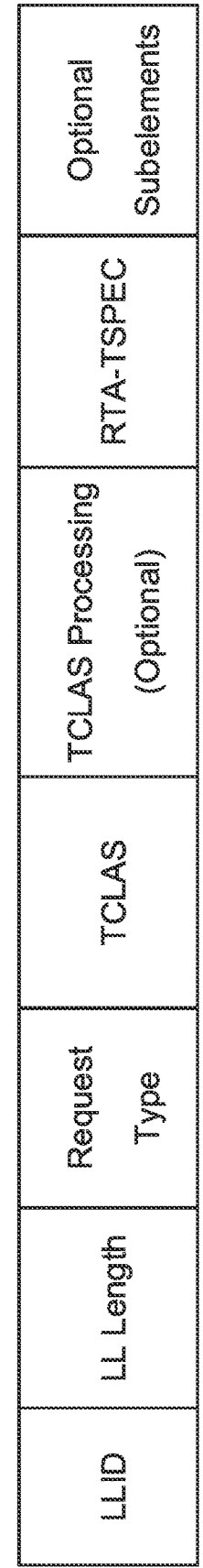
FIG. 22 is a data field diagram of an LLTS Descriptor field format according to at least one example of the present disclosure.

FIG. 22 illustrates an example embodiment 170 of an LLTS Descriptor field format. An LLID field provides identification of a low latency transmission service; within which the non-AP STA sets a number to represent the LLTS. The AP receives this number and can use it to identify the LLTS which is set by the non-AP STA. In at least one embodiment or mode, it is possible that this field is reserved by the non-AP STA and only the AP sets this field. This field can be a streamed classification service (SCS) ID as defined in IEEE 802.11. An LL Length field contains the length of the LLTS Descriptor field. A Request Type field is set to indicate the type of LLTS descriptor. When the non-AP STA or MLD sets the request type field to "Add", then the non-AP STA or MLD requests to add a new LLTS. The receiver AP or AP MLD should respond whether adding a new LLTS is accepted or not.

When the non-AP STA or MLD sets the request type field to "Change", then the non-AP STA or MLD requests to change an existing LLTS. When the AP or AP MLD receives this field, it can find the LLTS using the LLID. Then, the AP or AP MLD either accepts changing the parameters of that LLTS or rejects changing the LLTS.

When non-AP STA or MLD sets the request type to "Remove", then the non-AP STA or MLD requests to remove an existing LLTS. When the AP or AP MLD receives this field, it can find the LLTS using the LLID and remove the LLTS.

A TCLAS field is identical to the TCLAS element defined in IEEE 802.11. The STA or MLD sets this field to indicate the information of the traffic from the upper layer. The STA or MLD can use this information to identify the RTA traffic under this LLTS arriving from the upper layer when the traffic is downlink and the upper layer information of the traffic matches the TCLAS information. The LLTS Descriptor field can contain multiple TCLAS fields.

A TCLAS Processing field is identical to the TCLAS Processing element defined in IEEE 802.11. The non-AP STA sets this field to indicate the rule of using multiple TCLAS fields to identify the RTA traffic when there exists multiple TCLAS fields in the LLTS Descriptor field. When the AP receives this field in the LLTS Descriptor field, it will recognize that it can use multiple TCLAS fields to identify the traffic from the upper layer.

An RTA-TSPEC field is set by the non-AP STA to indicate the specification and the QoS requirement of the RTA traffic under the LLTS. When the AP receives this field, the AP can use the information in this field to decide whether to accept or reject the LLTS request. This field also contains the information of the traffic direction under this LLTS (e.g., uplink, downlink, peer to peer, or bidirectional). The AP can also indicate the channel resource that can be allocated for transmission of the RTA traffic under that LLTS.

An Optional Sub-elements field is set by the STA to indicate additional requests or information of the traffic under this LLTS. When the AP receives this field, it can make decisions to accept or reject the LLTS with consideration of the information in the optional sub-elements. Some examples of optional sub-elements are given in FIG. 24 and FIG. 25.

FIG. 23 illustrates an example embodiment 190 of RTA-TSPEC field contents. A TSPEC field can be identical to the TSPEC element defined in IEEE 802.11. A STA sets this field to indicate the TSID, the traffic characteristics, and the partial QoS requirement of the RTA traffic under the LLTS for the RTA traffic under this RTA-TSPEC. Some exceptions can be that the TS ID field in the TS Info field of the TSPEC element can be set to a value between 0 to 7, or 0 to 15, or 8 to 15.

A RTA Attributes field indicates the additional QoS requirement for RTA traffic under this RTA-TSPEC. It is possible that this field only appears with or in the TSPEC element when LLTS is implemented on both STA and AP.

A Reliability field is set by the STA to indicate packet loss requirement of the RTA traffic under this RTA-TSPEC. When the AP receives this field, it should then estimate resource distribution for the transmission of the RTA traffic under this RTA-TSPEC to ensure that the packet loss of the RTA traffic under this RTA-TSPEC is less than the packet loss indicated in the Reliability field.

The reliability field can be set to a value of the packet error rate of the RTA traffic under this RTA-TSPEC. Then the AP should ensure the packet error rate of the RTA traffic is not higher than the value set in the field after it accepts the LLTS of the RTA traffic. For example, if this field is set to 5%, then the AP can have at most 5 RTA frames that are transmission failures out of 100 RTA frames. If the AP is unable to guarantee this packet error rate level, it may reject the LLTS setup request.

Alternatively, the reliability field can also be set to a value of the packet delivery rate of the RTA traffic under this RTA-TSPEC. Then the AP should ensure that the packet delivery rate of the RTA traffic is not lower than the value set in the field after it accepts the LLTS of the RTA traffic. For example, if set this field to 95%, then the AP has to transmit at least 95 RTA frames successfully out of 100 RTA frames. If the AP is unable to guarantee this level of packet delivery rate, it may reject the LLTS setup request.

A Jitter field is set by the STA to indicate jitter requirements of the RTA traffic under this RTA-TSPEC. When the AP receives this field, it estimates the resource distribution for the transmission of the RTA traffic under this RTA-TSPEC to ensure that the jitter requirement of the RTA traffic under this RTA-TSPEC can be satisfied.

The Jitter field can be utilized in combination with the delay bound field in the original TSPEC element to indicate the average delay requirement of the RTA traffic under this RTA-TSPEC element. For example, if the delay bound field is set to 15 ms and the jitter field is set to 5 ms, then the average delay requirement of the RTA traffic under this RTA-TSPEC element is (the delay bound–the jitter)=15 ms–5 ms=10 ms. In one alternative method the average delay requirement of the RTA traffic under this RTA-TSPEC element is (the delay bound–the jitter/2)=15 ms–5 ms/2=12.5 ms. In order to satisfy the jitter requirement, the AP should ensure that the average delay of the RTA traffic under this RTA-TSPEC is less than the average delay requirement.

A MSDU Lifetime field represents the time that the MSDU can be stored at the queue. The STA sets this field to indicate the MSDU or A-MSDU lifetime of the RTA traffic under this RTA-TSPEC when the Deterministic Service field is set to a first state (e.g., "1"). When the STA receives this field and the Deterministic Service field is set to a first state (e.g., "1"), then the MSDU or A-MSDU will be dropped when the MSDU or A-MSDU is not transmitted successfully within its lifetime. When the Deterministic Service field is set to a second state (e.g., "0"), this field is reserved. It should be noted that this field may be replaced by the Delay Bound field in the TSPEC element.

A Deterministic Service field is set by the STA to indicate whether the MSDU of the RTA traffic under this RTA-TSPEC will be dropped when its lifetime expires. If the STA sets this field to a first state (e.g., "1"), then the MSDU of the RTA traffic under this RTA-TSPEC will be dropped when its lifetime expires. Otherwise the STA sets this field to a second state (e.g., "0"). When the STA receives this field which is set to a first state (e.g., "1"), then the MSDU of the RTA traffic under this RTA-TSPEC will be dropped when its lifetime, as indicated in the MSDU lifetime field, expires. When the STA receives this field which is set to "0", the MSDU lifetime field is reserved.

Figure 24:
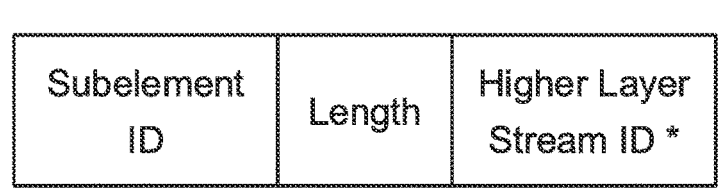
FIG. 24 is a data field diagram of an optional sub-element carrying higher layer stream ID according to at least one example of the present disclosure.

FIG. 24 illustrates an example embodiment 210 of an optional sub-element carrying higher layer stream ID. A Sub-element ID field contains the type of sub-element; which in this case indicates it is an optional sub-element under LLTS Request element. A Length field indicates the length of the optional sub-element field. A Higher Layer Stream ID field indicates the Higher Layer Stream ID from the higher layer. The STA sets this field in the frame so that the receiver of this field can map the current LLTS to the higher layer traffic flow.

Figure 25:
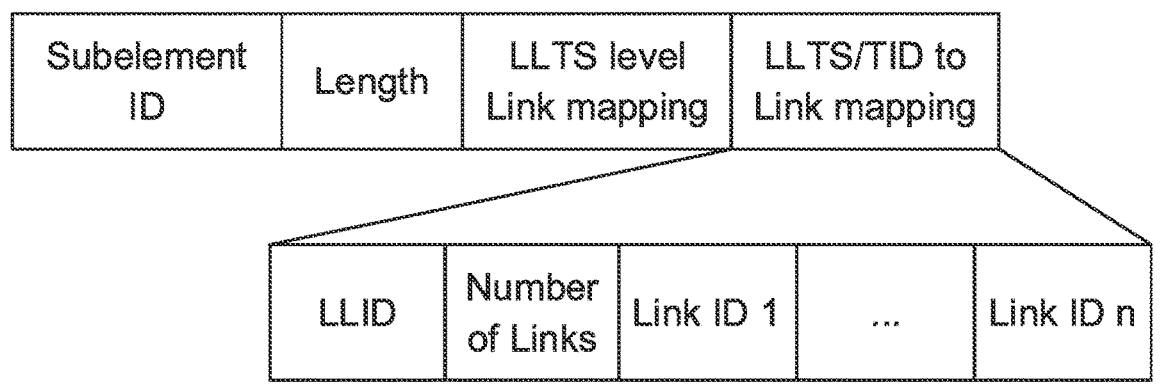
FIG. 25 is a data field diagram of an optional sub-element carrying LLTS/TID to Link mapping according to at least one example of the present disclosure.

FIG. 25 illustrates an example embodiment 230 of an optional sub-element carrying LLTS/TID to Link mapping. A Sub-element ID field indicates the type of sub-element, in this case indicating it is an optional sub-element under LLTS Request element. A Length field indicates the length of the optional sub-element field. An LLTS level link mapping field provides a mechanism for determining the type of link mapping to be used. In at least one embodiment this field may comprise a one bit indication. When this field is set to a first state (e.g., "1"), then the LLTS/TID to Link mapping field is for using an LLTS to link mapping, in which the LLTS in the mapping is the LLTS indicated in LLTS Descriptor field. When this field is set to a second state (e.g., "0"), then the LLTS/TID to Link mapping field is to use a TID to link mapping in which the TID is the TID of LLTS indicated in LLTS Descriptor field.

An LLTS/TID to Link mapping field indicates the LLTS/TID to link mapping. The STA sets this field to indicate the links that the traffic under the LLTS can be transmitted on. This field contains the following subfields.

An LLID field contains the identification of a low latency transmission service. The non-AP STA sets a number to represent the LLTS. The AP receives this number which can be utilized to identify the LLTS which is set with the non-AP STA. This field can identify a stream classification service (SCS) as defined in IEEE 802.11. A Number of Links field is set to indicate the number of Link ID fields in the LLTS/TID to Link mapping field. A Link ID field is set to indicate the Link that the traffic under the LLTS can be transmitted on. One or more Link ID fields can be utilized, with the example showing multiple (1–n) Link ID fields. STA can set this to suggest which links to transmit the traffic under this LLTS when the LLTS/TID to Link mapping is transmitted in the LLTS request frame.

Figure 26:
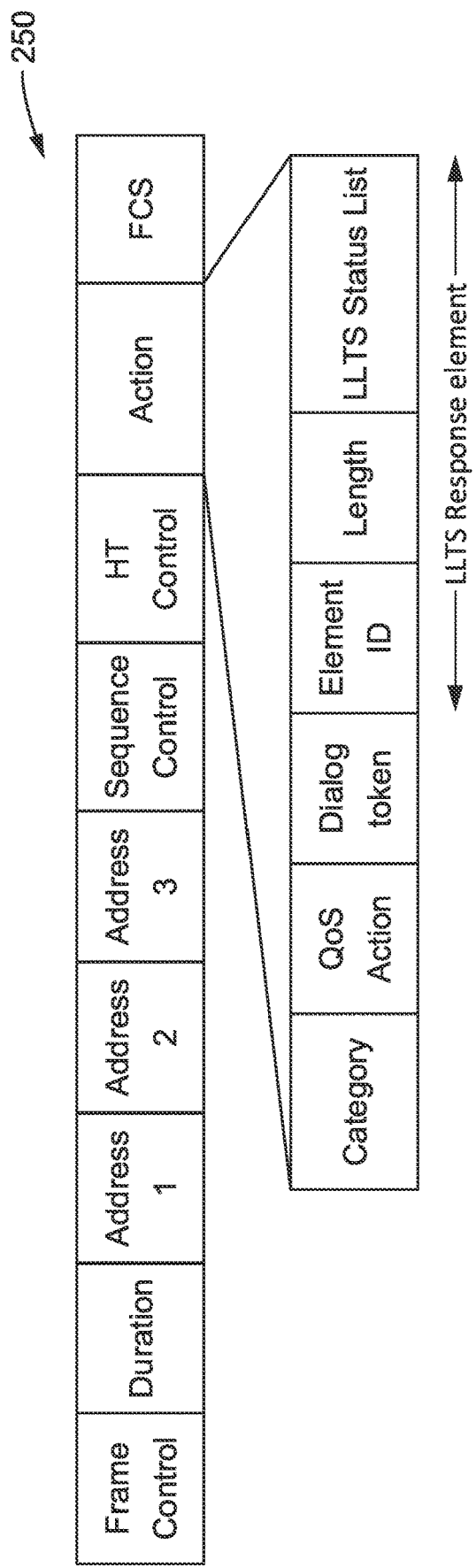
FIG. 26 is a data field diagram of an LLTS Response frame according to at least one example of the present disclosure.

FIG. 26 illustrates an example embodiment 250 of an LLTS Response frame. A Frame Control field indicates the type of frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence control field indicates the sequence number of the frame. An HT control field indicates extra control information for the frames. An Action field indicates the action to perform when it is the LLTS Response frame. The Action field contains the following subfields.

A Category subfield and QoS Action subfield indicate the type of action field, which in this case is in the LLTS Response frame. A Dialog token subfield specifies the LLTS response transaction, and in at least one embodiment can be set to an integer to identify the LLTS response frame. If the LLTS response frame is a response to an LLTS request frame, then this field should be set the same as in the LLTS request frame. When the receiver receives this field, it recognizes that the LLTS response frame is the response to the LLTS request frame with the same Dialog token.

The Action field also includes an LLTS response element. The format of the LLTS Request Element is as follows. An Element ID field indicates the type of element; which in this case indicates it is an LLTS Response element. A Length field indicates the length of the LLTS Response element. An LLTS Status List field contains a sequence of LLTS Status fields. Each LLTS Status field is set to indicate an LLTS setup response for the traffic under certain specification and classification information. Receipt of that information allows the receiver STA to determine the result of the LLTS setup for the RTA traffic or the change of the existing LLTS.

Figure 27:
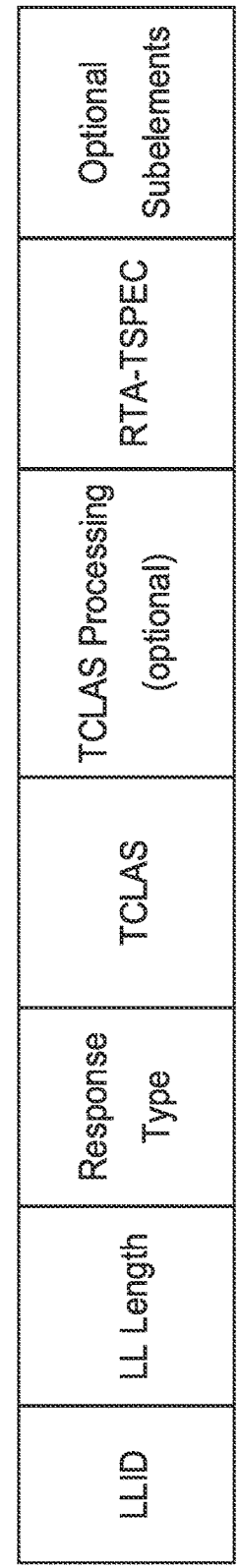
FIG. 27 is a data field diagram of an LLTS Status field according to at least one example of the present disclosure.

FIG. 27 illustrates an example embodiment 270 of an LLTS Status field. An LLID field contains an identification of a low latency transmission service. An LL Length field contains the length of the LLTS Status field. A Response Type field is set to indicate the type of LLTS setup result. When the AP sets the response type field to "Accept", then the AP accepts the LLTS setup request from the non-AP STA. The non-AP STA upon receiving this field can determine if the LLTS setup was successful. When the AP sets the response type field to "Modified", then the AP modifies an existing LLTS with non-AP STA. Upon receiving this field the non-AP STA can determine the LLTS with the corresponding LLID has been modified by the AP. The non-AP STA can accept the modification or launch another LLTS to negotiate that AP. When the AP sets the response type field to "Denied", then the AP rejects the LLTS setup request from the non-AP STA. When the non-AP STA receives this field, it may be able to initiate another LLTS setup with AP. When the AP sets the response type to "Terminate", then the AP terminates an existing LLTS with the non-AP STA. Upon receiving this field the non-AP STA will recognize that the LLTS with the corresponding LLID is terminated and that the LLTS should be removed. It should be noted that this field may be identical to the Status Code field as defined in IEEE 802.11.

A TCLAS field can be identical to the TCLAS element defined in IEEE 802.11. The AP sets this field to indicate the information of the traffic from the upper layer. When the non-AP STA receives this field, it can use this information to identify the traffic under this TTLS arriving from the upper layer when the traffic is uplink. The LLTS Status field may contain multiple TCLAS fields.

A TCLAS Processing field can be identical to TCLAS Processing element defined in IEEE 802.11. The AP sets this field to indicate the rule of using multiple TCLAS fields to identify the RTA traffic when there exists multiple TCLAS fields in the LLTS Status field. When the non-AP STA receives this field in the LLTS Status field, it can determine how to use multiple TCLAS fields to identify the traffic from the upper layer.

A RTA-TSPEC field can be identical to RTA-TSPEC element defined in FIG. 23. The AP sets this field to indicate the specification and QoS requirement of the RTA traffic. When the non-AP STA receives this field, it recognizes the decision of the LLTS is made for the traffic under the RTA-TSPEC. This field also contains the information of the RTA traffic direction under this LLTS (e.g., uplink, downlink, peer to peer, or bidirectional). The AP can also indicate the channel resource that can be allocated for transmission of the RTA traffic of that LLTS.

An Optional Sub-elements field is set by the AP to indicate additional information or setting of the traffic under this LLTS. Some examples of optional sub-elements were given in FIG. 24 and FIG. 25.

5.3.2. Differentiation of RTA Traffic

Figure 28:
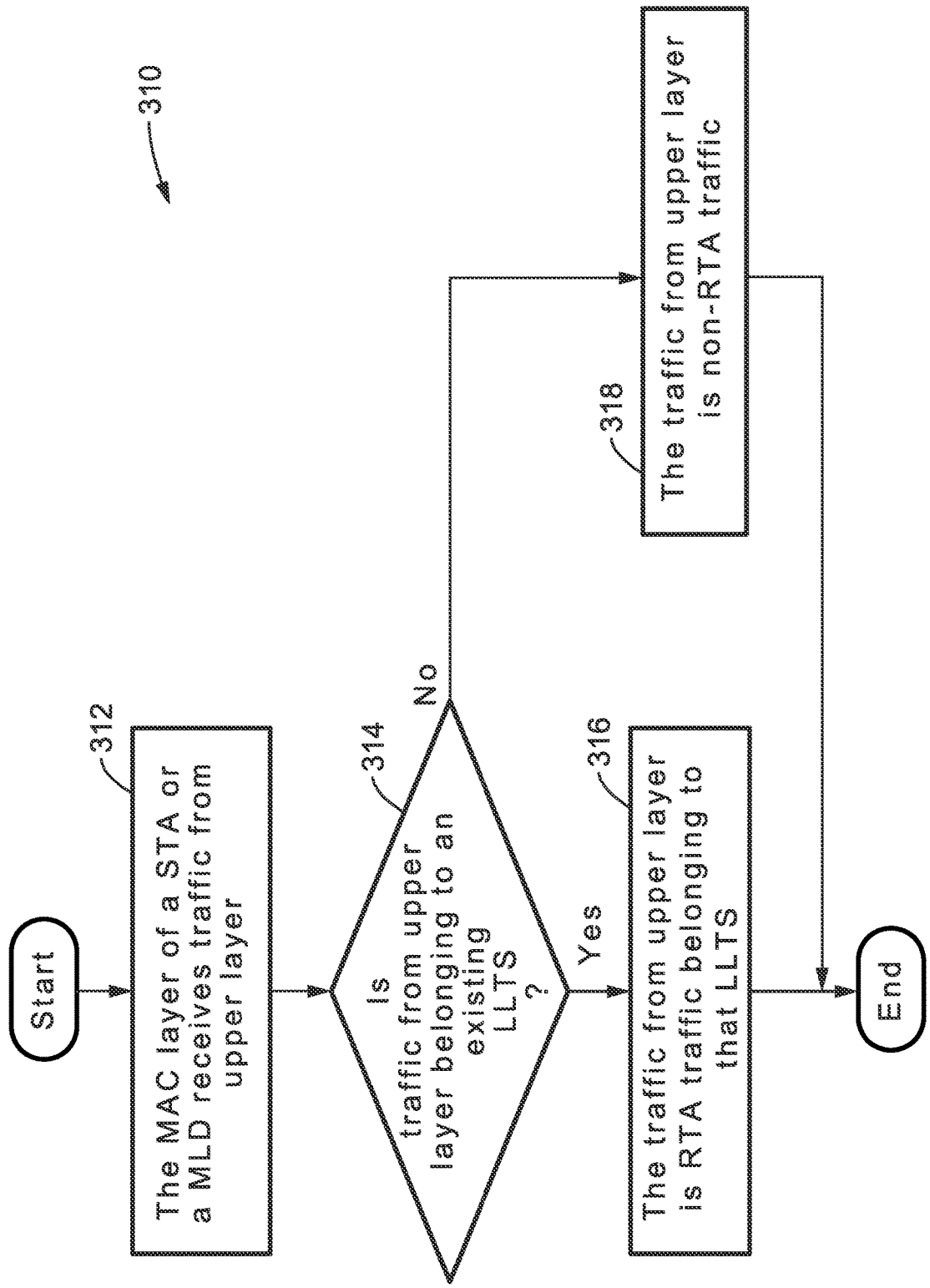
FIG. 28 is a flow diagram of differentiating RTA traffic and non-RTA traffic according to at least one example of the present disclosure.

FIG. 28 illustrates an example embodiment 310 of differentiating RTA traffic and non-RTA traffic. When the MAC layer of a STA or a MLD receives 312 traffic from upper layer, a check is made to determine 314 if the traffic from the upper layer belongs to an existing LLTS. If the traffic is from the upper layer belonging to an existing LLTS then it is registered at block 316 that the traffic is RTA traffic belonging to that LLTS. Otherwise, if the traffic from the upper layer did not belong to an existing LLTS, then it is registered at block 318 that the traffic is non-RTA traffic.

5.3.3. Examples of LLTS

Table 9 gives an example of LLTSs (e.g., LLTS1 through LLTS6). In the table the originator column represents the STA or MLD which launches the LLTS setup procedure, i.e., transmits the LLTS request frame. The recipient column represents the STA or MLD which receives the LLTS request frame and transmits LLTS response frame. For example, the second row in the table represents a LLTS, for example LLTS1, with LLID equal to one. The originator of that LLTS is STA2 and the recipient can be AP1 or MLD1. The direction column is in regard to the direction of the LLTS. If it is a downlink, then the RTA traffic under that LLTS will be transmitted from AP1 (or MLD1) to STA2; otherwise if it is an uplink then it is in the opposite direction, which is exemplified as having a TID of that LLTS as 8 and the user priority (UP) of 6. The Links column indicates which link the traffic under this LLTS will be transmitted through (e.g., Link1 and/or Link2).

A STA can identify an LLTS by the tuple of LLTS information, such as <LLID, originator>, <LLID, recipient>, or <LLID, originator, recipient>. It is also possible that the AP or AP MLD uses a unique LLID for each LLTS in its BSS so that each STA can utilize LLID to identify the LLTS in the BSS by LLID only, or could use the tuple of <LLID, BSSID> to identify the LLTSs in the BSS and OBSS.

5.4. TXOP Sharing to Transmit RTA Packets

5.4.1. Flowcharts

This section explains the procedure of TXOP sharing to transmit RTA frames from the non-primary ACs. Compared with the current TXOP sharing rule in IEEE 802.11ax, the disclosed technology allows a STA to share its TXOP of the primary AC to transmit RTA frames from non-primary ACs even if there are frames from the primary AC that have not been transmitted.

Figure 29:
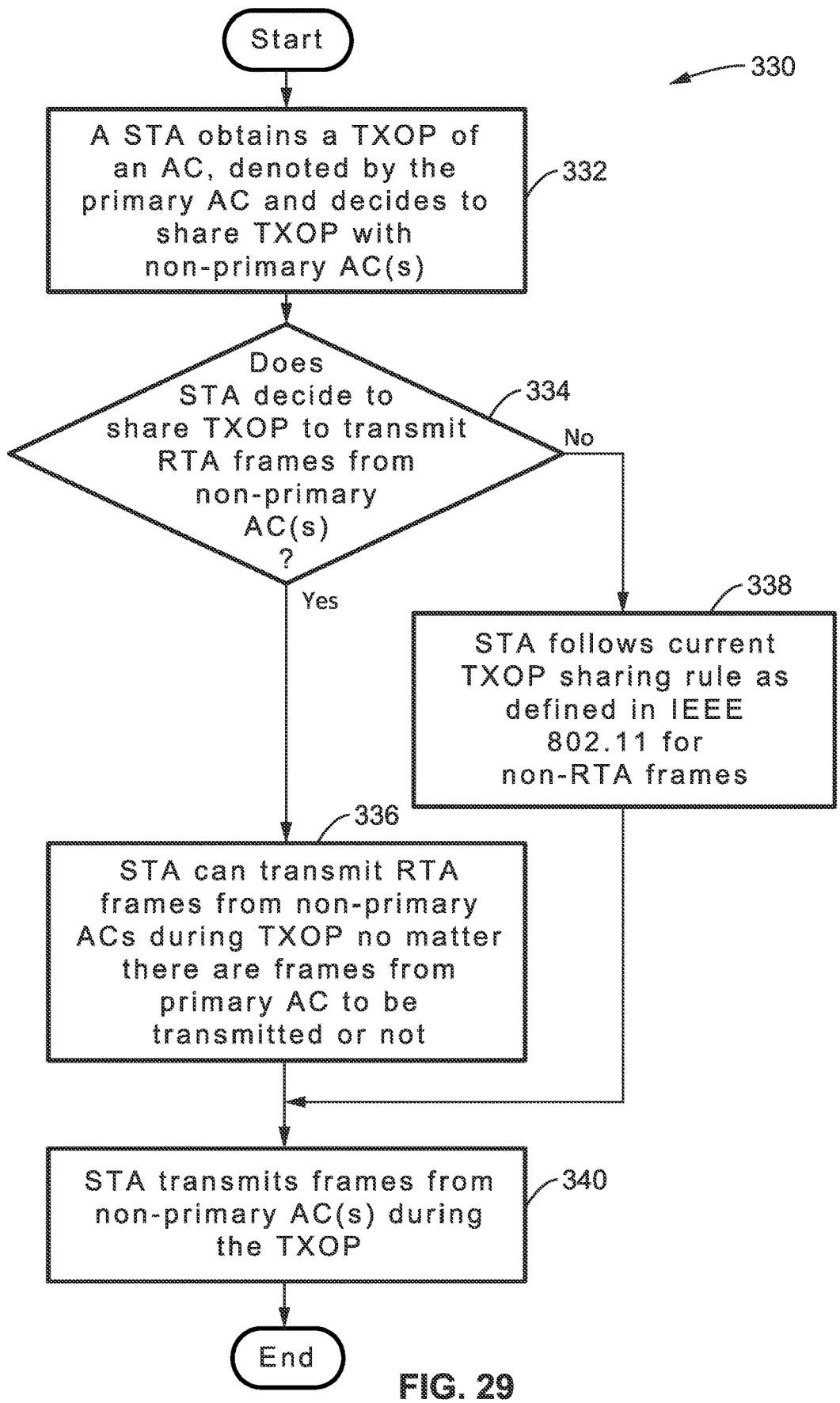
FIG. 29 is a flow diagram of TXOP sharing to transmit RTA traffic from non-primary AC works according to at least one example of the present disclosure.

FIG. 29 illustrates an example embodiment 330 of TXOP sharing to transmit RTA traffic from a non-primary AC. When RTA traffic arrives at an EDCA queue, it will be encapsulated in terms of frames. The frames carrying RTA traffic are denoted by RTA frames and the frames carrying non-RTA traffic are denoted by non-RTA frames. One or more frames can be included in one packet and be transmitted over links or channels. The AC associated with the EDCAF that gains a TXOP is referred to as the primary AC.

When a STA obtains 332 a TXOP of the primary AC, a decision 334 is made on whether or not to share the TXOP to transmit frames from non-primary ACs during the TXOP.

If the STA decides not to share the TXOP to transmit non-RTA frames from non-primary ACs, then at block 338 it can follow the current TXOP sharing rules as defined in IEEE 802.11ax, before it transmits frames 340.

Otherwise, if the STA decides to share its TXOP to transmit RTA frames from non-primary ACs, it can transmit 336 RTA frames from non-primary ACs even if there are frames from the primary AC that have not been transmitted. Then at block 340 the STA transmits frames from non-primary AC(s) during the TXOP.

The following should be noted if the station decides to share its TXOP to transmit RTA frames from non-primary ACs. The non-primary ACs in block 336 may only represent those ACs which have higher priority than the primary AC. RTA frames from non-primary ACs in this case may only represent those frames that are expiring (for example, this frame will be expired before the end of the TXOP).

During the TXOP, the following sequences are possible.

(1) The STA shall/may transmit all/some RTA frames from the non-primary ACs first, and then the frames from the primary ACs. The STA for example may follow any one of the following rules. (a) The RTA frames from the non-primary AC which has higher priority than the primary AC shall/may be transmitted first, then the frames from the primary AC immediately next. (b) The RTA frames from the primary AC shall/may be transmitted first, then the RTA frames from the non-primary AC which has higher priority than the primary AC, and next the non-RTA frames from the primary AC. (c) The RTA frame(s) from the non-primary AC which are retransmission(s) and has higher priority than the primary AC shall/may be transmitted first, then the frames from the primary AC immediately next.

(2) The STA may transmit RTA frames from the non-primary ACs which have lower priority than the primary AC only as per the following. (a) Those RTA frames are expiring (for example, this frame will be expired before the end of the TXOP), and/or (b) all the frames from the primary AC have been transmitted, and/or (c) that low priority AC shared its TXOP with the primary AC before. For example, in case (2) (c) that low priority AC shared its TXOP with the primary AC in the current periodic time, such as the beacon interval.

It is possible that the TXOP sharing time with that low priority AC shall not be longer than the TXOP time that the low priority AC shared with the primary AC during the current periodic time.

(3) The STA treats the RTA frames from the non-primary ACs, which has higher priority than the primary AC, as they were from the primary AC. Furthermore, it is possible that the STA treats the RTA frames from the non-primary ACs, which has higher priority than the primary AC, as they were RTA frames from the primary AC.

(4) When the STA transmits MU PPDU (e.g., MU PPDU for MU-MIMO or MU-OFDMA), RTA and non-RTA frames from higher or lower priority non-primary AC may be included in the MU PPDU.

(a) The duration of the MU PPDU may be determined by the transmission and latency requirement of certain frames in the MU PPDU. When other frames are included in the MU PPDU, they shall not increase the duration of the MU PPDU beyond that requirement. For example, the certain frames can be as follows: (i) frames or RTA frames only from the primary AC, and/or (ii) RTA frames from all non-primary ACs, or from non-primary ACs which have higher priority than the primary AC, or from a non-primary AC which has the highest priority in the MU PPDU.

(b) For a given user (i.e., receiver STA of the MU PPDU), RTA frames from a non-primary AC which have higher priority than the primary AC shall/may be transmitted earlier than frames from the primary AC. For example, (i) any RTA frames from the primary AC shall/may be transmitted first, then any RTA frames from a higher priority AC, next any non-RTA frames from the primary AC. (ii) Any RTA frames from a higher priority AC shall/may be transmitted first, then any frames from the primary AC immediately next. (iii) Any frames from the primary AC shall/may be transmitted first, and then any frames from a higher priority AC immediately next. (iv) Any frames with shorter expiration time (e.g., expiration time of MSDU lifetime) shall/may be transmitted first.

(5) The STA guarantees allocating some channel resource to transmit frames from the primary AC during the TXOP. For example, during the TXOP, as follows. (a) The STA shall not transmit frames from non-primary ACs until one or more frames from the primary AC have been transmitted. (b) The STA shall limit the duration of TXOP sharing to transmit RTA frames from non-primary ACs. For example, the STA limits the time (in terms of length, e.g., 0.3 ms, or ratio, e.g., 20% of TXOP duration) of TXOP sharing per TXOP or per periodic time (e.g., beacon interval). It is possible that the AP sets this time limit on its associated STAs. (c) The STA shall not transmit RTA frames from non-primary ACs until a certain amount of TXOP time, denoted by dedicated time (in terms of length, e.g., 0.3 ms, or ratio, e.g., 20% of TXOP duration), has been used for transmitting frames from the primary AC or all the frames (or all the RTA frames) from the primary AC have been transmitted. (d) The STA shall not transmit RTA frames from non-primary ACs until a certain amount of frames from the primary AC, such as for example denoted by a dedicated byte (e.g., in terms of bytes), have been transmitted or all the frames (or all the RTA frames) from the primary AC have been transmitted. (e) The STA shall follow the TXOP sharing rule as defined in IEEE 802.11ax for a certain period of time, denoted by a dedicated time (in terms of length, e.g., 0.3 ms, or ratio, e.g., 20% of TXOP duration), since the start time of TXOP.

(6) The STA treats the RTA frames from the non-primary ACs as if they were from the primary AC, during a special period of channel time, such as R-TWT SPs as defined in IEEE 802.11be.

5.4.2. Examples

This section provides multiple examples to explain how a STA shares a TXOP of the primary AC to transmit RTA frames from non-primary ACs. The network topology of these examples is shown in FIG. 19. The traffic classification process between RTA and non-RTA can be the same or similar to the LLTS operation as described Section 5.3 or any other traffic classification procedure. For the sake of example, let us here assume that each STA or MLD in the network topology has RTA traffic flows as shown in Table 9. It is possible that the traffic under a LLTS is queued in the EDCA queues according to the UP-to-AC mapping shown in Table 1. It should be noted that the UP of the traffic under the LLTS is indicated in the LLTS setup, such as the UP shown in Table 9.

Figure 30:
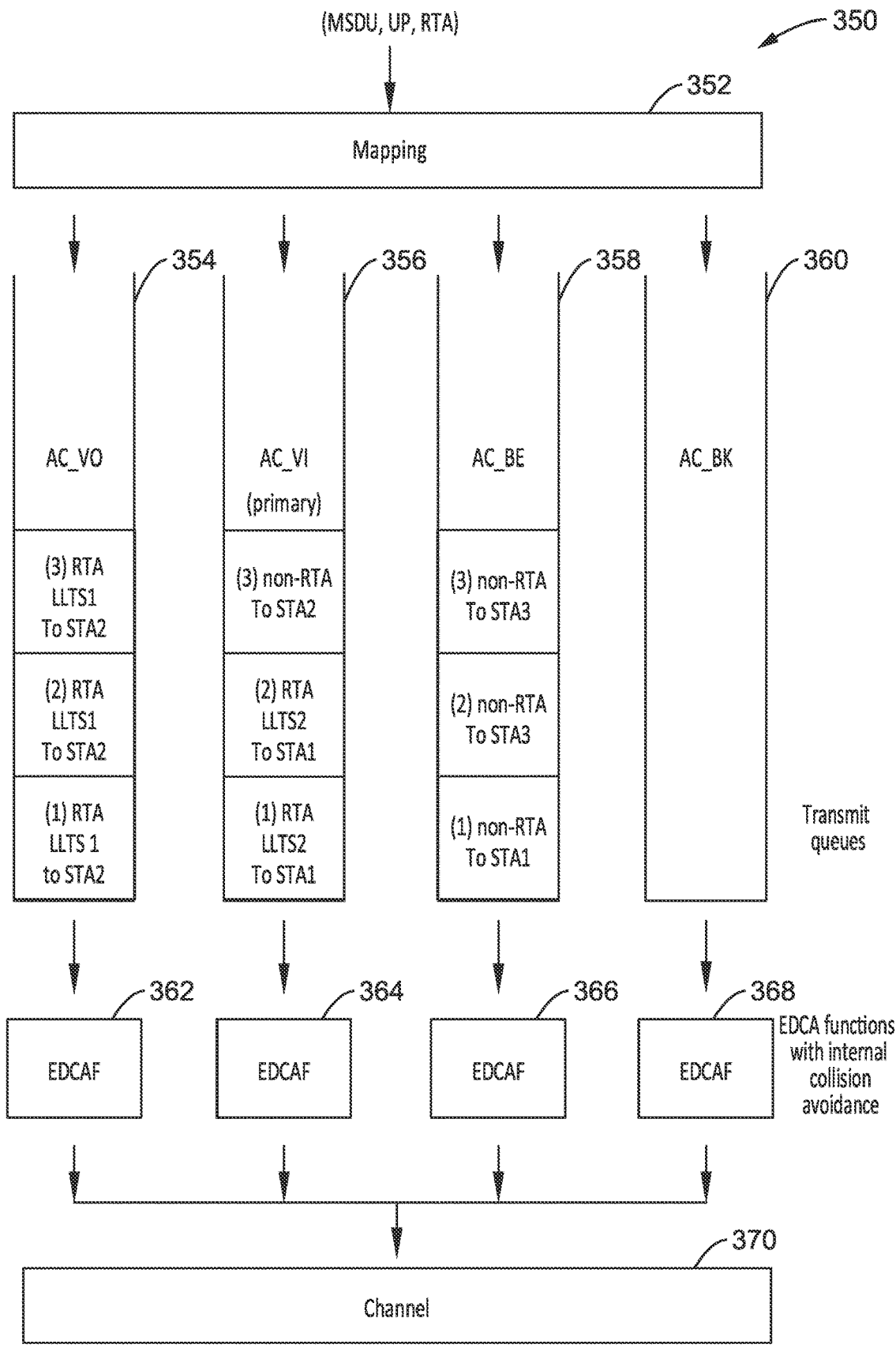
FIG. 30 is a transmission queue diagram for an EDCA queue of AP1 or MLD1 according to at least one example of the present disclosure.

FIG. 30 illustrates an example embodiment 350 of status for an EDCA queue of AP1 or MLD1. Frames (MSDU, UP, RTA) are shown being mapped 352 and placed into the queues.

An AC_VO queue 354 represents the EDCA queue of AC VO, which is exemplified here with three RTA frames under LLTS1, exemplified as AC_VO(1) through AC_VO(3).

An AC_VI queue 356 represents the EDCA queue of AC VI, which is shown as having two RTA frames under LLTS2, exemplified as AC_VI(1) and AC_VI(2), and one non-RTA frame exemplified as AC_VI(3).

An AC_BE queue 358 represents the EDCA queue of AC BE, which is shown with three non-RTA frames exemplified as AC_BE(1) through AC_BE(3).

An AC_BK queue 360 represents the EDCA queue of AC BK, which is exemplifies as being empty, with no frames in the queue.

The queues are shown connecting to the EDCAFs 362, 364, 366 and 368 which contend for channel 370.

Figure 31:
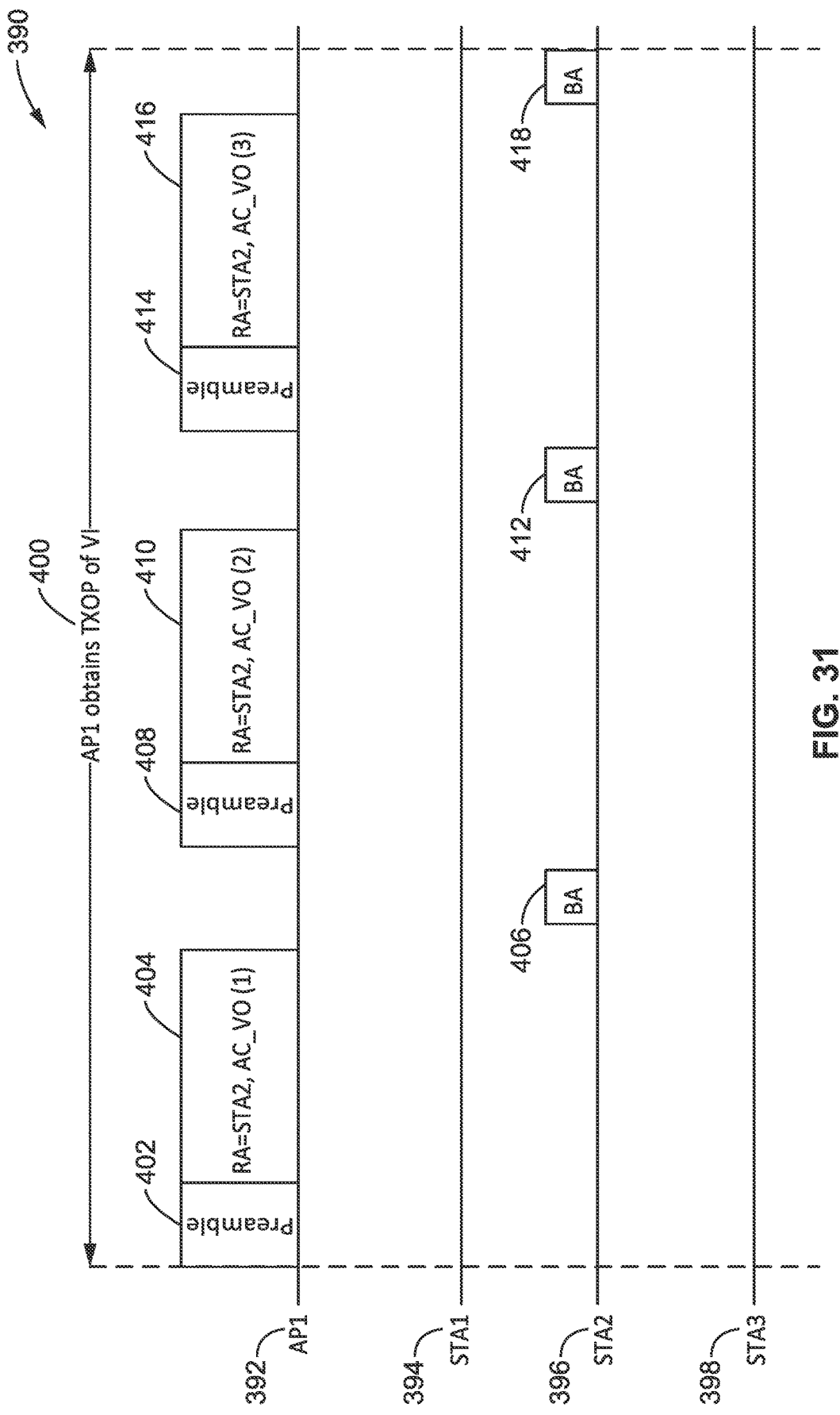
FIG. 31 is a communication diagram of AP1 transmitting RTA frames from non-primary AC only during the TXOP according to at least one example of the present disclosure.

FIG. 31 illustrates an example embodiment 390 of AP1 transmitting RTA frames from non-primary AC only during the TXOP. The figure depicts interaction between AP1 392, STA1 394, STA2 396 and STA3 396 during TXOP 400. The EDCA queue status of AP1 or MLD1 is shown in FIG. 30.

The example assumes that this is the queue status when AP1 starts an EDCA TXOP and there are no new frames arriving during the EDCA TXOP. If the queue status is of MLD1, then it is also assumed that MLD1 does not transmit on any other link during the TXOP shown in the example.

When AP1 obtains a TXOP 400 of VI, it transmits RTA frames, exemplified as AC_VO(1) 404, AC_VO(2) 410, and AC_VO(3) 416, with respective preambles 402, 408 and 414, to STA2, from the AC_VO queue. As shown in the example, AP1 only transmits RTA frames from the AC_VO queue during the TXOP. STA2 generates a block acknowledgement 406, 412, and 418 upon receiving each of these transmissions.

It should be noted that it is possible for AP1 to use RTS/CTS or MU-RTS/CTS to reserve the TXOP before transmitting frames.

Figure 32:
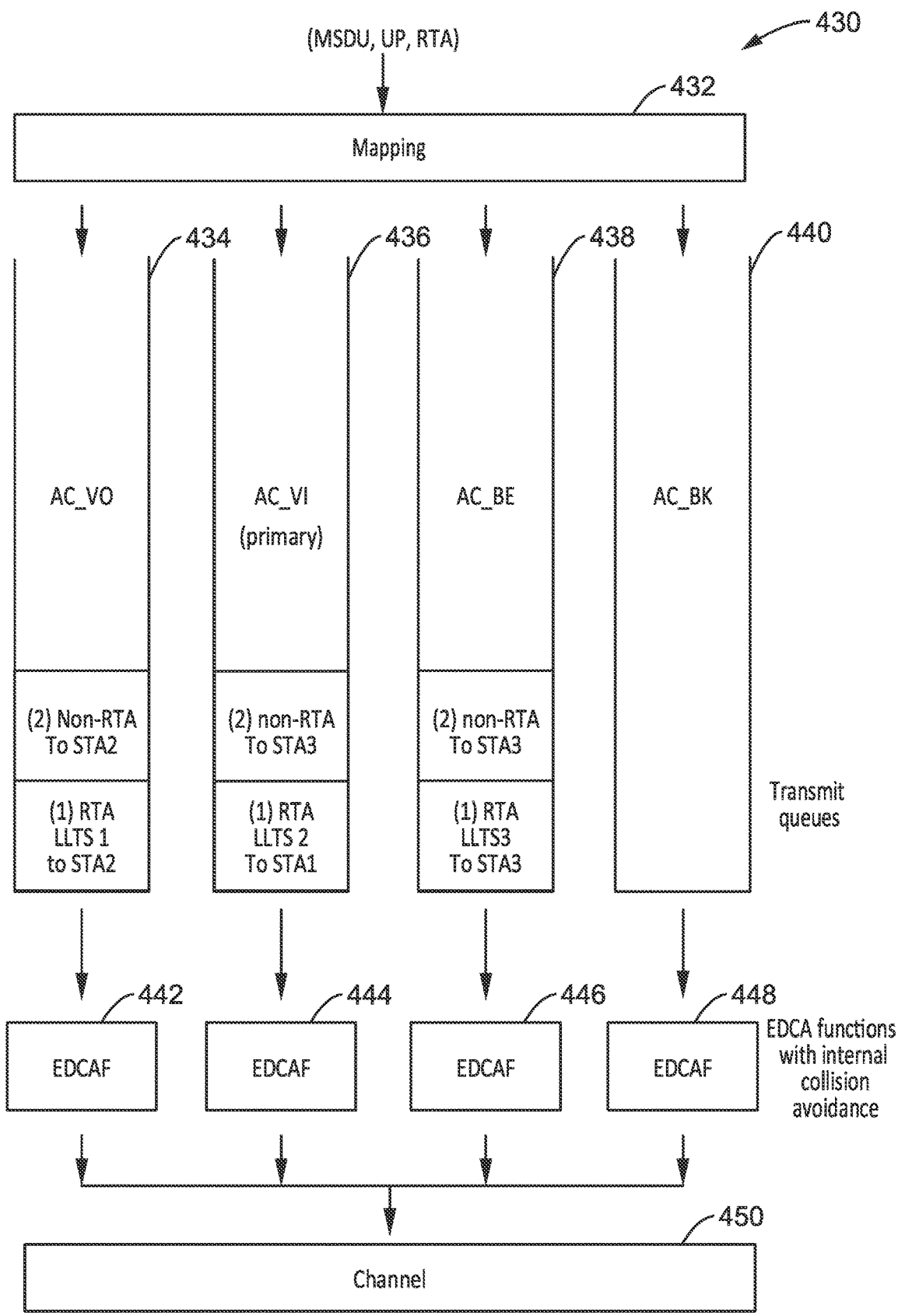
FIG. 32 is a transmission queue diagram of another EDCA queue status of AP1 or MLD1 according to at least one example of the present disclosure.

FIG. 32 illustrates an example embodiment 430 of another EDCA queue status of AP1 or MLD1. Frames are mapped 432 into the queues shown. As shown in the figure, the AC_VO queue 434 represents the EDCA queue of AC VO, which has one RTA frame under LLTS1 exemplified as AC_VO(1), and one non-RTA frame exemplified as AC_VO (2). The AC_VI queue 436 represents the EDCA queue of AC VI, which has one RTA frame under LLTS2 exemplified as AC_VI(1) and one non-RTA frame exemplified as AC_VI (2). The AC_BE queue 438 represents the EDCA queue of AC BE, which has one RTA frame under LLTS3 exemplified as AC_BE(1) and one non-RTA frame exemplified as AC_BE(2). The AC_BK queue 440 represents the EDCA queue of AC BK, which has no frames in the queue. The respective EDCA functions 442, 444, 446, and 448, shown beneath each queue, for obtaining and transmitting on Channel 450.

Figure 33:
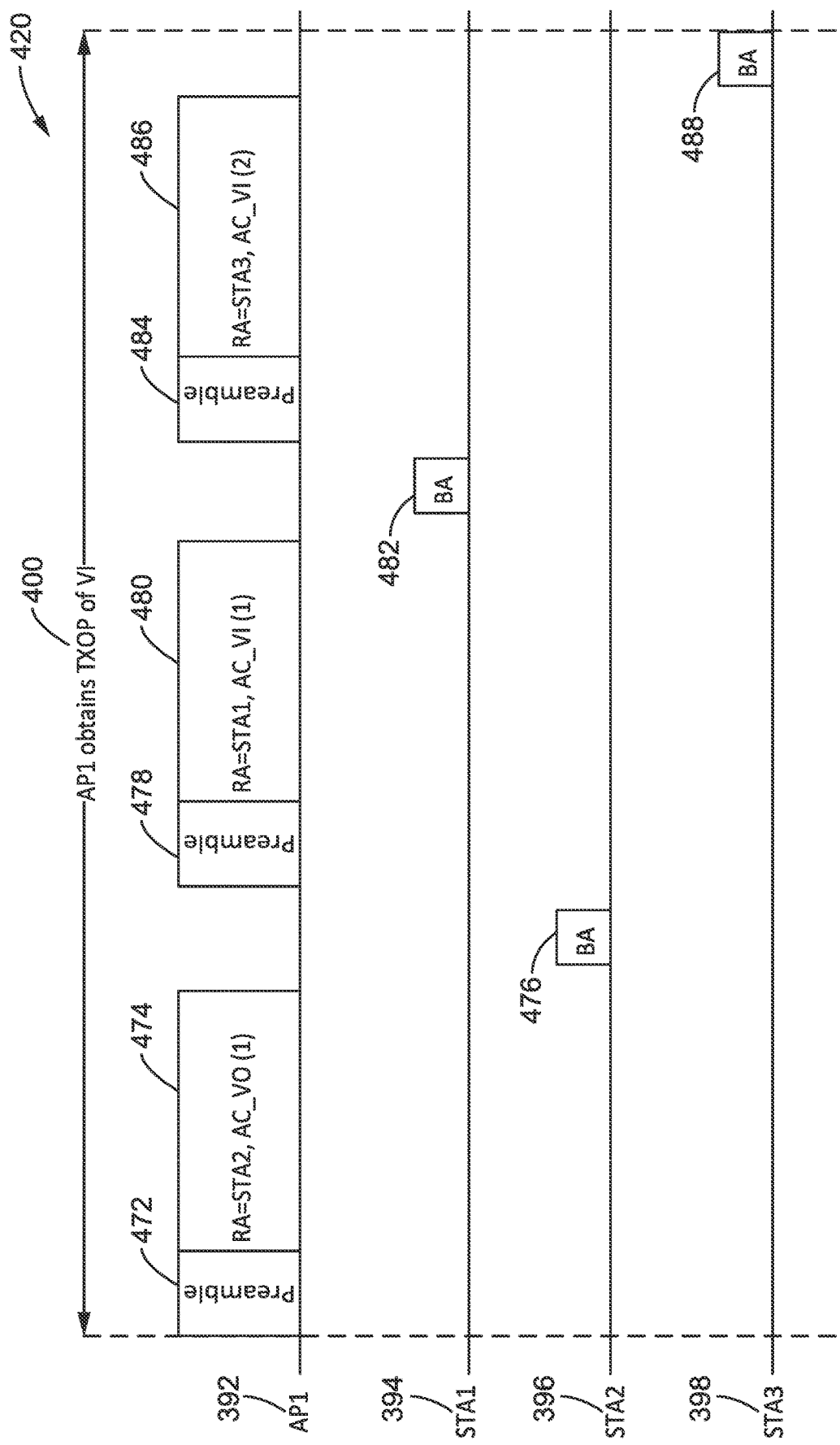
FIG. 33 is a communication diagram of AP1 transmitting RTA frames from a higher priority non-primary AC before the frame from the primary AC during the TXOP according to at least one example of the present disclosure.

FIG. 33 illustrates an example embodiment 470, of AP1 transmitting RTA frames from a higher priority non-primary AC before the frame from the primary AC during the TXOP. The figure depicts interaction between AP1 392, STA1 394, STA2 396 and STA3 396 during TXOP 400. The EDCA queue status of AP1 or MLD1 is shown in FIG. 32, and this example assumes this is the queue status when AP1 starts TXOP 400 and it is also assumed there are no new frames arriving during the TXOP. If the queue status is of MLD1, then it is also assumed that MLD1 does not transmit on any other link during the TXOP shown in the example.

When AP1 obtains TXOP 400 of VI, it first transmits RTA frames, exemplified as AC_VO(1) 474 from the AC_VO queue to STA2. Then, it transmits the RTA frame exemplified as AC_VI(1) 480 from the AC_VI queue to STA1, and then non-RTA frame exemplified as AC_VI(2) 486 from AC_VI queue to STA3. Each of these transmissions is shown with respective preambles 472, 478 and 484. The receiving stations are shown responding with a Block Acknowledgement (BA) 476, 482 and 488.

It should be noted that it is possible that AP1 may utilize RTS/CTS or MU-RTS/CTS to reserve the TXOP before transmitting frames.

Figure 34:
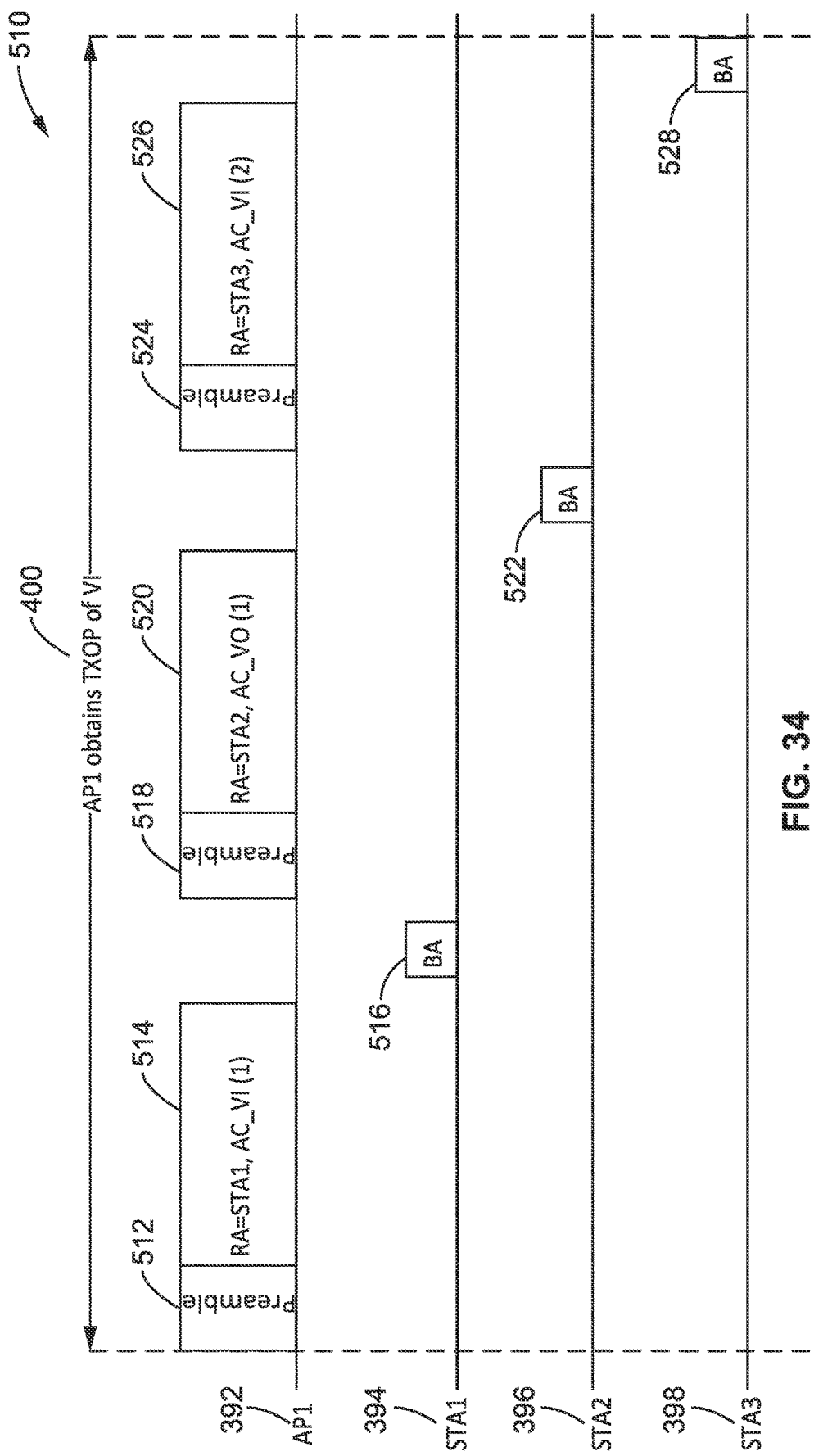
FIG. 34 is a communication diagram of AP1 transmitting RTA frames from the primary AC first, then the RTA frames from non-primary AC, next the non-RTA frames from the primary AC during the TXOP according to at least one example of the present disclosure.

FIG. 34 illustrates an example embodiment 510 of AP1 transmitting RTA frames from the primary AC first, then the RTA frames from non-primary AC, next the non-RTA frames from the primary AC during the TXOP. The EDCA queue status of AP1 or MLD1 is as shown in FIG. 32; which is assumed to be the queue status when AP1 starts the TXOP 400 and further assumed that there are no new frames arriving during the TXOP. If the queue status is that of MLD1, then it is also assumed that MLD1 does not transmit on any other links during the exemplified TXOP.

When AP1 obtains a TXOP 400 of VI, it first transmits RTA frame, exemplified as AC_VI(1) 514 from the AC_VI queue to STA1. Then, it transmits RTA frames exemplified as AC_VO(1) 520 from the AC_VO queue to STA2. Next, it transmits a non-RTA frame exemplified as AC_VI(2) 526 from the AC_VI queue to STA3.

Each of these transmissions is shown with respective preambles 512, 518 and 524. The receiving stations are shown responding with a Block Acknowledgement (BA) 516, 522, and 528.

It should be noted that it is possible for AP1 to utilize RTS/CTS or MU-RTS/CTS to reserve the TXOP before transmitting frames.

Figure 35:
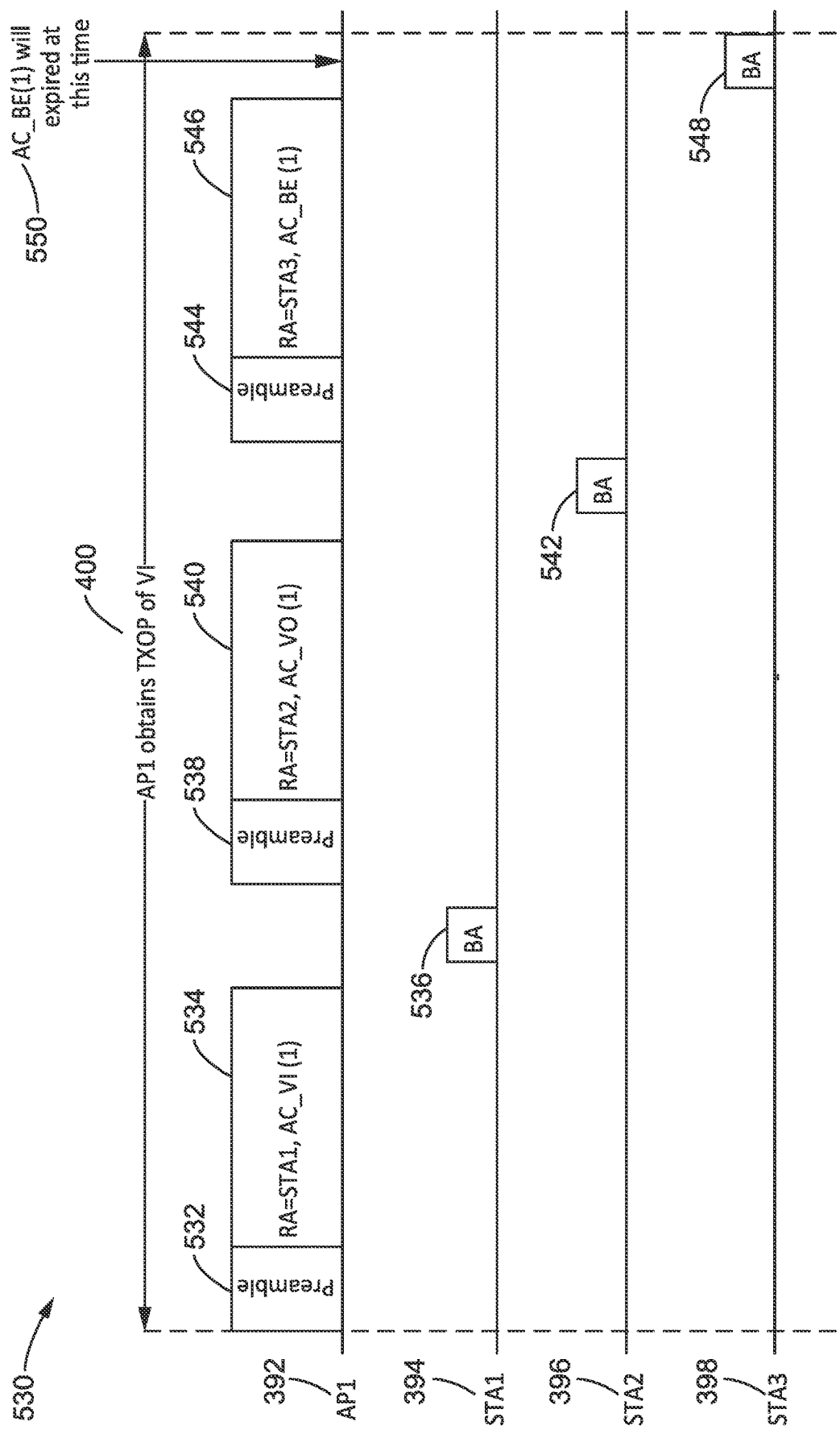
FIG. 35 is a communication diagram of AP1 transmitting RTA frames from a non-primary AC which has lower priority than the primary AC according to at least one example of the present disclosure.

FIG. 35 illustrates an example embodiment 530 of AP1 transmitting RTA frames from a non-primary AC which has lower priority than the primary AC. The figure depicts interaction between AP1 392, STA1 394, STA2 396 and STA3 396 during TXOP 400. The EDCA queue status of AP1 or MLD1 is shown in FIG. 32; which is assumed here to be the queue status when AP1 starts TXOP 400 and it is also assumed that there are no new frames arriving during the TXOP. If the queue status is of MLD1, then it is further assumed that MLD1 does not transmit on any other link during the TXOP shown in the example.

When AP1 obtains a TXOP of VI, it first transmits RTA frame exemplified as AC_VI(1) 534 from the AC_VI queue to STA1. Then, it transmits RTA frames exemplified as AC_VO(1) 540 from the AC_VO queue to STA2. Next, it transmits the RTA frame exemplified as AC_BE(1) 546 from AC_BE queue to STA3 since that RTA frame will soon expire 550, which will occur before the end time the TXOP.

Each of these transmissions is shown with respective preamble 532, 538 and 544. The receiving stations are shown responding with a Block Acknowledgement (BA) 536, 542, and 548.

It should be noted that it is possible for the AP1 to utilize RTS/CTS or MU-RTS/CTS to reserve the TXOP before transmitting frames.

Figure 36:
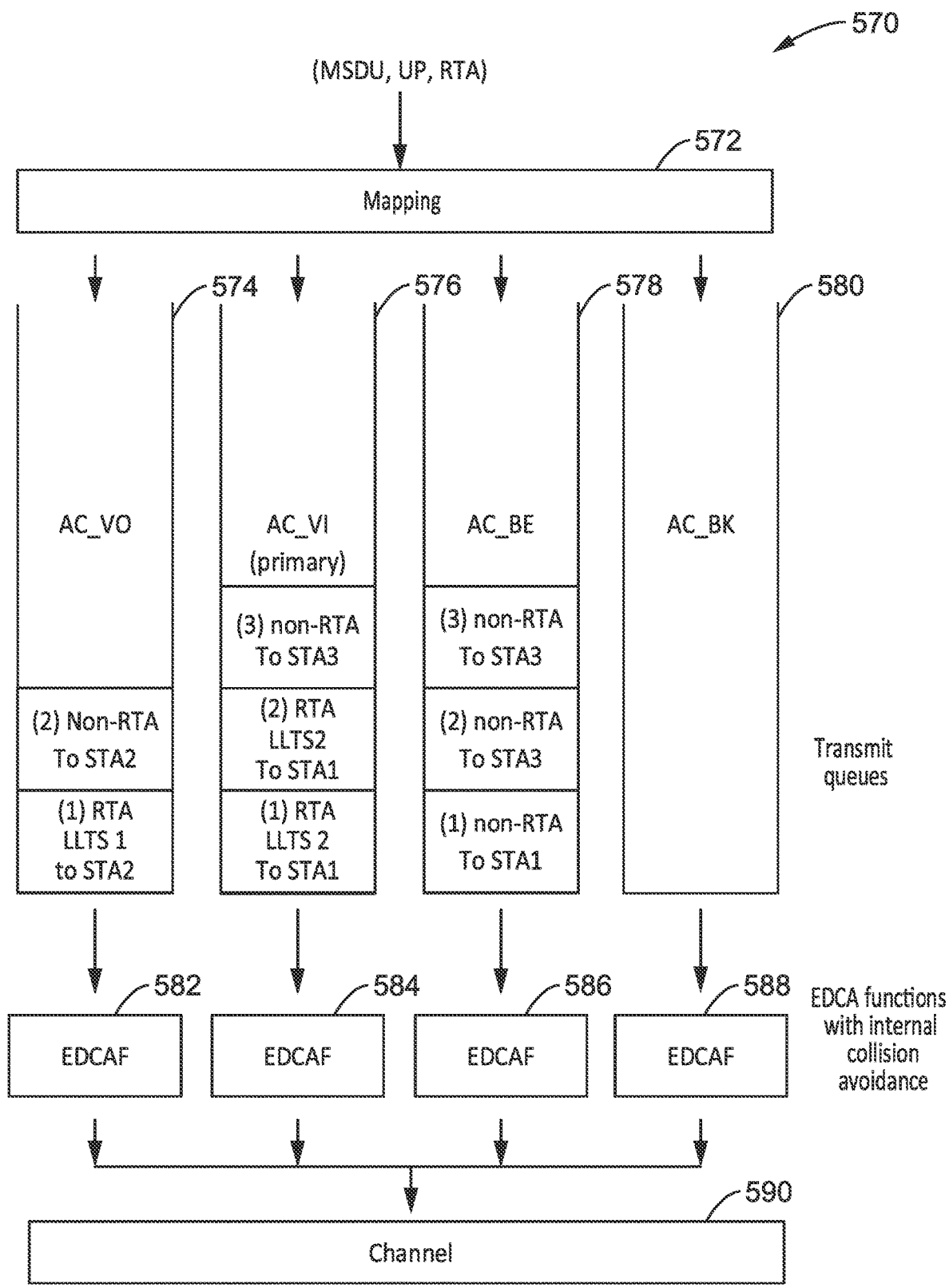
FIG. 36 is a transmission queue diagram of a third example of EDCA queue status of AP1 or MLD1 according to at least one example of the present disclosure.

FIG. 36 illustrates an example embodiment 570, depicting a third example of EDCA queue status of AP1 or MLD1. Frames are mapped 572 into the queues shown. The AC_VO queue 574 is shown having one RTA frame AC_VO(1) under LLTS1, and one non-RTA frame AC_VO(2). The AC_VI queue 576 is shown having two RTA frames under LLTS2, and one non-RTA frame AC_VI(3). The AC_BE queue 578 is shown having three non-RTA frames. The AC_BK queue 580 is shown without any frames in the queue.

The respective EDCA functions 582, 584, 586, and 588 are shown beneath each queue, and configured for obtaining and transmitting on Channel 590.

Figure 37:
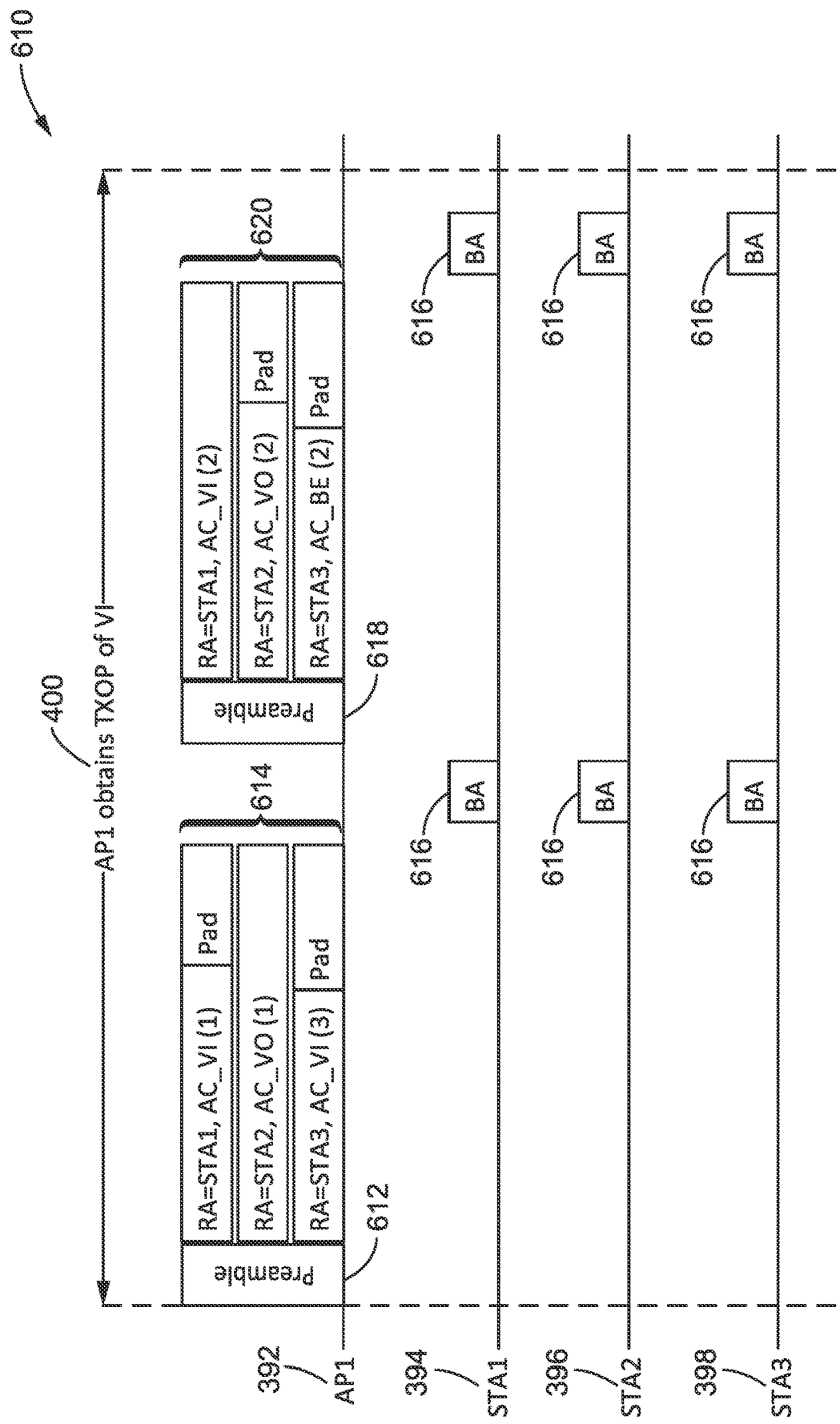
FIG. 37 is a communication diagram of AP1 transmitting MU OFDMA PPDU carrying RTA frames from a non-primary AC whereby the duration of MU PPDU is determined by the transmission requirement of RTA frames from a non-primary AC according to at least one example of the present disclosure.

FIG. 37 illustrates an example embodiment 610 of AP1 transmitting MU OFDMA PPDU carrying RTA frames from a non-primary AC whereby the duration of MU PPDU is determined by the transmission requirement of RTA frames from a non-primary AC. The figure depicts interaction between AP1 392, STA1 394, STA2 396 and STA3 396 during TXOP 400.

The EDCA queue status of AP1 or MLD1 is shown in FIG. 36; with the present figure assuming this is the same queue status when AP1 starts TXOP 400 and further assuming that there are no new frames arriving during the exemplified TXOP. If the queue status is of MLD1, then it is further assumed that MLD1 does not transmit on any other link during the TXOP shown in the example.

When AP1 obtains a TXOP 400 of VI, it transmits 614 a MU OFDMA PPDU carrying RTA frame, exemplified as AC_VI(1) from AC_VI to STA1 queue, an RTA frame exemplified as AC_VO(1) from AC_VO to STA2, and a non-RTA frame exemplified as AC_VI(3) from AC_VO queue to STA3. It should be noted that the duration of the MU OFDMA PPDU is decided by the duration of frame AC_VO(1) instead of the duration of frames AC_VI(1) and AC_VI(3).

Then AP1 transmits 620 another MU OFDM PPDU carrying RTA frames exemplified as AC_VI(2) from the AC_VI queue and non-RTA frames shown as AC_VO(2) and AC_BE(2), which could follow the TXOP sharing rule of IEEE 802.11.

It should be noted that short frames are shown being padded in this and subsequent examples.

The MU OFDMA PPDU as shown in the example can be replaced by MU MIMO PPDU. Then, each frame in the MU PPDU will be transmitted through different spatial streams instead of different RUs. The solicited feedback, e.g., ACK or BA, of the MU PPDU will also be changed to the feedback for MU MIMO PPDU in the figure.

The transmissions 614 and 620 are shown with respective preambles 612 and 618. Each of the receiving stations is shown responding to receipt of these transmissions with a Block Acknowledgement (BA) 616.

It should be noted that it is possible for AP1 to utilize RTS/CTS or MU-RTS/CTS to reserve the TXOP before transmitting frames.

Figure 38:
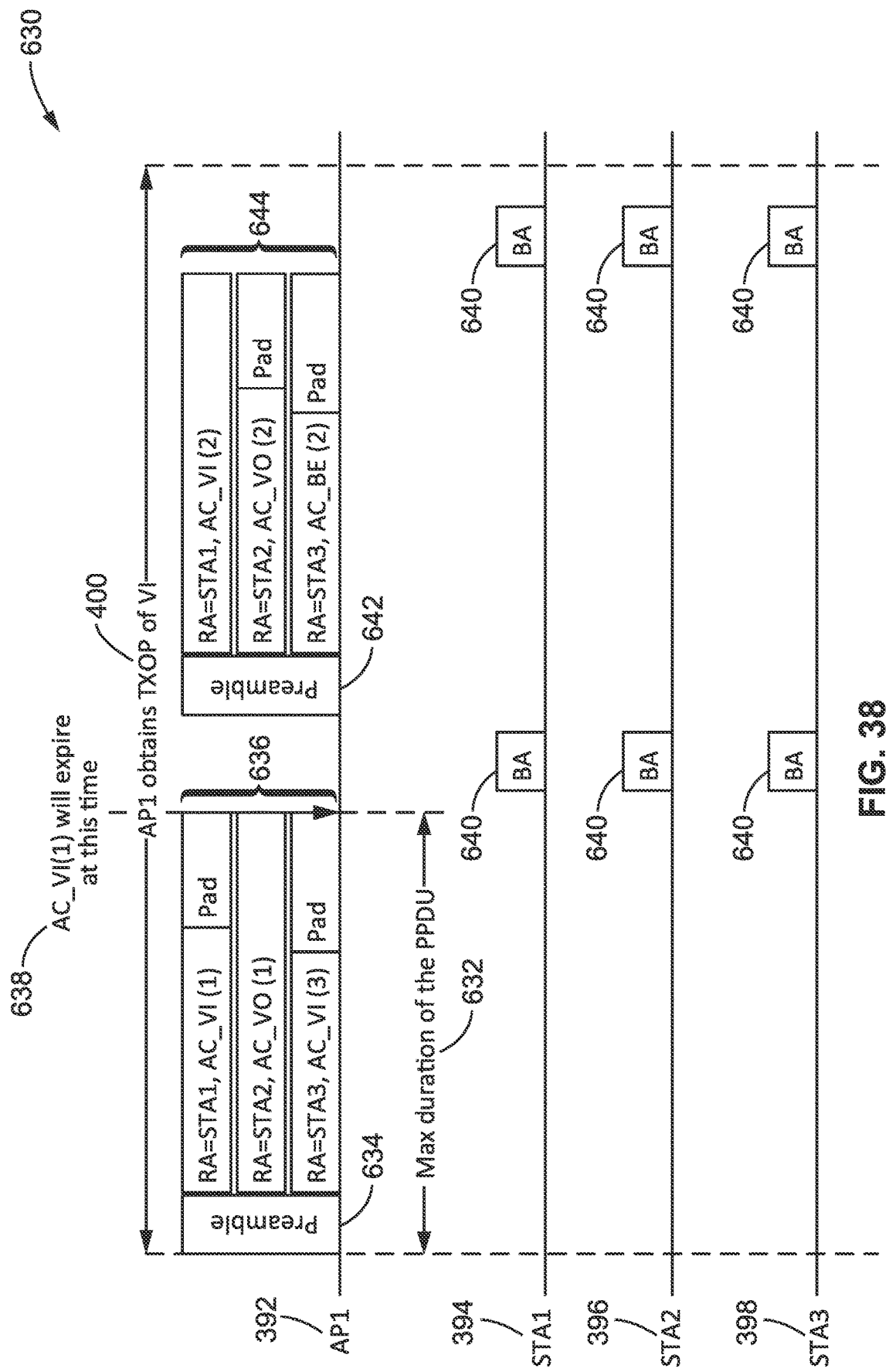
FIG. 38 is a communication diagram of AP1 transmitting MU OFDMA PPDU carrying RTA frames from a non-primary AC whereby the duration of MU PPDU is determined by the latency requirements of RTA frames from the primary AC according to at least one example of the present disclosure.

FIG. 38 illustrates an example embodiment 630 of AP1 transmitting MU OFDMA PPDU carrying RTA frames from a non-primary AC whereby the duration of MU PPDU is determined by the latency requirements of RTA frames from the primary AC. The figure depicts interaction between AP1 392, STA1 394, STA2 396 and STA3 396 during TXOP 400.

The EDCA queue status of AP1 or MLD1 is shown in FIG. 36; which is assumed here to be the queue status when AP1 starts TXOP 400 and it is also assumed that there are no new frames arriving during the TXOP of this example. If the queue status is of MLD1, then it is further assumed that MLD1 does not transmit on any other link during the exemplified TXOP.

When AP1 obtains a TXOP 400 of VI, it transmits 636 a MU OFDMA PPDU carrying RTA frame exemplified as AC_VI(1) from the AC_VI queue to STA1, an RTA frame exemplified as AC_VO(1) from the AC_VO queue to STA2, and a non-RTA frame exemplified as AC_VI(3) from the AC_VO queue to STA3. It should be noted that the duration of the MU OFDMA PPDU is decided by the duration of frame AC_VO(1), shown expiring 638, while the duration of the MU OFDMA PPDU cannot exceed the maximum duration (expiration time) 632 of frame AC_VI(1).

Then, AP1 is seen transmitting 644 another MU OFDM PPDU carrying RTA frames exemplified as AC_VI(2) from the AC_VI queue and non-RTA frames exemplified as AC_VO(2) and AC_BE(2), which could follow the TXOP sharing rule of IEEE 802.11.

The MU OFDMA PPDU as shown in the example can be replaced by MU MIMO PPDU; wherein each frame in the MU PPDU would then be transmitted through different spatial streams instead of different RUs. The solicited feedback, such as ACK or BA, of the MU PPDU would also be changed to the feedback for MU MIMO PPDU.

The transmissions 636 and 644 are shown with respective preambles 634 and 642. Each of the receiving stations is shown responding to receipt of these transmissions with a Block Acknowledgement (BA) 640.

It should be noted that it is possible for the AP1 to utilize RTS/CTS or MU-RTS/CTS to reserve the TXOP before transmitting frames.

Figure 39:
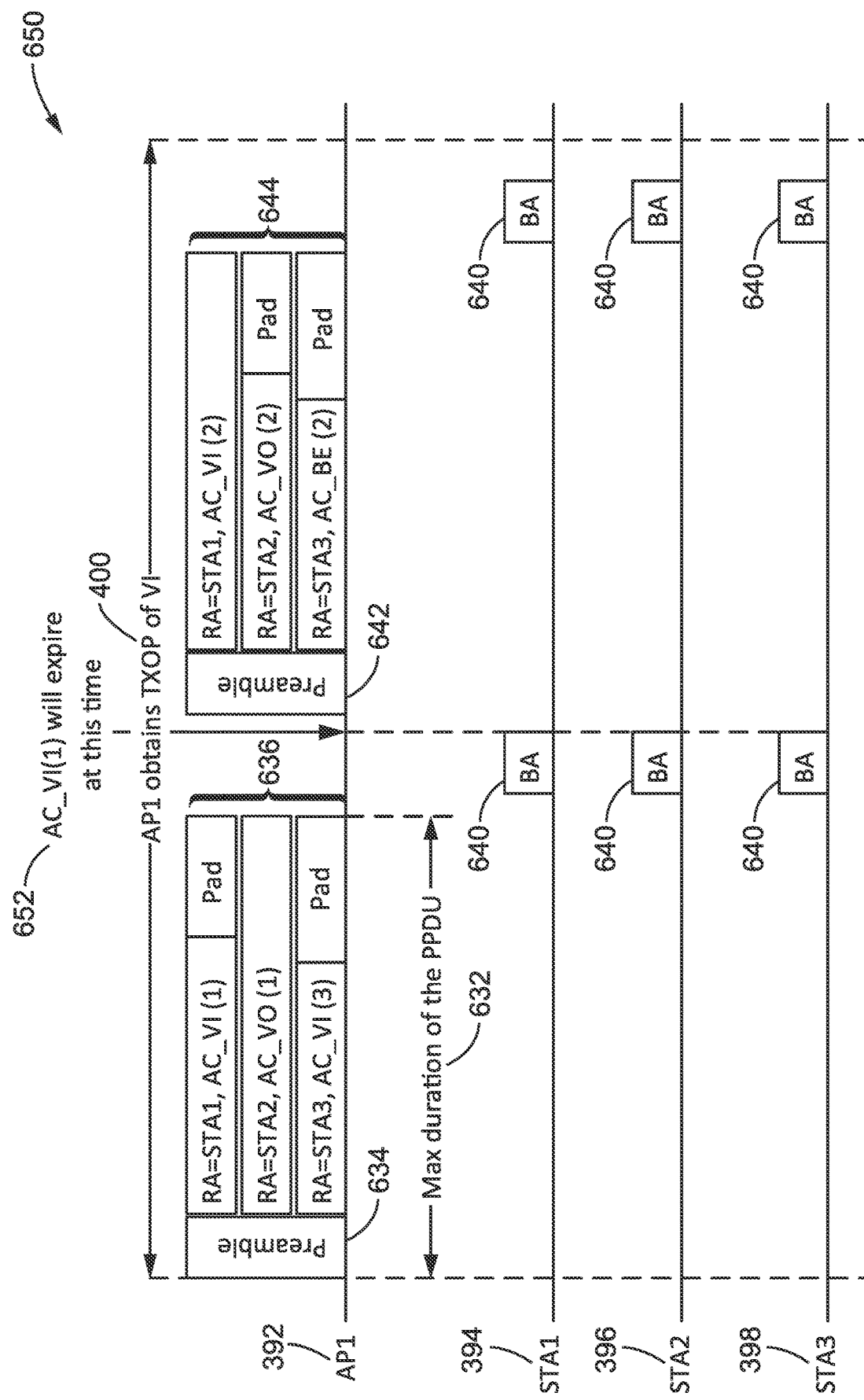
FIG. 39 is a communication diagram showing another example of AP1 transmitting MU OFDMA PPDU carrying RTA frames from non-primary AC whereby the duration of MU PPDU is determined by the latency requirement of RTA frames from the primary AC according to at least one example of the present disclosure.

FIG. 39 illustrates another example embodiment 650 of AP1 transmitting MU OFDMA PPDU carrying RTA frames from a non-primary AC whereby the maximum duration of MU PPDU 632 is determined by the latency requirement of RTA frames from the primary AC. The figure depicts interaction between AP1 392, STA1 394, STA2 396 and STA3 396 during TXOP 400.

The EDCA queue status of AP1 or MLD1 shown in FIG. 36 is assumed here as the queue status when AP1 starts TXOP 400 and it is also assumed that there are no new frames arriving during the TXOP. If the queue status is for MLD1, then it is further assumed that MLD1 does not transmit on any other link during the TXOP shown in the example.

When AP1 obtains TXOP 400 of VI, it transmits 636 a MU OFDMA PPDU carrying RTA frame exemplified as AC_VI(1) from the AC_VI queue to STA1, an RTA frame exemplified as AC_VO(1) from the AC_VO queue to STA2, and a non-RTA frame exemplified as AC_VI(3) from the AC_VO queue to STA3. It should be noted that the duration of the MU OFDMA PPDU 632 is decided by the duration of frame AC_VO(1) but the duration of the MU OFDMA PPDU and the expected feedback (e.g., BA) cannot exceed the expiration time 652 of frame AC_VI(1), shown expiring 652.

AP1 transmits 644 another MU OFDM PPDU carrying RTA frames exemplified as AC_VI(2) from the AC_VI queue to STA1 and non-RTA frames shown as AC_VO(2) and AC_BE(2), which can follow the TXOP sharing rule of IEEE 802.11.

The MU OFDMA PPDU as shown in the example can be replaced by an MU MIMO PPDU; in which case each frame in the MU PPDU is transmitted through different spatial streams instead of through different RUs. In this case, the solicited feedback such as ACK or BA of the MU PPDU, would also be changed to the feedback used for MU MIMO PPDU.

The transmissions 636 and 644 are shown with respective preambles 634 and 642. Each of the receiving stations is shown responding to receipt of these transmissions with a Block Acknowledgement (BA) 640.

It should be noted that it is possible for the AP1 to utilize RTS/CTS or MU-RTS/CTS to reserve the TXOP before transmitting frames.

Figure 40:
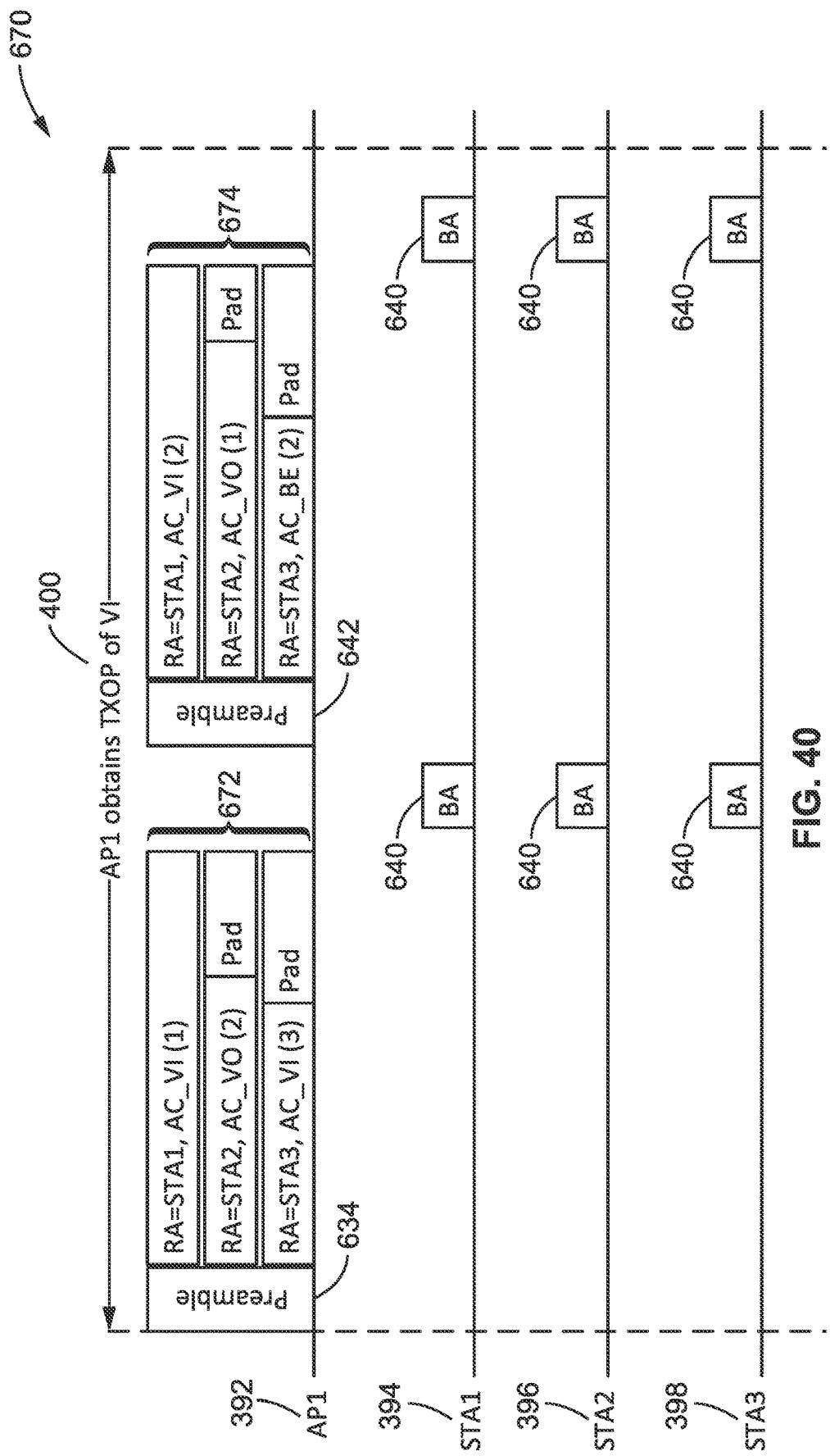
FIG. 40 is a communication diagram of AP1 transmitting MU OFDMA PPDU carrying RTA frames from a non-primary AC whereby the duration of MU PPDU is determined by the transmission requirement of the RTA frame from the primary AC according to at least one example of the present disclosure.

FIG. 40 illustrates an example embodiment 670 of AP1 transmitting MU OFDMA PPDU carrying RTA frames from a non-primary AC whereby the duration of MU PPDU is determined by the transmission requirement of the RTA frame from the primary AC. The figure depicts interaction between AP1 392, STA1 394, STA2 396 and STA3 396 during TXOP 400.

The EDCA queue status of AP1 or MLD1 as shown in FIG. 36 is assumed in this example as the queue status when AP1 starts TXOP 400 and it is also assumed there are no new frames arriving during the TXOP. If the queue status is for MLD1, then it is further assumed that MLD1 does not transmit on any other link during the TXOP.

When AP1 obtains a TXOP 400 of VI, it transmits 672 a MU OFDMA PPDU carrying RTA frame exemplified as AC_VI(1) to STA1, from AC_VI queue, non-RTA frame exemplified as AC_VO(2) to STA2, and non-RTA frame exemplified as AC_VI(3) to STA3, from AC_VO queue. Frame AC_VO(1) is not included in the first MU OFDMA PPDU because its duration is longer than the that of frame AC_VI(1).

Then, AP1 transmits 674 another MU OFDM PPDU carrying RTA frames AC_VI(2), RTA frame AC_VO(1), and non-RTA frame AC_BE(2). The duration of frame AC_VO is shorter than that of frame AC_VI(2).

The MU OFDMA PPDU as shown in the example can be replaced by MU MIMO PPDU; in which case each frame in the MU PPDU will be transmitted through different spatial stream instead of different RUs. The solicited feedback, such as ACK or BA, of the MU PPDU would also be changed to the requires feedback for MU MIMO PPDU.

The transmissions 672 and 674 are shown with respective preambles 634 and 642. Each of the receiving stations is shown responding to receipt of these transmissions with a Block Acknowledgement (BA) 640.

It should be noted that it is possible for the AP1 to utilize RTS/CTS or MU-RTS/CTS to reserve the TXOP before transmitting frames.

Figure 41:
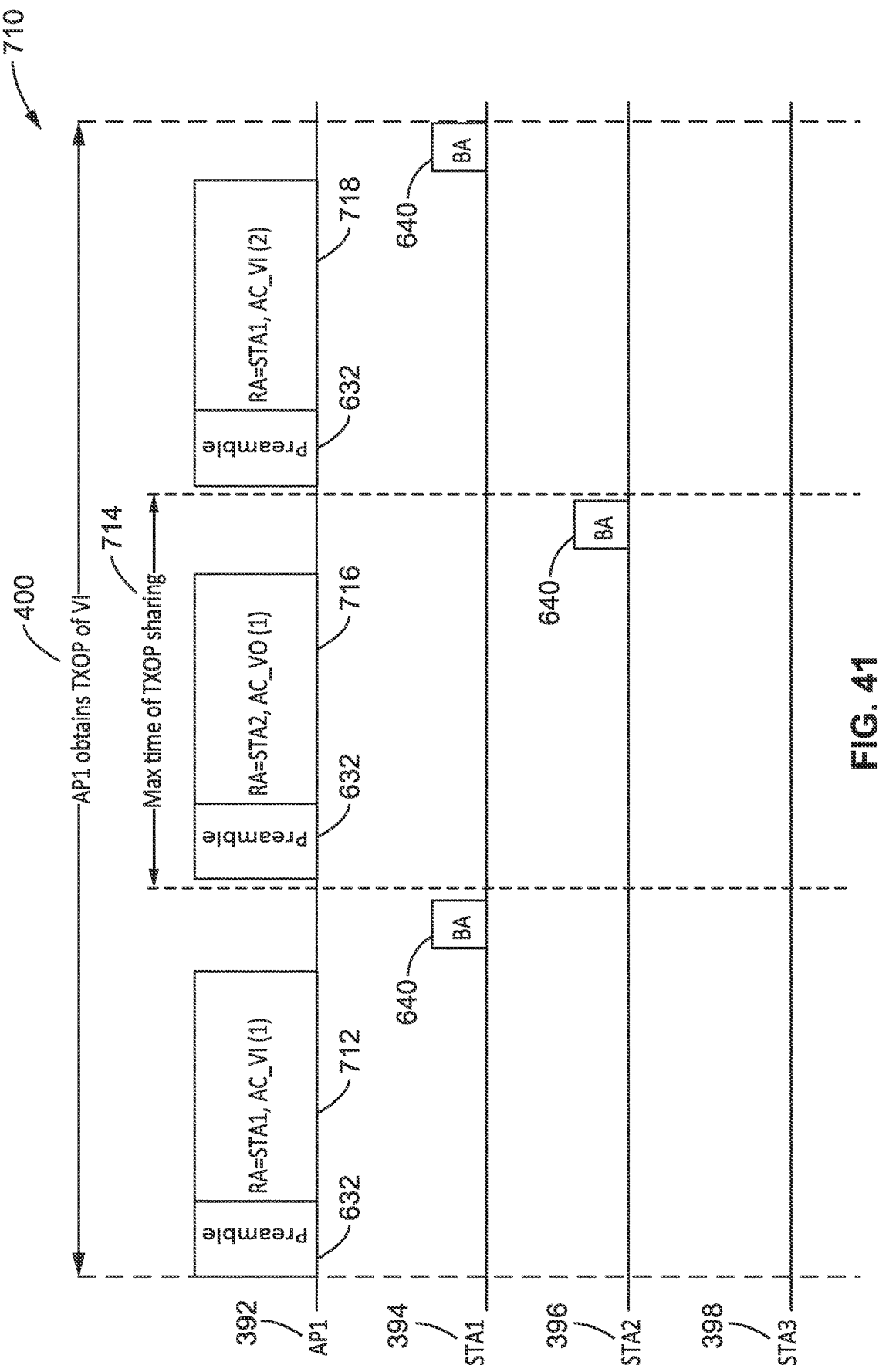
FIG. 41 is a communication diagram of AP1 limiting the time of TXOP sharing according to at least one example of the present disclosure.

FIG. 41 illustrates an example embodiment 710 of AP1 limiting the time of TXOP sharing. The figure depicts interaction between AP1 392, STA1 394, STA2 396 and STA3 396 during TXOP 400.

The EDCA queue status of AP1 or MLD1 as shown in FIG. 36 is assumed to be the queue status when AP1 starts TXOP 400 and it is also assumed that there are no new frames arriving during the TXOP. If the queue status is for MLD1, then it is further assumed that MLD1 does not transmit on any other link during the TXOP.

When AP1 obtains TXOP 400 of VI, it first transmits 712 an RTA frame exemplified as AC_VI(1) from the AC_VI queue to STA1. Then AP1 transmits RTA frames exemplified as AC_VO(1) 716 from the AC_VO queue to STA2. After AP1 finishes transmitting frame AC_VO, it has utilized the maximum TXOP sharing time 714 during the current TXOP.

Next, AP1 transmits 718 the frame exemplified as AC_VI (2) from the AC_VI queue to STA1.

The transmissions 712, 714 and 718 are shown with respective preambles 632. Each of the receiving stations is shown responding to receipt of these transmissions with a Block Acknowledgement (BA) 640.

Figure 42:
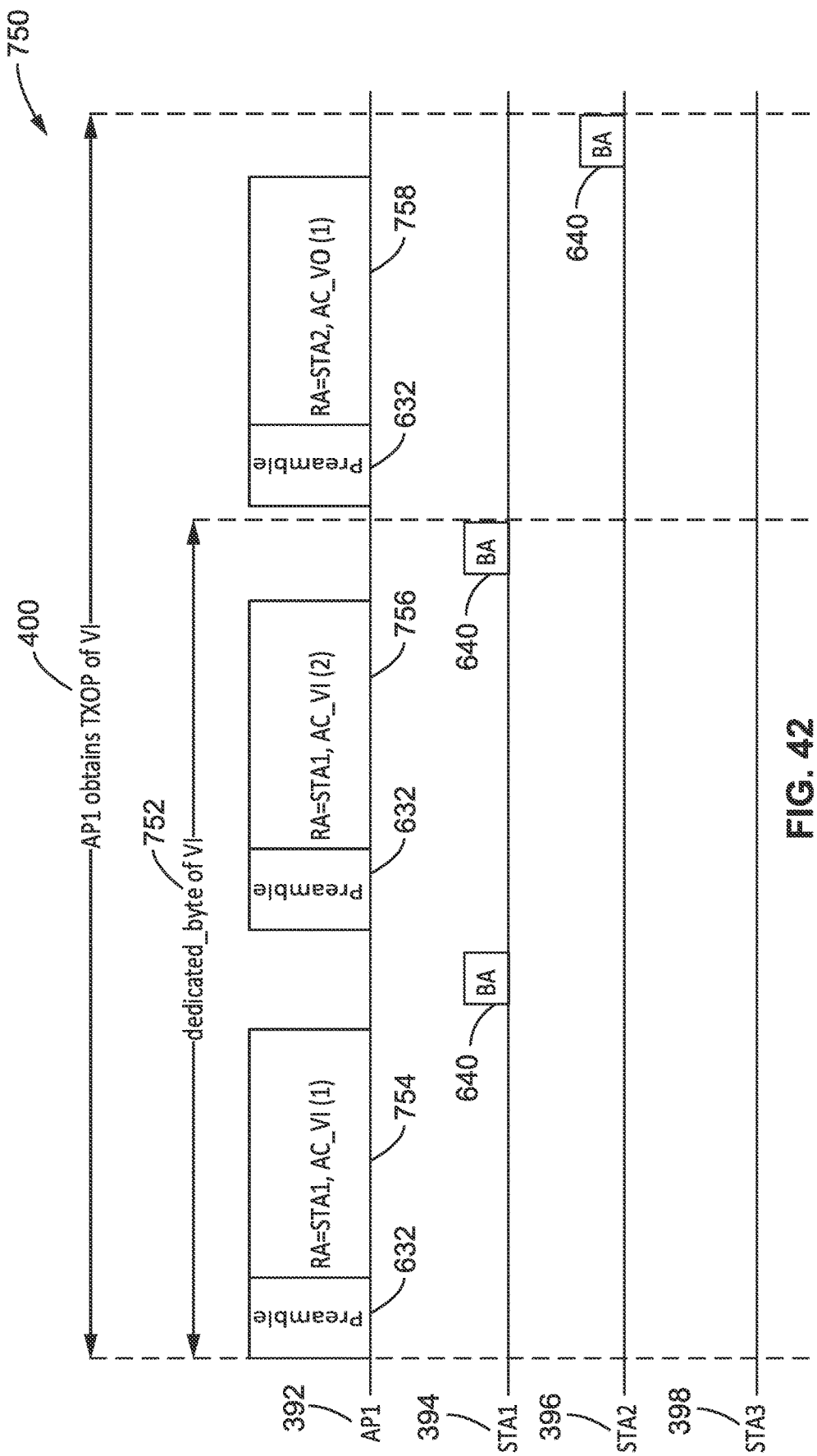
FIG. 42 is a communication diagram of AP1 sharing TXOP after transmitting a certain number of frames from the primary AC according to at least one example of the present disclosure.

FIG. 42 illustrates an example embodiment 750 of AP1 sharing TXOP after transmitting a certain number of frames from the primary AC. The figure depicts interaction between AP1 392, STA1 394, STA2 396 and STA3 396 during TXOP 400.

The EDCA queue status of AP1 or MLD1 as shown in FIG. 36 is assumed to be the queue status when AP1 starts TXOP 400 and it is also assumed there are no new frames arriving during the TXOP. If the queue status is for MLD1, then it is further assumed that MLD1 does not transmit on any other link during the TXOP.

As shown in the figure, AP1 has to transmit a certain amount, denoted 752 by dedicated_byte, of frames from the primary AC VI since the start of the TXOP before sharing its TXOP to transmit. AP1 is allowed to share TXOP with RTA frames from the non-primary ACs after the total bytes of the frames from the primary AC exceed the dedicated_byte even if there are frames from the primary AC not been transmitted.

When AP1 obtains a TXOP 400 of VI, it first transmits 754 and 756 RTA frames exemplified as AC_VI(1) and AC_VI(2) from the AC_VI queue to STA1. Then, AP1 spends more than the dedicated time on transmitting frames from the primary AC VI during the TXOP. It then shares the TXOP to transmit 758 RTA frames exemplified as AC_VO (1), from the AC_VO queue.

Figure 44:
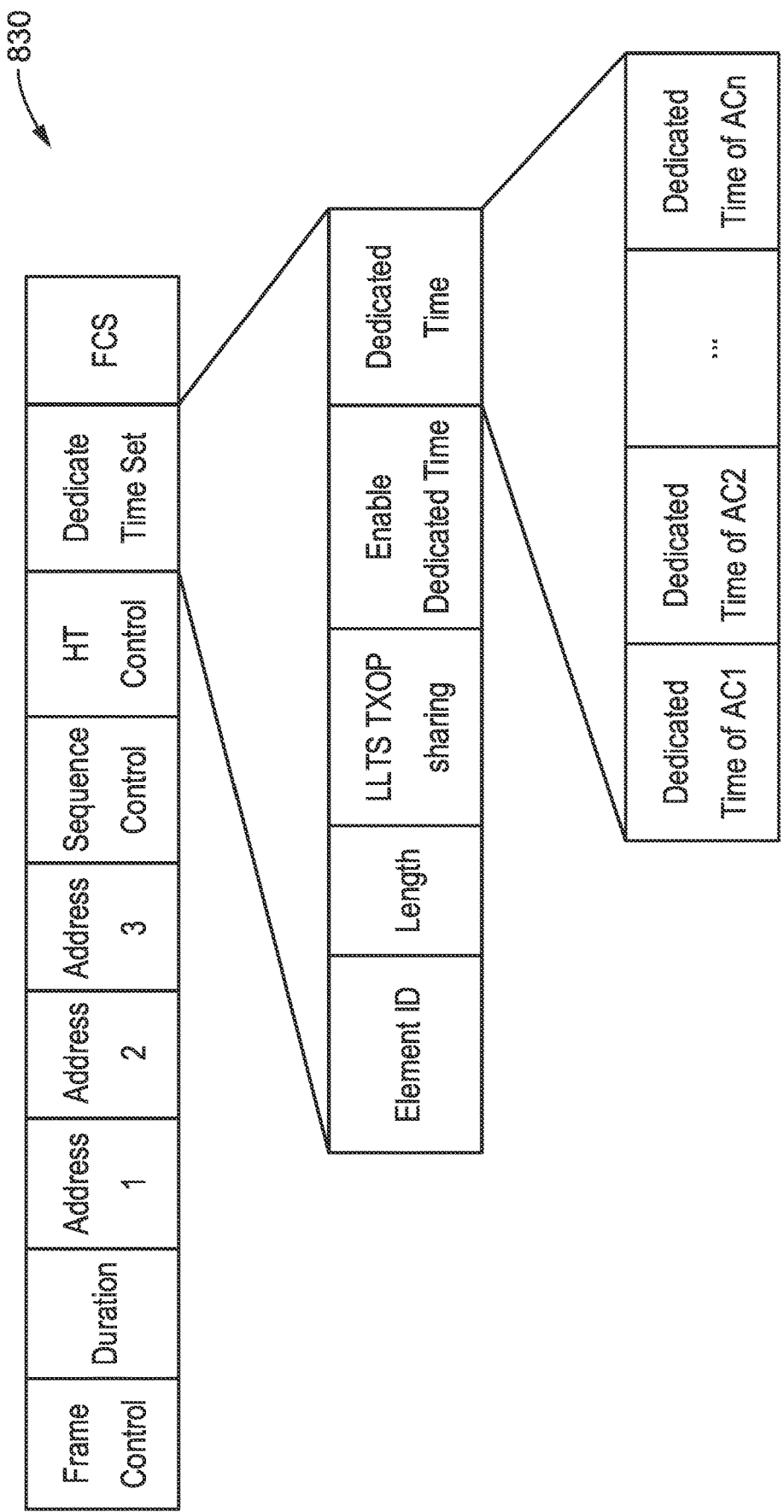
FIG. 44 is a data field diagram of a frame for carrying a dedicated time parameter setting according to at least one example of the present disclosure.

AP1 can send a frame carrying the information as shown in FIG. 44 to set the dedicated time of each STA.

The transmissions 754, 756 and 758 are shown with respective preambles 632; and each of the receiving stations is shown responding to receipt of these transmissions with a Block Acknowledgement (BA) 640.

It should be noted that it is possible for the AP1 to utilize RTS/CTS or MU-RTS/CTS to reserve the TXOP before transmitting frames.

It is possible that before reaching the dedicated_byte of the primary frames, AP1 may share the TXOP following the rules defined in IEEE 802.11.

Figure 43:
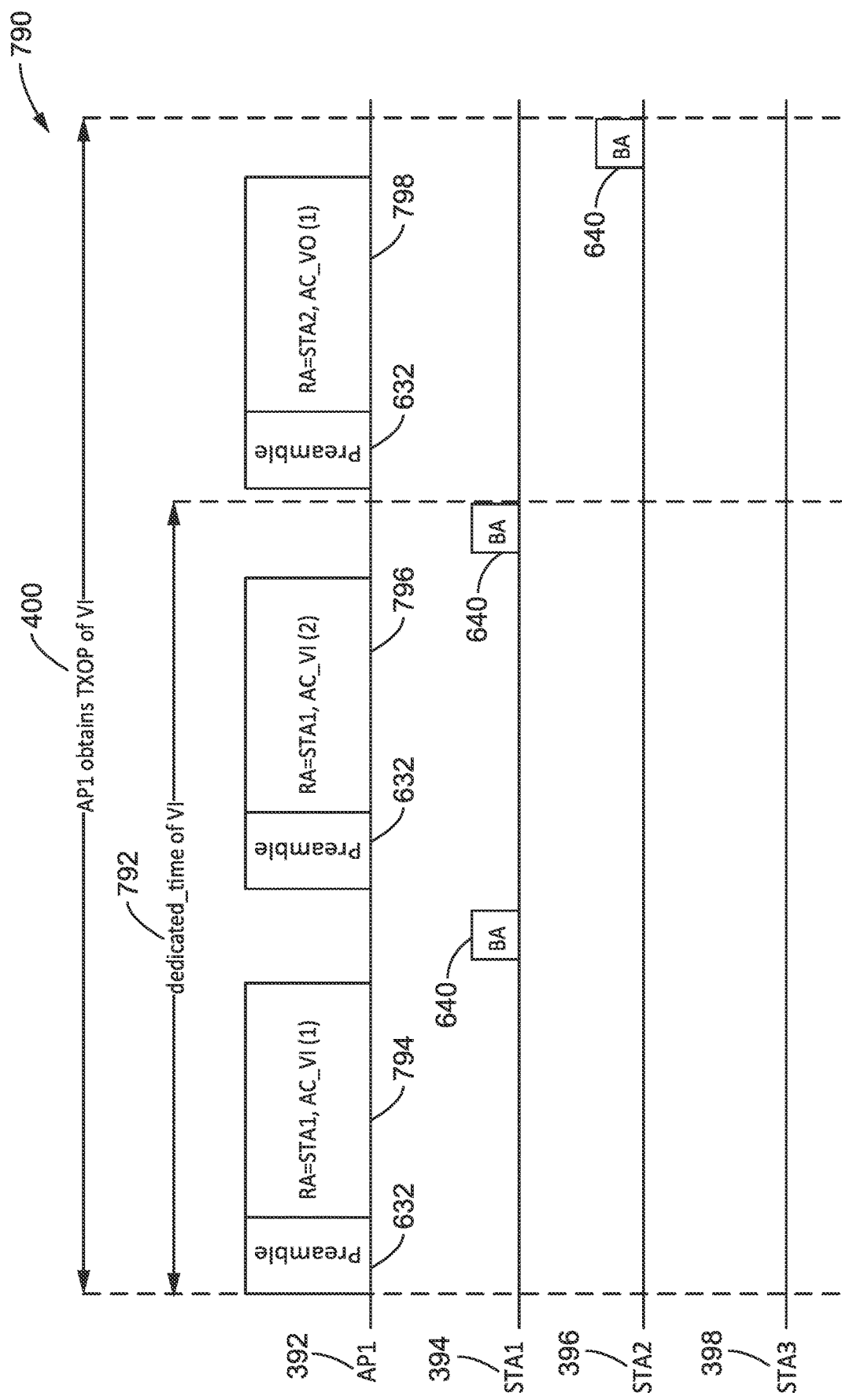
FIG. 43 is a communication diagram of AP1 sharing TXOP after transmitting frames from the primary AC for certain amount of time according to at least one example of the present disclosure.

FIG. 43 illustrates an example embodiment 790 of AP1 sharing TXOP after transmitting frames from the primary AC for a certain amount of time. The figure depicts interaction between AP1 392, STA1 394, STA2 396 and STA3 396 during TXOP 400.

The EDCA queue status of AP1 or MLD1 as shown in FIG. 36 is assumed as the queue status when AP1 starts TXOP 400 and it is also assumed there are no new frames arriving during the TXOP. If the queue status is for MLD1, then it is further assumed that MLD1 does not transmit on any other link during the TXOP.

As shown in the figure, there is a dedicated time 792 of the primary AC VI since the start of the TXOP. AP1 is allowed to share TXOP to transmit RTA frames from a non-primary AC after the dedicated time ends, even if there are frames from the primary AC not been transmitted at that time.

When AP1 obtains TXOP 400 of VI, it first transmits 794 RTA frames 794 and 796 exemplified as AC_VI(1) and AC_VI(2) from the AC_VI queue to STA1. Then, AP1 spends more than the dedicated time 792 on transmitting frames from the primary AC VI during the TXOP. AP1 then shares the TXOP to transmit 798 RTA frames exemplified as AC_VO(1) from the AC_VO queue to STA2.

It should be noted that AP1 can send a frame carrying the information as shown in FIG. 44 to set the dedicated time of each STA.

The transmissions 794, 796 and 798 are shown with respective preambles 632. Each of the receiving stations is shown responding to receipt of these transmissions with a Block Acknowledgement (BA) 640.

It should be noted that it is possible for AP1 to utilize RTS/CTS or MU-RTS/CTS to reserve the TXOP before transmitting frames.

It is possible that before the dedicated_time expires, AP1 shares TXOP in response to following rules defined in IEEE 802.11.

FIG. 44 illustrates an example embodiment 830 of a frame for carrying a dedicated time parameter setting. One STA, such as the AP, can send a frame containing this time parameter settings to another STA, such as an associated STA, to set the amount of dedicated time given for that STA. In some cases the AP may broadcast such a frame to set a dedicated time of all of its associated STAs.

In at least one embodiment, the dedicated time parameters contain the following fields. A Frame Control field indicates the type of frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence control field indicates the sequence number of the frame. An HT control field indicates the extra control information for the frames.

A Dedicated Time Set field is set by the STA to the amount of dedicated time of each AC for the receiver STA. The receiver STA can use the parameters in this field for TXOP sharing. An Element ID field identifies the type of element; which is in this case is a Dedicate Time set element. A Length field indicates the length of the Dedicate Time set element.

An LLTS TXOP sharing field is set to indicate sharing rules. In at least one embodiment this field may be a one bit field which is set to a first state (e.g., "1") indicating that the receiver STA can share the TXOP using the rules as described in Section 5.4.1. to transmit the RTA frames from the non-primary ACs. Otherwise, this field is set to a second state (e.g., "0") and the receiver STA only follows the TXOP sharing rules as defined in IEEE 802.11.

An Enable Dedicated Time field is set to indicate whether there is dedicated time during each TXOP. If this field is set to a first state (e.g., true), then there is dedicated time during each TXOP, as marked for example from the beginning of the TXOP. During the dedicated time, only the traffic from the primary AC can be transmitted.

A Dedicated time field is set by the transmitting STA for each AC. The STA receiving this dedicated time information spends the dedicated time for an AC, commencing at the start time of the TXOP of that AC, on transmitting frames from that AC. Only after that, can the receiver STA decide to share the TXOP.

It should be noted that it is possible to replace the "dedicated time" by "dedicated bytes" in the frame to set dedicated bytes parameters as described in FIG. 42.

Figure 45:
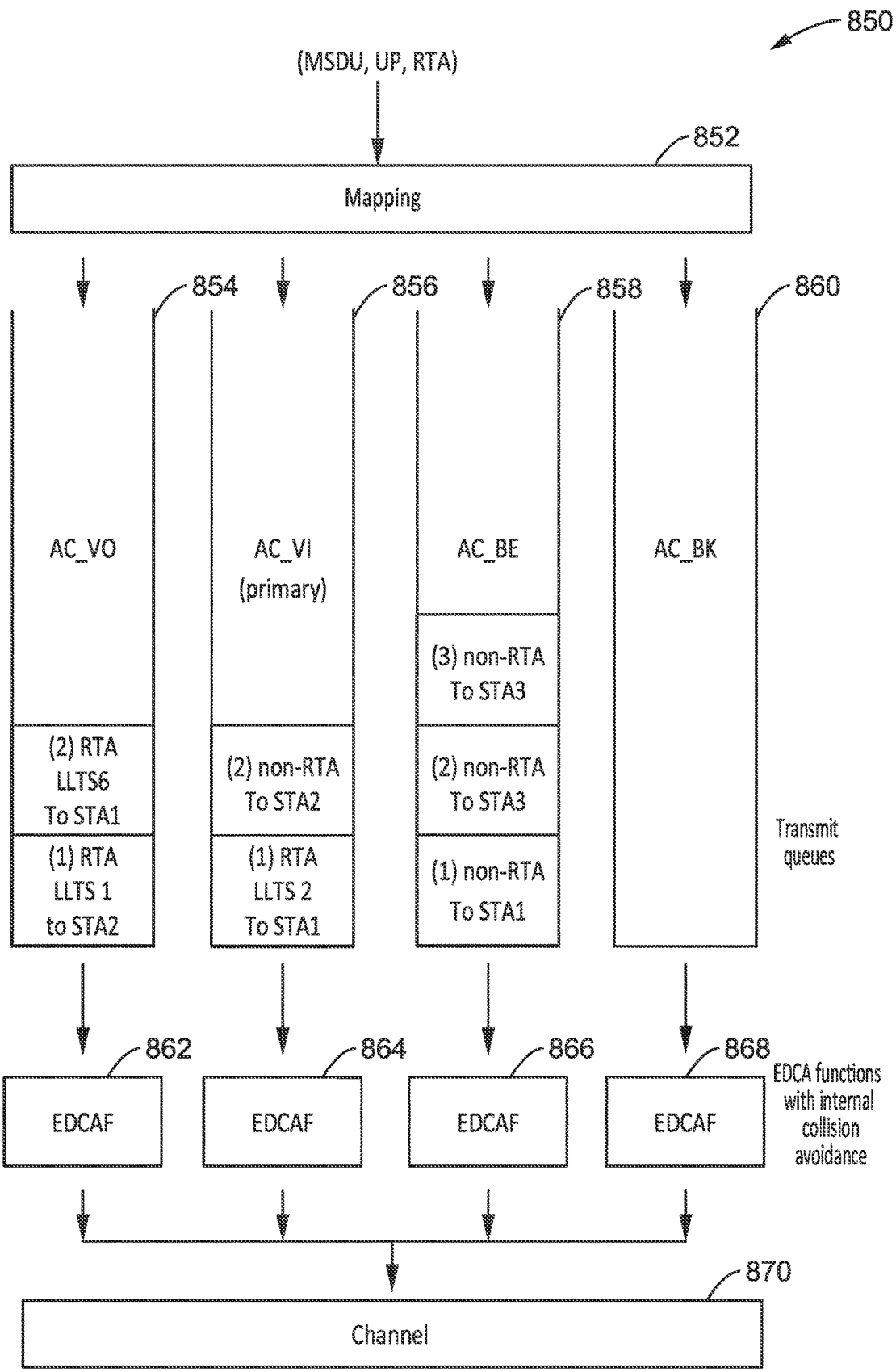
FIG. 45 is a transmission queue diagram of a fourth example of EDCA queue status of AP1 or MLD1 according to at least one example of the present disclosure.

FIG. 45 illustrates an example embodiment 850 providing a fourth example of EDCA queue status of AP1 or MLD1. Frames are mapped 852 into the queues as shown. The AC_VO queue 854 is depicted as carrying two RTA frames exemplified as AC_VO(1) under LLTS1 and AC_VO(2) under LLTS6. The AC_VI queue 856 is depicted holding one RTA frame under LLTS2 exemplified as AC_VI(1), and one non-RTA frame exemplified as AC_VI(2). The AC_BE queue 858 represents the EDCA queue of AC BE, which is depicted as holding three non-RTA frames exemplified as AC_BE(1) through AC_BE(3). The AC_BK queue 860 is depicted without any frames in its queue.

The respective EDCA functions 862, 864, 866, and 868, shown beneath each queue, for obtaining and transmitting on Channel 870.

Figure 46:
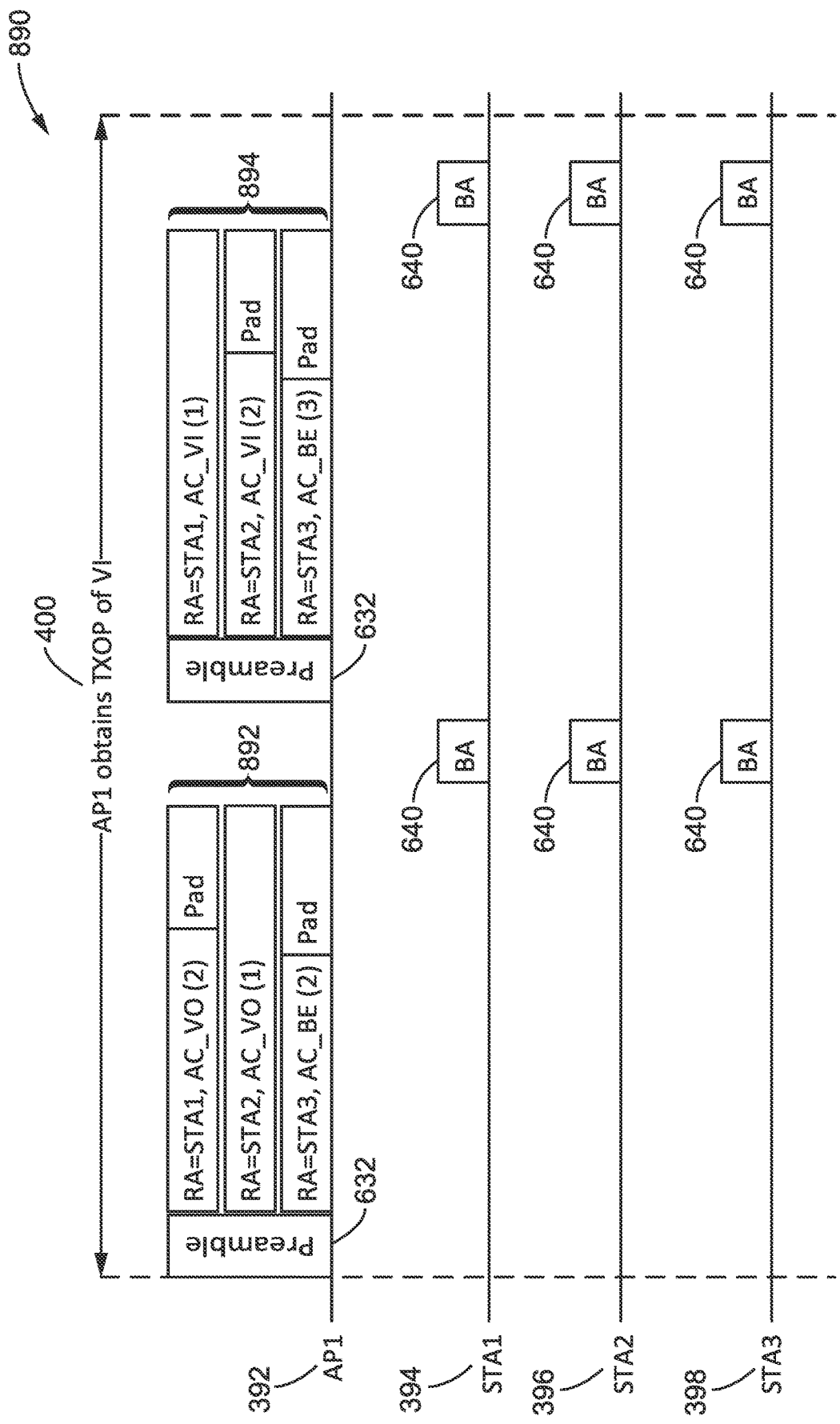
FIG. 46 is a communication diagram of AP1 transmitting MU OFDMA PPDU whereby for each user, RTA frames from non-primary AC are transmitted earlier than the frames from the primary AC according to at least one example of the present disclosure.

FIG. 46 illustrates an example embodiment 890 of AP1 transmitting MU OFDMA PPDU whereby for each user, RTA frames from a non-primary AC are transmitted earlier than the frames from the primary AC. The figure depicts interaction between AP1 392, STA1 394, STA2 396 and STA3 396 during TXOP 400.

The EDCA queue status of AP1 or MLD1 as shown in FIG. 45 is assumed to be the queue status when AP1 starts this TXOP 400 and it is also assumed there are no new frames arriving during the TXOP. If the queue status is for MLD1, then it is further assumed that MLD1 does not transmit on any other link during the TXOP shown.

When AP1 obtains a TXOP 400 of VI, it transmits 892 a MU OFDMA PPDU carrying RTA frames exemplified as AC_VO(1) and AC_VO(2) from the AC_VO queue to STA1 and STA2 and a non-RTA frame exemplified as AC_BE(2) from AC_BE queue to STA3.

Then, AP1 transmits 894 another MU OFDM PPDU carrying RTA frames AC_VI(1) and AC_VI(2) and non-RTA frame AC_BE(3) to STA1, STA2 and STA3, respectively. For STA1 and STA2, AP1 first transmits the RTA frames from the higher priority non-primary AC exemplified as AC VO.

The MU OFDMA PPDU as shown in the example can be replaced by an MU MIMO PPDU; in which case each frame in the MU PPDU is transmitted through different spatial streams instead of different RUs. The solicited feedback would also be changed from the ACK or BA of the MU PPDU to feedback suitable to an MU MIMO PPDU in the figure.

The transmissions 892 and 894 are shown with respective preambles 632. Each of the receiving stations is shown responding to receipt of these transmissions with a Block Acknowledgement (BA) 640.

It should be noted that it is possible for the AP1 to utilize RTS/CTS or MU-RTS/CTS to reserve the TXOP before transmitting frames.

Figure 47:
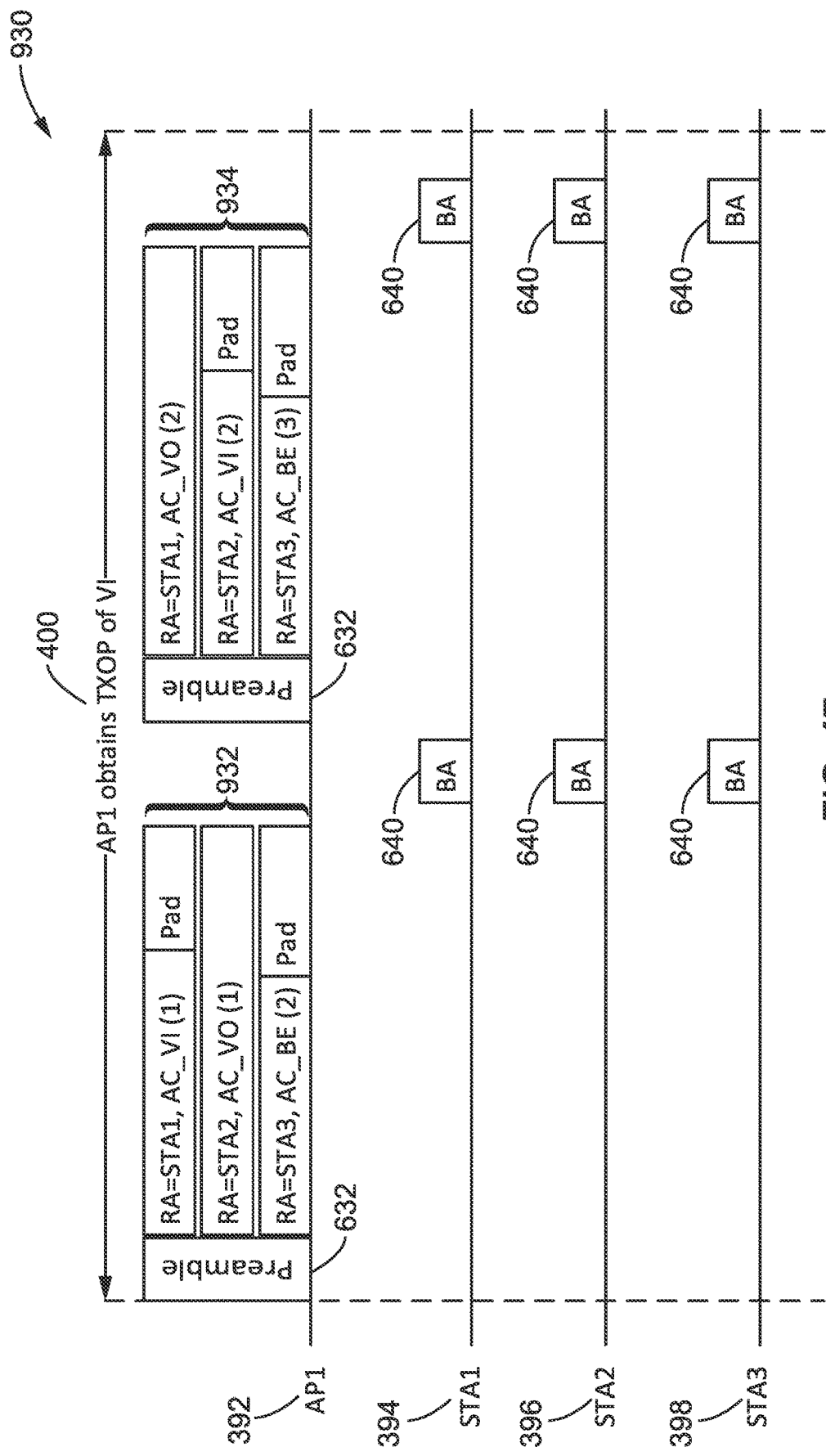
FIG. 47 is a communication diagram of TXOP sharing when an AP transmits RTA frame from non-primary AC later than the RTA frame from the primary AC, but earlier than non-RTA frames from the primary AC for each user in MU PPDU according to at least one example of the present disclosure.

FIG. 47 illustrates an example embodiment 930 of TXOP sharing when the AP transmits an RTA frame from non-primary AC later than an RTA frame from the primary AC, but earlier than non-RTA frames from the primary AC for each user in MU PPDU. The figure depicts interaction between AP1 392, STA1 394, STA2 396 and STA3 396 during TXOP 400.

AP1 is shown transmitting 932 MU OFDMA PPDU whereby for each user, it transmits RTA frames from primary AC first, then the RTA frames from higher priority ACs, and after that the non-RTA frames from the primary AC.

The EDCA queue status of AP1 or MLD1 as shown in FIG. 45 is assumed to be the queue state when AP1 starts TXOP 400 and it is also assumed that there are no new frames arriving during the TXOP. If the queue status is for MLD1, then it is further assumed that MLD1 does not transmit on any other link during the exemplified TXOP.

When AP1 obtains a TXOP 400 of VI, it transmits 932 a MU OFDMA PPDU carrying RTA frame exemplified as AC_VI(1) and AC_VO(1), as well as a non-RTA frame exemplified as AC_BE(2) from AC_BE queue.

AP1 then transmits 934 another MU OFDM PPDU carrying RTA frames AC_VO(2) and AC_VI(2), and a non-RTA frame AC_BE(3). For user STA1, AP1 transmits the RTA frames from the primary AC exemplified as AC VI, first, then the RTA frames from the higher priority non-primary AC, exemplified as AC_VO. For user STA2, AP1 transmits the RTA frames from the higher priority non-primary AC, such as AC_VO, first, then the non-RTA frames from the primary AC, such as AC_VI.

The MU OFDMA PPDU as shown in the example can be replaced by MU MIMO PPDU; in which case each frame in the MU PPDU is transmitted through different spatial streams instead of through different RUs. The solicited feedback, such as ACK or BA, of the MU PPDU would also be changed to a proper type of feedback for MU MIMO PPDU.

The transmissions 932 and 934 are shown with respective preambles 632. Each of the receiving stations is shown responding to receipt of these transmissions with a Block Acknowledgement (BA) 640.

It should be noted that it is possible for the AP (e.g., AP1) to utilize RTS/CTS or MU-RTS/CTS to reserve the TXOP before transmitting frames.

6. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) operating as either an access point (AP) or a non-AP STA, is configured for wirelessly communicating packets which carry frames over a channel with other wireless stations (STAs), which are either APs or non-AP STAs, on a wireless local area network (WLAN) in which enhanced distributed channel access (EDCA) is applied to more than one Access Category (AC); (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) distinguishing real time application (RTA) traffic from non-RTA traffic; (d)(ii) obtaining a transmit opportunity (TXOP) of a primary AC; and (d)(iii) utilizing a remainder of the TXOP channel resource to transmit RTA frames from non-primary ACs even though there may be frames from the primary AC that have not been transmitted during the TXOP.

An apparatus for wireless communication in a network, the apparatus comprising: (a) a wireless communication circuit, as a wireless station (STA) operating as either an access point (AP) or a non-AP STA, is configured for wirelessly communicating packets which carry frames over a channel with other wireless stations (STAs), which are either APs or non-AP STAs, on a wireless local area network (WLAN) in which enhanced distributed channel access (EDCA) is applied to more than one access category (AC); (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) exchanging a specification of quality of service (QoS) requirements and upper layer information of traffic flow to set up a traffic stream between a non-AP MLD and an AP ML; (d)(ii) allocating a low latency identification (LLID) by the non-AP MLD or the AP MLD, to the traffic stream to distinguish the traffic stream from other traffic streams having the same traffic identifier (TID); (d)(iii) determining by the non-AP MLD and/or the AP MLD which link or links, that the traffic stream is to be transmitted through; and (d)(iv) distinguishing, by the non-AP MLD and/or the AP MLD, between traffic belonging to the traffic stream from other traffic.

A method of wireless communication in a network, the apparatus comprising: (a) communicating from a wireless station (STA) operating as either an access point (AP) or a non-AP STA over a channel with other wireless stations (STAs), which are either APs or non-AP STAs, on a wireless local area network (WLAN) in which enhanced distributed channel access (EDCA) is applied to more than one access category (AC); (b) distinguishing real time application (RTA) traffic from non-RTA traffic; (c) obtaining a transmit opportunity (TXOP) of a primary AC; and (d) utilizing a remainder of the channel resource to transmit RTA frames from non-primary ACs even when there are frames from the primary AC that have not been transmitted during the TXOP.

The apparatus or method of any preceding implementation, wherein said instructions when executed by the processor perform steps further comprising ensuring that a minimum required channel resource is available within a channel resource for transmitting frames from the primary AC during the TXOP.

The apparatus or method of any preceding implementation, wherein the STA, which is ensuring minimum required channel resource to transmit frames from the primary AC, can utilize the minimum required channel resource for TXOP sharing if all the frames from the primary AC have been transmitted.

The apparatus or method of any preceding implementation, wherein said instructions when executed by the processor perform steps further comprising the STA setting no minimum required channel resource to transmit frames from the primary AC during the TXOP.

The apparatus or method of any preceding implementation, wherein said instructions when executed by the processor perform steps further comprising the STA ensuring that a given minimum number of bytes from the primary AC are transmitted during the TXOP.

The apparatus or method of any preceding implementation, wherein said instructions when executed by the processor perform steps further comprising the STA ensuring that a minimum of required channel time is provided for transmitting frames from the primary AC during the TXOP.

The apparatus or method of any preceding implementation, wherein said instructions when executed by the processor perform steps further comprising the STA transmitting RTA frames from non-primary ACs even if no frame from the primary AC has been transmitted during the TXOP.

The apparatus or method of any preceding implementation, wherein said instructions when executed by the processor perform steps further comprising the STA transmitting RTA frames from non-primary ACs during the TXOP only if all the RTA frames from the primary AC have been transmitted.

The apparatus or method of any preceding implementation, wherein said instructions when executed by the processor perform steps further comprising the STA transmitting RTA frames from non-primary ACs of higher priority during the TXOP, before transmitting RTA frames from the primary AC.

The apparatus or method of any preceding implementation, wherein said instructions when executed by the processor perform steps further comprising the STA transmitting RTA frames from the non-primary ACs of lower priority during the TXOP.

The apparatus or method of any preceding implementation, wherein said instructions when executed by the processor perform steps further comprising the STA transmitting a MU PPDU packet whose length is determined by the transmission and/or latency requirement of RTA frames from the primary ACs.

The apparatus or method of any preceding implementation, wherein said instructions when executed by the processor perform steps further comprising the STA limiting the time of TXOP sharing.

The apparatus or method of any preceding implementation, wherein said instructions when executed by the processor perform steps further comprising the STA allowing transmitting of RTA frames from non-primary ACs earlier than frames from the primary AC, only if those RTA frames are expiring.

The apparatus or method of any preceding implementation, wherein said instructions when executed by the processor perform steps further comprising the STA obtaining a TXOP of the primary AC and sharing the TXOP with a non-primary AC of low priority.

The apparatus or method of any preceding implementation, wherein said instructions when executed by the processor perform steps further comprising the non-AP MLD transmitting a frame including specification, QoS requirement, upper layer information, and LLID of a traffic flow to the AP MLD in requesting that it setup a traffic stream.

The apparatus or method of any preceding implementation, wherein said instructions when executed by the processor perform steps further comprising the AP MLD responding to the request for setting up a traffic stream with a frame including specification, QoS requirement, upper layer information, LLID, and status of a traffic flow to the non-AP MLD to indicate whether it accepted or rejected the request.

The apparatus or method of any preceding implementation, wherein said instructions when executed by the processor perform steps further comprising the AP MLD and the non-AP MLD performing exchanging of the specification, the QoS requirement of the traffic flow by using a traffic specification (TSPEC) element as defined in IEEE 802.11ax which is configured to contain additional QoS requirements.

The apparatus or method of any preceding implementation, wherein said additional QoS requirements comprise jitter and packet loss requirements.

The apparatus or method of any preceding implementation, wherein said instructions when executed by the processor perform steps further comprising the AP MLD and the non-AP MLD exchanging traffic flow information by sending frames over different links.

The apparatus or method of any preceding implementation, wherein said instructions when executed by the processor perform steps further comprising distinguishing one traffic stream from other traffic streams in response to the AP MLD and the non-AP MLD communicating a tuple comprising non-AP MAC address and LLID.

The apparatus or method of any preceding implementation, wherein said instructions when executed by the processor further perform steps comprising sending an unsolicited frame, by the AP MLD, to terminate or modify an existing traffic stream.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

User Priority to (UP) Mapping

| Priority | User Priority (UP) | IEEE 802.1D designation | Tx Queue | AC |
|---|---|---|---|---|
| Low | 1 | Background (BK) | BK | BK |
| ↓ | 2 | Spare (---) | BK | BK |
|  | 0 | Best Effort (BE) | BE | BE |
|  | 3 | Excellent Effort (EE) | BE | BE |
|  | 4 | Control Load (CL) | A_VI | VI |
|  | 5 | Video (VI) | VI | VI |
|  | 6 | Voice (VO) | VO | VO |
| High | 7 | Network Control (NC) | A_VO | VO |

TABLE 2

Default Parameter Set

| AC | CWmin | CWmax | AIFSN | TXOP limit |
|---|---|---|---|---|
| BK | 15 | 1023 | 7 | 0 |
| BE | 15 | 1023 | 3 | 0 |
| VI | 7 | 15 | 2 or 1(AP) | 3 ms |
| VO | 3 | 7 | 2 or 1(AP) | 1.5 ms |

TABLE 3

MLME-LLTS.request

| Function | MLME-LLTS. request (DialogToken, LLTSRequest, STAAddress) | | |
|---|---|---|---|
| When generated | SME of STA/MLD generates message and passes it to MLME when non-AP STA/MLD initiates an LLTS setup procedure | | |
| Effect of receipt | When MLME of STA receives message, it transmits LLTS request frame to recipient STA | | |
| Parameters | Name | Type | Description |
|  | DialogToken | Integer | Specifies the LLTS transaction |
|  | LLTSRequest | LLTSRequest element shown in FIG. 21 | SME specifies parameters in LLTSRequest element so MLME will copy element in LLTS request frame to |

TABLE 3-continued

MLME-LLTS.request

| | | | |
|---|---|---|---|
| | STAAddress | MAC address | launch LLTS setup procedure SME specifies MAC address of recipient of LLTS request frame. When MLME receives field, it sets Address 1 field to this STA Address in LLTS request frame |

TABLE 4

MLME-LLTS.indication

| | | | |
|---|---|---|---|
| Function | MLME-LLTS. indication (DialogToken, LLTSRequest, STAAddress) | | |
| When generated | MLME of STA generates message and passes it to its SME (or the SME of its affiliated MLD) when MLME of STA receives an LLTS request frame for LLTS setup | | |
| Effect of receipt | When SME of STA/MLD receives message, it decides whether to accepts the LLTS setup | | |
| Parameters | Name | Type | Description |
| | DialogToken | Integer | Specifies the LLTS transaction |
| | LLTSRequest | LLTSRequest elements as shown in FIG. 21 | MLME copies parameters in LLTSRequest from LLTS request frame so SME can decide if it should accept or reject LLTS setup procedure according to those parameters |
| | STAAddress | MAC address | MLME specifies MAC address of STA that transmitted LLTS request frame. When SME receives this, it uses this MAC address in STAAddress of corresponding MLME-LLTS.response function |

TABLE 5

MLME-LLTS.response

| | | | |
|---|---|---|---|
| Function | MLME-LLTS.response (DialogToken, LLTSResponse, STAAddress) | | |
| When generated | SME of STA/MLD generates message and transmits it to its MLME (or the MLME of its affiliated STA) when STA/MLD makes decision on LLTS setup requested from originator | | |
| Effect of receipt | When MLME of STA receives this message, it transmits an LLTS response frame to the originator STA | | |
| Parameters | Name | Type | Description |
| | DialogToken | Integer | Specifies the LLTS transaction |
| | LLTSResponse | LLTSResponse elements as shown in FIG. 26 | SME specifies parameters in LLTSResponse element so MLME will copy this element in LLTS response frame to continue an LLTS setup procedure |
| | STAAddress | MAC address | SME specifies MAC address of recipient of the LLTS response frame. When MLME receives this, it should use this MAC address in the Address 1 field |

TABLE 5-continued

MLME-LLTS.response

| | | | |
|---|---|---|---|
| | | | of the LLTS response frame |

TABLE 6

MLME-LLTS.confirm

| | | | |
|---|---|---|---|
| Function | MLME-LLTS.confirm (DialogToken, LLTSResponse, STAAddress) | | |
| When generated | MLME of STA generates message and passes it to its SME (or the SME of its affiliated MLD) when MLME of STA receives an LLTS response frame | | |
| Effect of receipt | When the SME of STA/MLD receives this message, it can determine the LLTS setup result from the recipient STA | | |
| Parameters | Name | Type | Description |
| | DialogToken | Integer | Specifies the LLTS transaction |
| | LLTSResponse | LLTSResponse elements as shown in FIG. 26 | MLME copies parameters in LLTSResponse element so SME could determine results for LLTS setup |
| | STAAddress | MAC address | SME specifies MAC address of STA that transmitted the LLTS response frame. When MLME receives this, it can determine from which STA it received LLTS response |

TABLE 7

MLME-LLTS-TERM.request

| | | | |
|---|---|---|---|
| Function | MLME-LLTS-TERM.indication (DialogToken, LLTSRequest, STAAddress) | | |
| When generated | SME of STA/MLD generates this message and passes it to its MLME (or the MLME of its affiliated STA) when the SME of STA/MLD decides to terminate or modify an LLTS | | |
| Effect of receipt | When MLME of STA receives this message, it transmits an LLTS response frame to the recipient STA to terminate the LLTS | | |
| Parameters | Name | Type | Description |
| | DialogToken | Integer | Specifies the LLTS transaction |
| | LLTSResponse | Sequence of LLTSResponse elements as shown in FIG. 26 | SME specifies the parameters in LLTSResponse element so that MLME will copy this element in LLTS response frame to launch an LLTS termination procedure |
| | STAAddress | MAC address | SME specifies MAC address of the receipt of the LLTS request frame. Then, MLME sets this in the Address 1 field in the LLTS response frame. |

TABLE 8

MLME-LLTS-TERM.indication

| | |
|---|---|
| Function | MLME-LLTS-TERM.indication (DialogToken, LLTSRequest, STAAddress) |

TABLE 8-continued

MLME-LLTS-TERM.indication

| When generated | MLME of STA generates this message and passes it to its SME (or SME of its affiliated MLD) when MLME of STA receives an LLTS response frame for an LLTS termination |
| --- | --- |
| Effect of receipt | When SME of STA/MLD receives this message, it is thus informed which LLTSs are terminated |

| Parameters | Name | Type | Description |
| --- | --- | --- | --- |
| | DialogToken | Integer | Specifies the LLTS transaction |
| | LLTSResponse | Sequence of LLTSResponse elements as shown in FIG. 26 | MLME copies parameters in LLTSResponse element from the LLTS response frame so that SME can determine which LLTSs are terminated |
| | STAAddress | MAC address | MLME specifies MAC address of STA that transmitted the LLTS response frame. When MLME receives this, it can determine from which STA it received this LLTS response |

TABLE 9

Example LLTSs

| | LLID | originator | recipient | direction | TID | UP | Links |
| --- | --- | --- | --- | --- | --- | --- | --- |
| LLTS1 | 1 | STA2 | AP1/MLD1 | Downlink | 8 | 6 | 1 |
| LLTS2 | 2 | MLD2 | MLD1 | Downlink | 9 | 5 | 1 |
| LLTS3 | 3 | MLD3 | MLD1 | Downlink | 10 | 3 | 1 |
| LLTS4 | 4 | STA2 | AP1/MLD1 | Uplink | 8 | 6 | 1 |
| LLTS5 | 5 | MLD2 | MLD1 | Uplink | 8 | 6 | 1 & 2 |
| LLTS6 | 6 | STA2 | AP1/MLD1 | Downlink | 8 | 6 | 1 |

What is claimed is:

1. An apparatus for wireless communication in a network, the apparatus comprising:
   (a) a wireless station (STA) operating as either an access point (AP) or a non-AP STA, is configured for wirelessly communicating packets which carry frames over a channel with other wireless stations (STAs), which are either APs or non-AP STAs, on a wireless local area network (WLAN) in which enhanced distributed channel access (EDCA) is applied to more than one Access Category (AC);
   (b) a processor within said STA;
   (c) a non-transitory memory storing instructions executable by the processor for communicating with other STAs; and
   (d) wherein said instructions, when executed by the processor, perform steps comprising:
      (i) distinguishing real time application (RTA) traffic from non-RTA traffic using a low latency traffic stream (LLTS) operation to differentiate between an RTA traffic stream and other traffic;
      (ii) a requesting STA establishing an LLTS setup by sending an LLTS request frame having an action field specifying: category, QoS action, dialog token and LLTS request element which includes an RTA specification element (TSPEC) indicating attributes for the RTA, which is sent from the requesting STA through its station management entity (SME) to its medium access control (MAC) sublayer management entity (MLME) communicating this request message to an MLME of a recipient STA which collects information from MLME-LLTS request message and sends this to a recipient STA which generates an MLME-LLTS indication message to its SME or the SME of its affiliated MLD; wherein an SME of the recipient STA processes the LLTS request and sends an MLME-LLTS response message comprising LLTS setup results to its MLME, wherein the MLME of the recipient sends an LLTS response frame to the requesting STA, which sends an MLME-LLTS confirmation message to its SME or the SME of its affiliated MLD; wherein in response to information received in these frames it can be determined if the LLTS setup has been successful or not;
      (iii) obtaining a transmit opportunity (TXOP) of a primary AC including TXOP channel resources;
      (iv) utilizing a remainder of the TXOP channel resources to transmit RTA frames, determined by the TSPEC element of the LLTS, from non-primary ACs even though there may be frames from the primary AC that have not been transmitted during the TXOP; and
      (v) wherein said LLTS can be modified or terminated by the recipient STA at any time.

2. The apparatus of claim 1, wherein said instructions when executed by the processor perform steps further comprising ensuring that a minimum required channel resource is available within a channel resource for transmitting frames from the primary AC during the TXOP.

3. The apparatus of claim 2, wherein the STA, which is ensuring minimum required channel resource to transmit frames from the primary AC, can utilize the minimum required channel resource for TXOP sharing if all the frames from the primary AC have been transmitted.

4. The apparatus of claim 1, wherein said instructions when executed by the processor perform steps further comprising the STA setting no minimum required channel resource to transmit frames from the primary AC during the TXOP.

5. The apparatus of claim 1, wherein said instructions when executed by the processor perform steps further comprising the STA ensuring that a given minimum number of bytes from the primary AC are transmitted during the TXOP.

6. The apparatus of claim 1, wherein said instructions when executed by the processor perform steps further comprising the STA ensuring that a minimum of required channel time is provided for transmitting frames from the primary AC during the TXOP.

7. The apparatus of claim 1, wherein said instructions when executed by the processor perform steps further comprising the STA transmitting RTA frames from non-primary ACs even if no frame from the primary AC has been transmitted during the TXOP.

8. The apparatus of claim 1, wherein said instructions when executed by the processor perform steps further comprising the STA transmitting RTA frames from non-primary ACs during the TXOP only if all the RTA frames from the primary AC have been transmitted.

9. The apparatus of claim 1, wherein said instructions when executed by the processor perform steps further comprising the STA transmitting RTA frames from non-primary ACs of higher priority during the TXOP, before transmitting RTA frames from the primary AC.

10. The apparatus of claim 1, wherein said instructions when executed by the processor perform steps further comprising the STA transmitting RTA frames from the non-primary ACs of lower priority during the TXOP.

11. The apparatus of claim 1, wherein said instructions when executed by the processor perform steps further comprising the STA transmitting a MU PPDU packet whose length is determined by the transmission and/or latency requirement of RTA frames from the primary ACs.

12. The apparatus of claim 1, wherein said instructions when executed by the processor perform steps further comprising the STA limiting the time of TXOP sharing.

13. The apparatus of claim 1, wherein said instructions when executed by the processor perform steps further comprising the STA allowing transmitting of RTA frames from non-primary ACs earlier than frames from the primary AC, only if those RTA frames are expiring.

14. The apparatus of claim 1, wherein said instructions when executed by the processor perform steps further comprising the STA obtaining a TXOP of the primary AC and sharing the TXOP with a non-primary AC of low priority.

15. A method of wireless communication in a network, the method comprising:
  (a) communicating from a wireless station (STA) operating as either an access point (AP) or a non-AP STA over a channel with other wireless stations (STAs), which are either APs or non-AP STAs, on a wireless local area network (WLAN) in which enhanced distributed channel access (EDCA) is applied to more than one access category (AC);
  (b) distinguishing real time application (RTA) traffic from non-RTA traffic by determining if a low latency traffic stream (LLTS) operation has been setup for the RTA traffic stream; wherein an LLTS is setup through a communication between an LLTS requesting STA to a recipient STA, with the requesting STA sending an LLTS request, which includes an RTA specification element (TSPEC) indicating attributes for the RTA, through its station management entity (SME) and its MAC sublayer management entity (MLME) to a recipient station, which upon accepting the request the LLTS setup is established;
  (c) obtaining a transmit opportunity (TXOP) of a primary AC;
  (d) utilizing a remainder of the channel resource to transmit RTA frames, determined by the TSPEC element of the LLTS, from non-primary ACs even when there are frames from the primary AC that have not been transmitted during the TXOP; and
  (e) wherein said LLTS can be modified or terminated by the recipient STA at any time.

* * * * *